(12) United States Patent
Gao et al.

(10) Patent No.: US 11,487,172 B1
(45) Date of Patent: Nov. 1, 2022

(54) ARRAY SUBSTRATE, DISPLAY PANEL AND DISPLAY DEVICE

(71) Applicant: Xiamen Tianma Micro-Electronics Co.,Ltd., Xiamen (CN)

(72) Inventors: Jiao Gao, Xiamen (CN); Yingzhang Qiu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/452,378

(22) Filed: Oct. 26, 2021

(30) Foreign Application Priority Data

Aug. 30, 2021 (CN) .......................... 202111006906.0

(51) Int. Cl.
*G02F 1/1335* (2006.01)
*G02F 1/1362* (2006.01)
*G02F 1/1368* (2006.01)
*G06F 3/041* (2006.01)
*G02F 1/1333* (2006.01)

(52) U.S. Cl.
CPC ...... *G02F 1/136209* (2013.01); *G02F 1/1368* (2013.01); *G02F 1/13338* (2013.01); *G02F 1/133526* (2013.01); *G02F 1/133553* (2013.01); *G02F 1/133567* (2021.01); *G02F 1/136222* (2021.01); *G02F 1/136286* (2013.01); *G06F 3/0412* (2013.01); *G06F 3/0416* (2013.01)

(58) Field of Classification Search
CPC ........... G02F 1/136209; G02F 1/13338; G02F 1/133526; G02F 1/133553; G02F 1/133567; G02F 1/136222; G02F 1/136286; G02F 1/1368; G06F 3/0412; G06F 3/0416
See application file for complete search history.

(56) References Cited

U.S. PATENT DOCUMENTS

| | | | | |
|---|---|---|---|---|
| 2016/0041310 | A1* | 2/2016 | Yang | H01L 31/022425 445/24 |
| 2018/0233686 | A1* | 8/2018 | Tian | H01L 51/502 |
| 2020/0057337 | A1* | 2/2020 | Zhao | G02F 1/1335 |
| 2020/0209679 | A1* | 7/2020 | Ling | G06V 40/1318 |
| 2022/0100018 | A1* | 3/2022 | Haruyama | G02F 1/133512 |
| 2022/0100038 | A1* | 3/2022 | Meng | G02B 6/0016 |

FOREIGN PATENT DOCUMENTS

| | | |
|---|---|---|
| CN | 101526708 A | 9/2009 |
| CN | 104280931 A | 1/2015 |
| CN | 107290909 A | 10/2017 |
| CN | 111627935 A | 9/2020 |

\* cited by examiner

*Primary Examiner* — James A Dudek
(74) *Attorney, Agent, or Firm* — Anova Law Group, PLLC

(57) ABSTRACT

An array substrate, a display panel and a display device are provided. The array substrate includes a substrate, a color resist layer disposed on a side of the substrate, and a black matrix layer disposed on a side of the color resist layer away from the substrate. The color resist layer includes a plurality of color resists of different colors. The black matrix layer includes a plurality of light-shielding strips and a plurality of openings. An orthographic projection of an opening on the substrate overlaps an orthographic projection of a color resist on the substrate. The array substrate also includes a light-converging layer disposed between the color resist layer and the black matrix layer. The light-converging layer includes a plurality of light-converging portions, and a light-converging portion converges light incident on the light-converging portion to a light-shielding strip of the plurality of light-shielding strips.

20 Claims, 31 Drawing Sheets

ARRAY SUBSTRATE, DISPLAY PANEL AND DISPLAY DEVICE

CROSS-REFERENCE TO RELATED APPLICATION

This application claims the priority of Chinese patent application No. 202111006906.0, filed on Aug. 30, 2021, the entirety of which is incorporated herein by reference.

FIELD

The present disclosure generally relates to the field of display technology and, more particularly, relates to an array substrate, a display panel and a display device.

BACKGROUND

Liquid crystal display (LCD) device is featured with advantages such as thin body, power saving, and non-radiation, etc., and has been widely used in LCD TV, mobile phone, personal digital assistant (PDA), digital camera, computer screen or laptop screen, etc. The liquid crystal display device often includes a case, a liquid crystal panel disposed inside the case, and a backlight module disposed inside the case. The liquid crystal panel often includes a thin film transistor array (TFT array) substrate, a color filter (CF) substrate, and a liquid crystal layer disposed between two glass substrates. The working principle of the liquid crystal panel includes controlling the rotation of the liquid crystal molecules in the liquid crystal layer by applying a driving voltage between the two glass substrates, such that the light emitted from the backlight module may be refracted to form an image.

Color-filter on array (COA) technology is an integrated technology in which a color photoresist layer is directly fabricated on an array substrate to form a COA type array substrate. Because the liquid crystal display panel with the COA structure does not have the problem of alignment between the color filter substrate and the thin film transistor array substrate, the difficulty of the cell alignment process in the fabrication process of the liquid crystal display panel may be effectively reduced, and the error of the cell alignment may be avoided. Further, a display aperture ratio increases to a certain extent, which significantly improves the panel quality and panel production efficiency.

However, to fully shield the light reflected by the metal line disposed on a side of the array substrate and to avoid the light leakage risk, a width of the black matrix (BM) for shielding light has to be greater than a line width of the metal line, which easily affects the display aperture ratio. In other words, the potential of increasing the aperture ratio of the liquid crystal display panel with the COA structure is a substantially small. With the development of display technology, the application of display panels has become more and more common. Accordingly, people have higher and higher requirements for the display panel. How to further effectively increase the aperture ratio of the display panel has become a main research direction in the field.

Therefore, how to provide an array substrate, a display panel, and a display device that are capable of improving the aperture ratio while improving the light leakage phenomenon is an urgent technical problem that needs to be solved.

SUMMARY

One aspect of the present disclosure provides an array substrate. The array substrate includes a substrate, a color resist layer disposed on a side of the substrate, and a black matrix layer disposed on a side of the color resist layer away from the substrate. The color resist layer includes a plurality of color resists of different colors. The black matrix layer includes a plurality of light-shielding strips and a plurality of openings defined by the plurality of light-shielding strips intersecting each other. An orthographic projection of an opening of the plurality of openings on the substrate overlaps an orthographic projection of a color resist of the plurality of color resists on the substrate. The array substrate also includes a light-converging layer disposed between the color resist layer and the black matrix layer. The light-converging layer includes a plurality of light-converging portions, and a light-converging portion of the plurality of light-converging portions converges light incident on the light-converging portion to a light-shielding strip of the plurality of light-shielding strips.

Another aspect of the present disclosure provides a display panel. The display panel includes a first substrate and an array substrate that are disposed opposite to each other. The array substrate includes a substrate, a color resist layer disposed on a side of the substrate, and a black matrix layer disposed on a side of the color resist layer away from the substrate. The color resist layer includes a plurality of color resists of different colors. The black matrix layer includes a plurality of light-shielding strips and a plurality of openings defined by the plurality of light-shielding strips intersecting each other. An orthographic projection of an opening of the plurality of openings on the substrate overlaps an orthographic projection of a color resist of the plurality of color resists on the substrate. The array substrate also includes a light-converging layer disposed between the color resist layer and the black matrix layer. The light-converging layer includes a plurality of light-converging portions, and a light-converging portion of the plurality of light-converging portions converges light incident on the light-converging portion to a light-shielding strip of the plurality of light-shielding strips.

Another aspect of the present disclosure provides a display device. The display device includes a display panel including a first substrate and an array substrate that are disposed opposite to each other. The array substrate includes a substrate, a color resist layer disposed on a side of the substrate, and a black matrix layer disposed on a side of the color resist layer away from the substrate. The color resist layer includes a plurality of color resists of different colors. The black matrix layer includes a plurality of light-shielding strips and a plurality of openings defined by the plurality of light-shielding strips intersecting each other. An orthographic projection of an opening of the plurality of openings on the substrate overlaps an orthographic projection of a color resist of the plurality of color resists on the substrate. The array substrate also includes a light-converging layer disposed between the color resist layer and the black matrix layer. The light-converging layer includes a plurality of light-converging portions, and a light-converging portion of the plurality of light-converging portions converges light incident on the light-converging portion to a light-shielding strip of the plurality of light-shielding strips.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
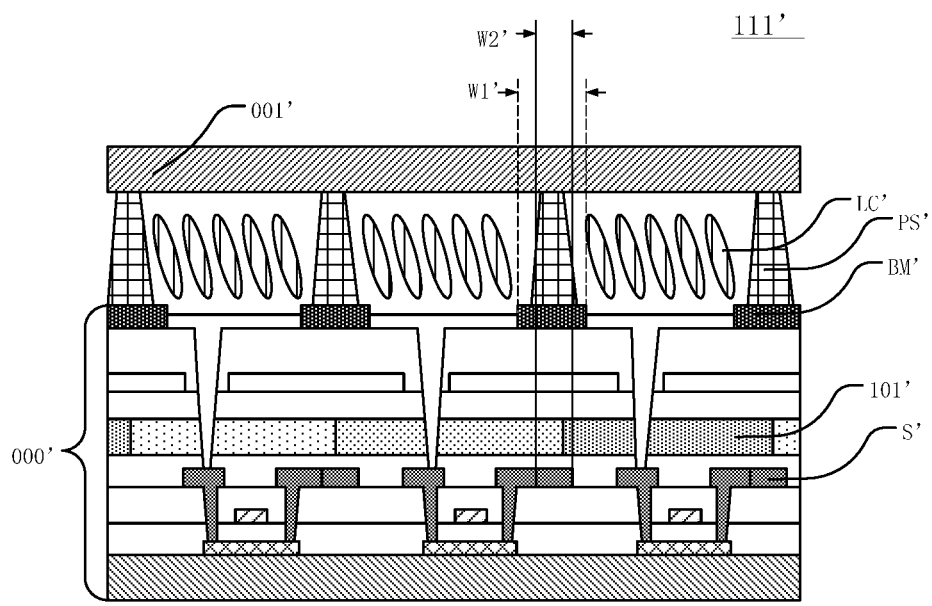
FIG. 1 illustrates a local cross-sectional view of a display panel.

FIG. 1 illustrates a local cross-sectional view of a display panel. Referring to FIG. 1, a liquid crystal display panel 111' includes a COA-type array substrate 000', a counter substrate 001' that is disposed opposite to the array substrate 000', a liquid crystal layer LC' disposed between the two substrates, and a photo spacer PS' for maintaining a cell thickness. In the COA-type array substrate 000' in FIG. 1, a color photoresist layer 101' emitting color light is formed by color resist units (R/GB), and a black matrix BM' configured to prevent the light leakage at the pixel edge is disposed on an array substrate 000' including a thin film transistor array. The black matrix BM' is mainly configured to shield the light reflected by the metal line at the boundary of each pixel on a side of the array substrate 000' and color mixing. The COA-type array substrate 000' has slight color mixing, such that the black matrix BM' is mainly configured to shield the light reflected by the metal line. Because the liquid crystal display panel with the COA structure does not have a problem of alignment between the color filter substrate and the thin film transistor array substrate, the difficulty of the cell alignment process in the fabrication process of the liquid crystal display panel may be effectively reduced, and the error of the cell alignment may be avoided. Further, a display aperture ratio increases to a certain extent, which significantly improves the panel quality and panel production efficiency.

However, because various metal lines, such as a data line S' (as shown in FIG. 1) for providing a data voltage signal, etc., are integrated on the side of the array substrate 000', the ambient light tends to be reflected by the metal lines on the array substrate 000', causing a light leakage phenomenon. Especially, the reflection of light at a position of the data line S' disposed as an entire strip is substantially serious, and the light leakage phenomenon is more obvious.

To fully shield the light reflected by the metal lines (e.g., the data line S' or any other metal signal line) disposed on the side of the array substrate 000', a width W1' of the black matrix BM' for shielding light is set larger than a line width W2' of the metal line (as shown in FIG. 1). While the black matrix BM' with a substantially large width tends to affect the display aperture ratio. In other words, in the related art, the potential of increasing the aperture ratio of the liquid crystal display panel with the COA structure in which the width of the black matrix BM' is increased for reducing the light leakage phenomenon is substantially small.

Figure 2:
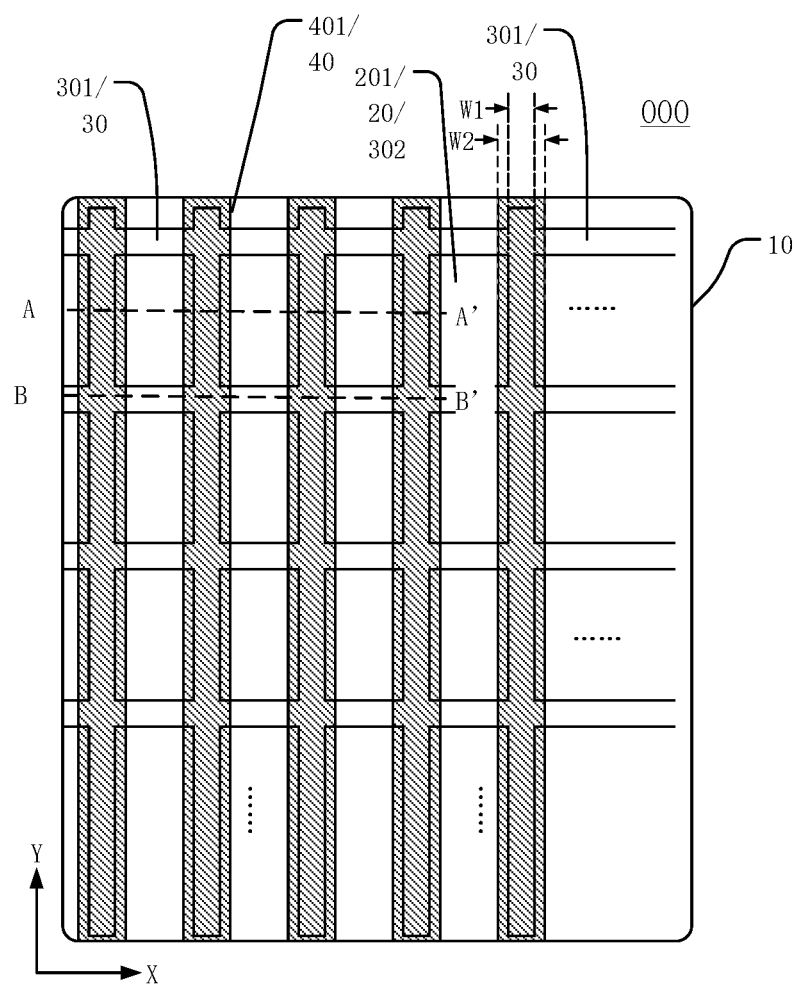
FIG. 2 illustrates a schematic top view of an exemplary array substrate consistent with disclosed embodiments of the present disclosure.
Figure 3:
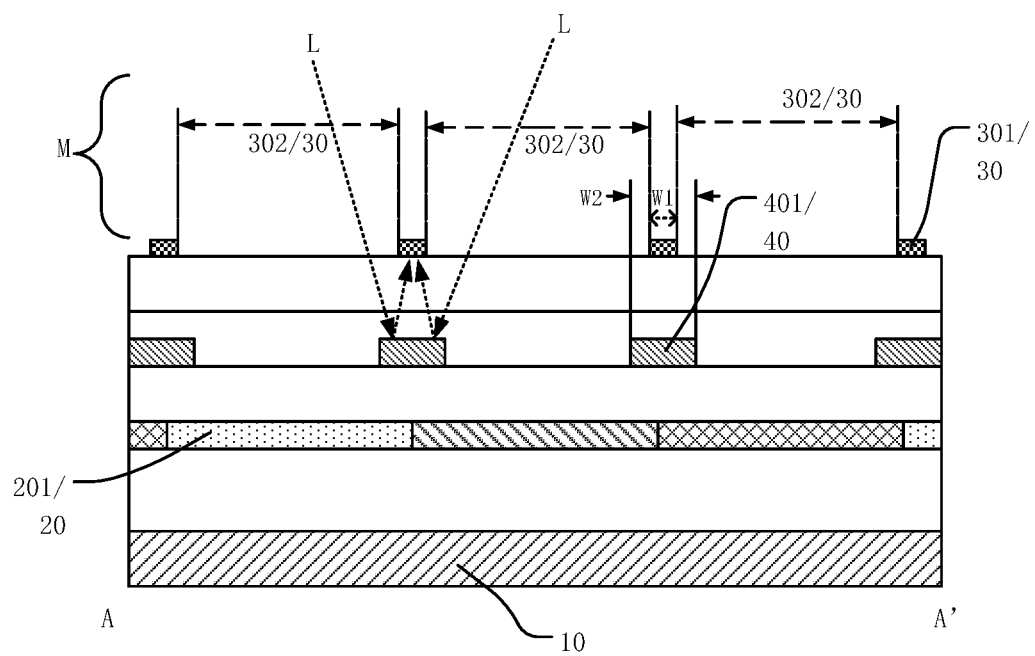
FIG. 3 illustrates an A-A' sectional view of an exemplary array substrate in FIG. 2 consistent with disclosed embodiments of the present disclosure.
Figure 4:
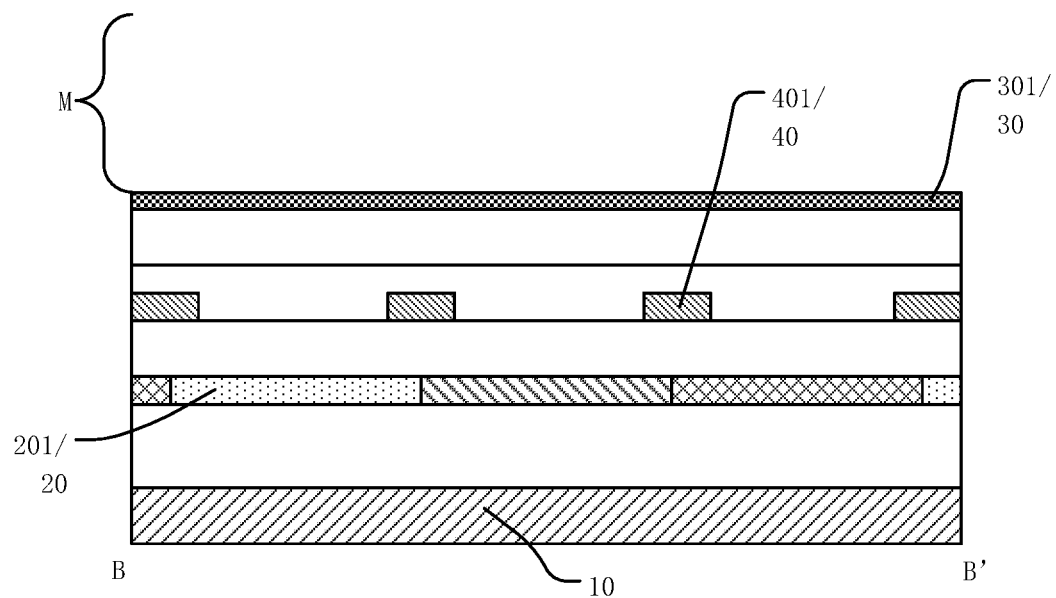
FIG. 4 illustrates a B-B' sectional view of an exemplary array substrate in FIG. 2 consistent with disclosed embodiments of the present disclosure.

The present disclosure provides an array substrate, a display panel, and a display device. FIG. 2 illustrates a schematic top view of an array substrate consistent with disclosed embodiments of the present disclosure; FIG. 3 illustrates an A-A' sectional view of the array substrate in FIG. 2; and FIG. 4 illustrates a B-B' sectional view of the array substrate in FIG. 2. For illustrative purposes, a transparency filling may be performed in FIG. 2. Referring to FIGS. 2-4, an array substrate 000 in the present disclosure may include a substrate 10, a color resist layer 20, a black matrix layer 30, and a light-converging layer 40.

The color resist layer 20 may be disposed on a side of the substrate 10. The color resist layer 20 may include a plurality of color resists 201 of different colors (indicated by different filling patterns in the Figure).

The black matrix layer 30 may be disposed on a side of the color resist layer 20 away from the substrate 10. The black matrix layer 30 may include a plurality of light-shielding strips 301, and a plurality of openings 302 defined by the light-shielding strips 301 intersecting each other. An orthographic projection of the opening 302 on the substrate 10 overlaps an orthographic projection of the color resist 201 on the substrate 10.

The light-converging layer 40 may be disposed between the color resist layer 20 and the black matrix layer 30. The light-converging layer 40 may include a plurality of light-converging portions 401. The light-converging portion 401 may converge the light incident on the light-converging portion 401 to the light-shielding strip 301.

In one embodiment, the array substrate 000 may be an array substrate with a COA structure. In other words, the color resist layer 20 including the plurality of color resists 201 of different colors may be directly fabricated on the array substrate 000. The array substrate 000 may include the substrate 10 for supporting various film layer structures. At least the color resist layer 20 may be disposed over the substrate 10. The color resist layer 20 may include the plurality of color resists 201 of different colors. The color resists 201 of different colors may at least include a red color resist, a green color resist, and a blue color resist. Optionally, in certain embodiments, the color resists 201 of different colors may at least include a red color resist, a green color resist, a blue color resist, and a white color resist, which may not be limited by the present disclosure.

The black matrix layer 30 may be disposed on the side of the color resist layer 20 away from the substrate 10. The black matrix layer 30 may include the plurality of light-shielding strips 301 and the plurality of openings 302 defined by the light-shielding strips 301 intersecting each other. The opening 302 may expose at least a portion of the color resist 201, and the light-shielding strip 301 may be configured to shield the light reflected by the metal signal line disposed on the side of the array substrate 000 and color mixing. Optionally, the light-shielding strip 301 may be mainly configured to shield the light reflected by the metal signal line.

It should be understood that the specific positions of the metal signal lines and the types of signal lines may not be illustrated in FIGS. 2-4. The metal signal line may be a metal signal line in any film layer between the black matrix layer 30 and the substrate 10. For example, the array substrate 000 may include thin film transistors arranged in an array, and scanning lines and data lines electrically connected to the thin film transistors. When the array substrate 000 is used in a touch-control display panel, the array substrate 000 may further include touch-control signal lines for implementing a touch-control function. The data lines, the touch-control signal lines, etc., may be disposed in the film layer at any position between the black matrix layer 30 and the substrate 10, as long as the light-shielding strip 301 for shieling light is disposed at a position corresponding to the metal signal line.

In the disclosed array substrate 000, the light-converging layer 40 may be disposed between the color resist layer 20 and the black matrix layer 30. The light-converging layer 40 may include the plurality of light-converging portions 401, and the light-converging portion 401 may be configured to converge the light incident on the light-converging portion 401 to the light-shielding strip 301, where the light incident to the light-converging portion 401 may be ambient light. In other words, through disposing the light-converging portion 401, a propagation direction of the light incident on the light-converging portion 401 may be changed. Therefore, the light-converging portion 401 may converge the light to the light-shielding strip 301, and the light may be absorbed by the light-shielding strip 301, thereby improving the light leakage phenomenon.

When a certain film layer in the array substrate 000 includes a metal signal line, because the light-converging portion 401 converges the light, the width of the light-shielding strip 301 of the black matrix layer 30 may be set substantially small (e.g., as shown in FIG. 3), which may facilitate to increase the aperture ratio. Then, the light-converging portion 401 may converge the light to the light-shielding strip 301. In view of this, even if the width of the light-shielding strip 301 is substantially small, the ambient light may be prevented from being reflected by the metal signal line on the side of the array substrate 000, thereby reducing the occurrence of light leakage. In one embodiment, through disposing the plurality of light-converging portions 401 between the color resist layer 20 and the black matrix layer 30, the width of the light-shielding strip 301 of the black matrix layer 30 may be reduced as much as possible while improving the light leakage phenomenon and improving the display quality, thereby increasing the aperture ratio.

It should be understood that referring to FIG. 1 and FIG. 3, because the light-converging portion 401 converges the light, in one embodiment, the width of the light-shielding strip 301 of the black matrix layer 30 may be substantially small. In other words, the width W1 of the light-shielding strip 301 of the black matrix layer 30 in FIG. 3 may be smaller than the width W1' of the black matrix BM' in FIG. 1. In the present disclosure, through disposing the light-converging portion 401, the width of the light-shielding strip 301 of the black matrix layer 30 may be designed to be substantially narrow, thereby improving light leakage and increasing the aperture ratio.

It should be understood that the specific film structure of the array substrate 000 in the present disclosure may include but may not be limited to the above structure. The film structure illustrated in the Figure in the present disclosure may merely be used to illustrate the positional relationship of the black matrix layer 30, the color resist layer 20, and the light-converging layer 40, and may represent the actual film structure of the array substrate 000. For specific implementation, the structure of the array substrate with the COA structure in the related art may be referred for understanding. For example, the array substrate 000 may also include a pixel electrode film layer, a common electrode film layer, a thin film transistor film layer, and various insulating film layers, etc., which may not be repeated herein.

FIG. 2 and FIG. 3 may merely exemplarily illustrate a one-to-one correspondence between a light-shielding strip 301 extended along a longitudinal direction and a light-converging portion 401, and the correspondence may include but may not be limited to such relationship. In specific implementation, not every longitudinally-extended light-shielding strip 301 may be provided with the light-converging portion 401 below. In other words, merely a part of the number of longitudinally-extended light-shielding strips 301 may be provided with the light-converging portion 401 below, or a portion of the longitudinally-extended light-shielding strip 301 is provided with the light-converging portion 401. As long as the light-converging portion 401 is disposed at a position where the light leakage phenomenon caused by reflection of the metal signal line in the array substrate 100 occurs, or the light leakage phenomenon is substantially serious, to achieve the purpose of improving the light leakage phenomenon, the correspondence may also include any other relationship, which may not be specifically limited by the present disclosure.

Optionally, when the array substrate 000 with the COA structure is used to fabricate the liquid crystal display panel, the problem of alignment between the color filter substrate and the thin film transistor array substrate may be avoided, the difficulty of the cell alignment process in the fabrication process of the liquid crystal display panel may be effectively reduced, and the error of the cell alignment may be avoided. Therefore, when the array substrate 000 with the COA structure is applied to a curved screen, the problem of the alignment accuracy of the curved screen may be resolved. The squeezing light leakage phenomenon caused by the bending of the curved screen and the light leakage phenomenon caused by the reflection of the metal signal line may be substantially obvious. Therefore, when the array substrate 000 is applied to a curved screen, the disposure of the light-converging portion 401 may not only effectively improve the light leakage phenomenon caused by reflection of the metal signal line, but also effectively improve the light leakage phenomenon caused by bending and squeezing.

It should be noted that for illustrative purposes, FIGS. 2-4 may merely illustrate the shape and structure of the light-converging portion 401, which may include but may not be limited to the shape and structure in the Figure. The shape and structure of the light-converging portion 401 may include any other shape that is capable of converging the light incident on the light-converging portion 401 to the light-shielding strip 301. In specific implementation, the shape and structure of the light-converging portion 401 may be determined according to practical applications, which may not be specifically limited by the present disclosure.

Referring to FIG. 3, for illustrative purposes, the present disclosure may merely illustrate the width W2 of the light-converging portion 401. In specific implementation, the width W2 of the light-converging portion 401 may be greater than or equal to or less than the width W1 of the light-shielding strip 301, which may not be specifically limited by the present disclosure. For illustrative purposes, FIG. 3 merely illustrates an overlapping positional relationship between the light-shielding strip 301 and the light-converging portion 401, which may include but may not be limited to such structure. The light-shielding strip 301 and the light-converging portion 401 may also have any other overlapping positional relationship. For example, the boundary of the light-shielding strip 301 in FIG. 3 may overlap the boundary of the light-converging portion 401, or the boundary of the light-shielding strip 301 in FIG. 3 may be located between the two boundaries of the light-converging portion 401, or the boundary of the light-shielding strip 301 in FIG. 3 may exceed the boundary of the light-converging portion 401. As long as the disposure of the light-converging portion 401 is capable of improving the light leakage phenomenon and improving the aperture ratio, the positional relationship between the light-shielding strip 301 and the light-converging portion 401 may not be limited by the present disclosure.

Optionally, in one embodiment, the plurality of light-converging portions 401 may have following functions. Referring to FIG. 3 and FIG. 4, for first light L incident on the light-converging portion 401 from a first side M of the array substrate 000, the light-converging portion 401 may be configured to change the propagation direction of the first light L, such that the first light L may be converged to the light-shielding strip 301. The first side M may refer to the side of the black matrix layer 30 away from the substrate 10. The first light L incident on the light-converging portion 401 from the first side M of the array substrate 000 may be external ambient light. When the first light L is incident on the light-converging portion 401 from the side of the black matrix layer 30 away from the substrate 10, the light-converging portion 401 may change the propagation direction of the first light L by reflection and/or refraction, such that the first light L may be converged by the light-converging portion 401 to the light-shielding strip 301, and may be absorbed by the black light-shielding strip 301, thereby preventing the occurrence of light leakage phenomenon. Furthermore, due to the converging effect of the light-converging portion 401 on the first light L, even if the light-shielding strip 301 of the black matrix layer 30 is set substantially narrow (as shown in FIG. 3), the light leakage phenomenon may not occur. Therefore, the aperture ratio may further increase, and the display quality may be improved.

Figure 5:
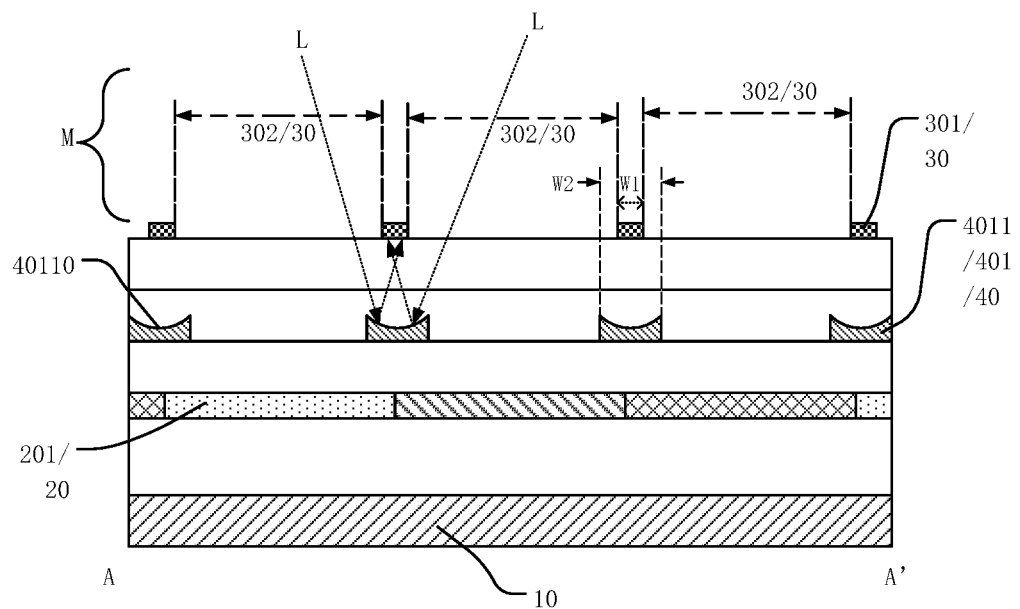
FIG. 5 illustrates an A-A' sectional view of another exemplary array substrate in FIG. 2 consistent with disclosed embodiments of the present disclosure.

FIG. 5 illustrates an A-A' sectional view of the array substrate in FIG. 2. In certain embodiments, referring to FIG. 2 and FIG. 5, the light-converging portion 401 may include a reflection portion 4011, and the reflection portion 4011 may include a first surface 40110 facing towards the black matrix layer 30. The first surface 40110 may be recessed along a direction away from the black matrix layer 30.

In one embodiment, the light-converging portion 401 may include the reflection portion 4011 having a reflective function, and the first surface 40110 of the reflection portion 4011 facing towards the black matrix layer 30 may have a recessed structure. In other words, the first surface 40110 may be a recessed reflective surface formed by being recessed towards a direction away from the black matrix layer 30. When the first light L as the external ambient light is incident on the light-converging portion 401 from the side of the black matrix layer 30 away from the substrate 10, the reflection portion 4011 of the light-converging portion 401 may change the propagation direction of the first light L by the reflection of the first surface 40110, such that the first light L may be reflected by the reflection portion 4011 back to the first side M.

Further, the first surface 40110 of the reflection portion may be designed to have a recessed structure. Therefore, while being reflected back to the first side M, the first light L may be converged to the light-shielding strip 301 by the recessed first surface 40110, and may be absorbed by the black light-shielding strip 301, thereby preventing the occurrence of light leakage phenomenon. Furthermore, due to the converging effect of the reflection portion 4011 on the first light L, even if the light-shielding strip 301 of the black matrix layer 30 is set substantially narrow (as shown in FIG. 5), the light leakage phenomenon may not occur. Therefore, the aperture ratio may further increase, and the display quality may be improved.

In certain embodiments, referring to FIGS. 2-5, an orthographic projection of at least a portion of the light-shielding strip 301 on the substrate 10 may be located within an orthographic projection of the reflection portion 4011 on the substrate 10.

In the disclosed embodiments, when the first light L as the ambient light is incident on the light-converging portion 401 from the side of the black matrix layer 30 away from the substrate 10, the reflection portion 4011 of the light-converging portion 401 may change the propagation direction of the first light L through the reflection effect of the first surface 40110, such that the first light L may be reflected back to the first side M by the reflection portion 4011. In the present disclosure, the first surface 40110 of the reflection portion may be designed to have a recessed structure, while being reflected back to the first side M, the first light L may be converged to the light-shielding strip 301 by the recessed first surface 40110, and may be absorbed by the black light-shielding strip 301, thereby avoiding light leakage.

Therefore, the orthographic projection of at least a portion of the light-shielding strip 301 on the substrate 10 may be within the orthographic projection of the reflection portion 4011 on the substrate 10. In other words, the width W1 of the orthographic projection of at least the portion of the light-shielding strip 301 on the substrate 10 may be smaller than the width W2 of the orthographic projection of the reflection portion 4011 on the substrate 10. In other words, the light-shielding strip 301 of the black matrix layer 30 may be set substantially narrow (as shown in FIG. 3 and FIG. 5), which may increase the aperture ratio and facilitate to improve the display quality without causing the light leakage.

It should be understood that the light-shielding strip 301 of the black matrix layer 30 may often be used to shield the light reflected by the metal signal line at the boundary of each sub-pixel on one side of the array substrate 000. The metal signal line may have a plurality of extension directions, such that the plurality of light-shielding strips 301 may include a light-shielding strip 301 extended along a first direction X, and may include a light-shielding strip 301 extended along a second direction Y. The first direction X may be an extension direction of the scanning line (not shown in the Figure), and the second direction Y may be an extension direction of the data line (not shown in the Figure). The first direction X and the second direction Y may intersect in a plane parallel to the plane of the substrate 10. For illustrative purposes, FIG. 2 illustrates that the first direction X and the second direction Y may be perpendicular to each other.

In the array substrate 000, the metal signal line extended as an entire strip may often be located between two adjacent sub-pixels, i.e., located at the boundary of the sub-pixel, and may often include the data line for providing a data voltage signal and a touch-control signal line for providing a touch-control signal. The metal signal line on the array substrate 000 may occupy a substantially large area, may be located at the boundary of the sub-pixel, and may tend to reflect ambient light to cause light leakage. Therefore, the extension directions of the reflection portions 4011 may be the same as the extension directions of the metal signal lines (the data line and the touch-control signal line). In other words, the extension direction of the reflection portion 4011 may be the second direction Y (as shown in FIG. 2). Therefore, the orthographic projection of at least a portion of the light-shielding strip 301 in the black matrix layer 30 on the substrate 10 may be within the orthographic projection of the reflection portion 4011 on the substrate 10. In other words, among the entire light-shielding strips 301 in the black matrix layer 30, extension direction of at least part of the light-shielding strips 301 extended along the second direction Y may be the same as the extension direction of the reflection portion 4011, and the orthographic projection of the reflection portion 4011 on the substrate 10 may cover orthographic projection of at least part of the light-shielding strips 301 extended along the second direction Y on the substrate 10.

Optionally, the extension direction of the reflection portion 4011 may also be the first direction X. When any other metal signal line (such as a scanning line) extended along the first direction X is also disposed on the side of the array substrate 000, and the metal signal line extended along the first direction X tends to cause reflection light leakage, the reflection portion 4011 may also be disposed in the first direction X, thereby further improving the light leakage effect. In other words, the reflection portion 4011 may be extended along the first direction X, and the extension direction of the reflection portion 4011 may also be the same as the extension direction of at least part of the light-shielding strips 301 that are extended along the first direction X. In view of this, the light-shielding strip 301 extended along the first direction X corresponding to the reflection portion 4011 extended along the first direction X may be set narrower than that in the prior art, thereby further improving the aperture ratio.

It should be noted that FIG. 5 merely exemplarily depicts the recessed structure of the first surface 40110 of the reflection portion 4011 facing towards the black matrix layer 30. The structure of the first surface 40110 may include the curved surface shown in FIG. 5, and may also include any other recessed structure, such as a recessed structure with spliced multiple planes, etc. As long as the first surface 40110 of the reflection portion 4011 with the recessed structure is capable of reflecting the first light L and converging the first light to the light-shielding strip 301, the structure of the first surface 40110 may not be limited by the present disclosure. In specific implementation, the recessed manner of the first surface 40110 may be selected according to actual requirements, which may not be limited by the present disclosure.

Figure 6:
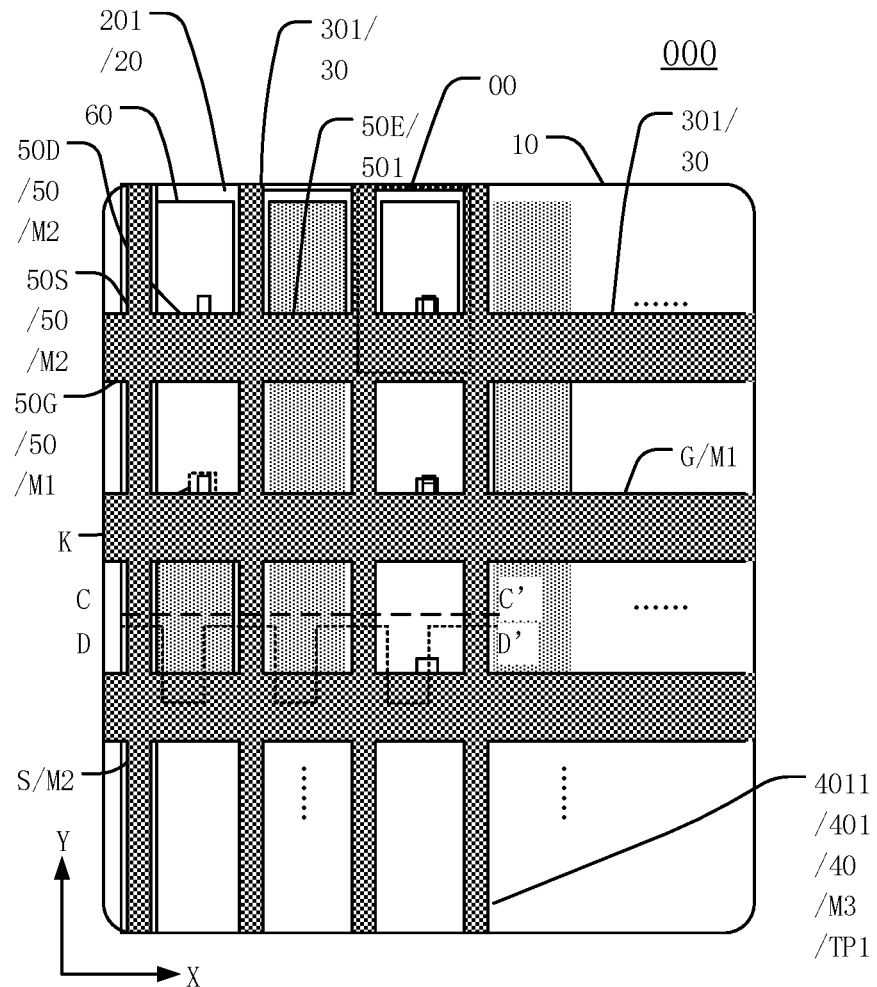
FIG. 6 illustrates a schematic top view of another exemplary array substrate consistent with disclosed embodiments of the present disclosure.
Figure 7:
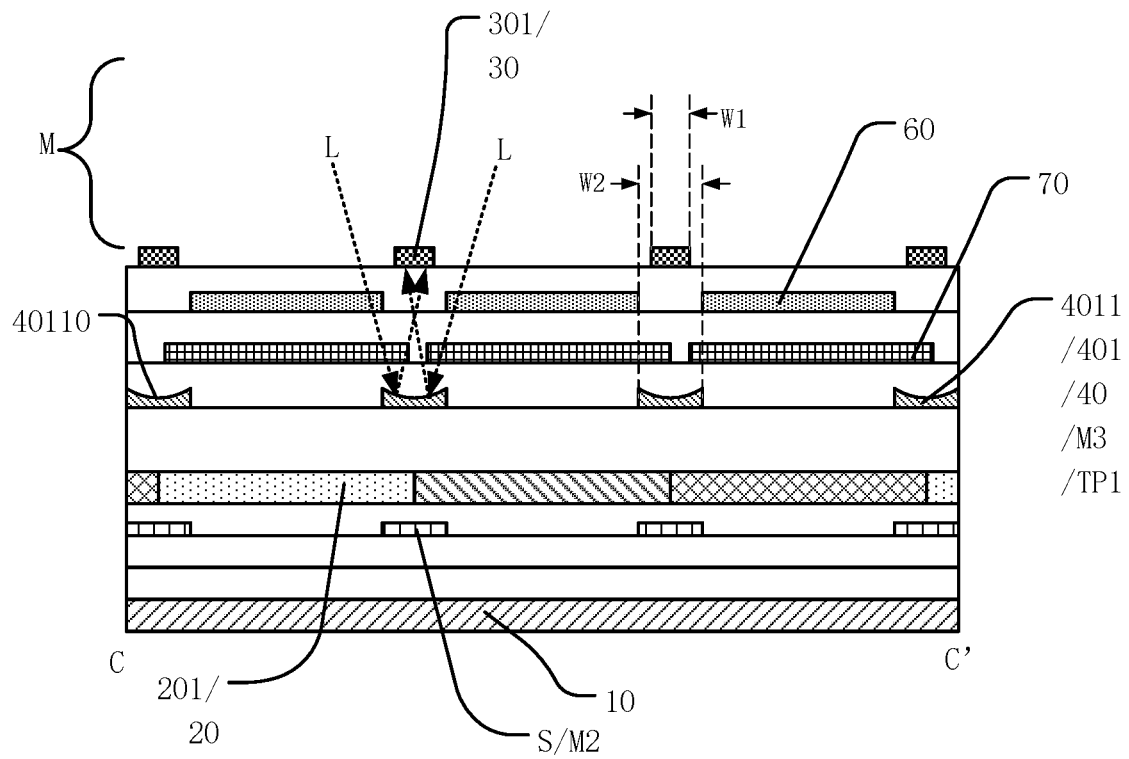
FIG. 7 illustrates a C-C' sectional view of another exemplary array substrate in FIG. 6 consistent with disclosed embodiments of the present disclosure.
Figure 8:
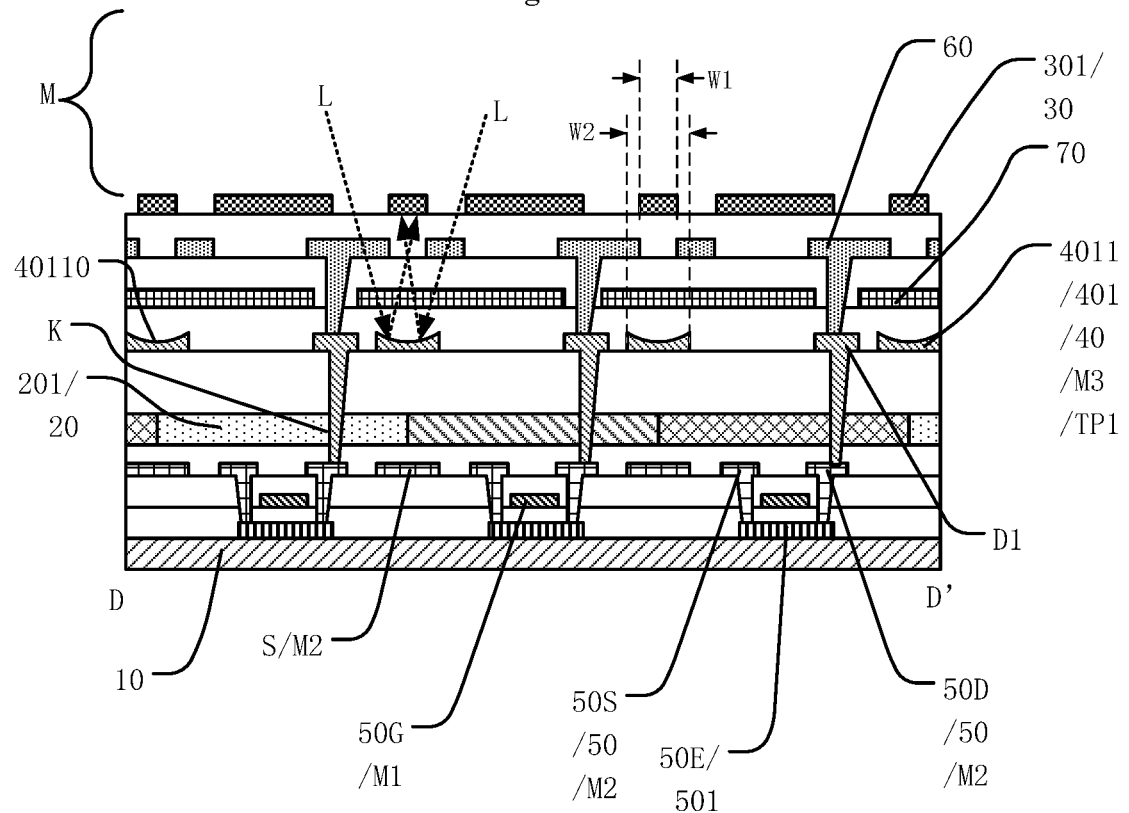
FIG. 8 illustrates a D-D' sectional view of another exemplary array substrate in FIG. 6 consistent with disclosed embodiments of the present disclosure.

FIG. 6 illustrates a schematic top view of another array substrate consistent with disclosed embodiments of the present disclosure; FIG. 7 illustrates a C-C' sectional view of the array substrate in FIG. 6; and FIG. 8 illustrates a D-D' sectional view of the array substrate in FIG. 6. For illustrative purposes, a transparency filling may be performed in FIG. 6. In certain embodiments, referring to FIGS. 6-8, the array substrate 000 may further include a plurality of sub-pixels 00 arranged in an array, a plurality of scanning lines G extended along the first direction X, and a plurality of data lines S extended along the second direction Y. The scanning lines G and the data lines S may be insulated from each other, and may intersect each other to define a region where the sub-pixel 00 is located. The first direction X may intersect the second direction Y. Optionally, the first direction X and the second direction Y may intersect each other in a plane parallel to the plane of the substrate 10. For illustrative purposes, FIG. 6 illustrates that the first direction X and the second direction Y may be perpendicular to each other as an example.

The sub-pixel 00 may include a thin film transistor 50 and a pixel electrode 60 that are electrically connected to each other. The thin film transistor 50 may include a gate 50G, a source 50S, a drain 50D, and an active portion 50E. The drain 50D of the thin film transistor 50 may be electrically connected to the pixel electrode 60, the gate 50G may be electrically connected to the scanning line G, and the source 50S may be electrically connected to the data line S.

The gate 50G and the scanning line G may be located in a first metal layer M1. The data line S, the source 50S and the drain 50D may be located in a second metal layer M2. The active portion 50E may be located in an active layer 501. The pixel electrode 60 may be located on a side of the color resist layer 20 away from the substrate 10.

The array substrate 000 may further include a common electrode 70 (not shown in FIG. 6). The common electrode 70 may be located on a side of the pixel electrode 60 close to the substrate 10. In another embodiment, the common electrode 70 may be located on a side of the pixel electrode 60 away from the substrate 10.

The present disclosure may explain that the array substrate 000 may further include the plurality of sub-pixels 00 arranged in an array, the plurality of scanning lines G extended along the first direction X, the plurality of data lines S extended along the second direction Y, and the common electrode 70. The scanning lines G and the data lines S may be insulated from each other, and may intersect each other to define a region where the sub-pixel 00 is located. The region where the sub-pixel 00 is located may be understood as the region where the color resist 201 of the color resist layer 20 is located. The sub-pixel 00 may include the thin film transistor 50 and the pixel electrode 60 that are electrically connected to each other. The drain 50D of the thin film transistor 50 may be electrically connected to the pixel electrode 60, the gate 50G may be electrically connected to the scanning line G, and the source 50S may be electrically connected to the data line S.

When the array substrate 000 is used in a liquid crystal display panel, the thin film transistor 50 may be used as a switching device of the sub-pixel 00 in the display panel. The gate 50G of the thin film transistor 50 may be connected to the scanning line G of the array substrate 000 of the display panel, and may be connected to a gate scanning circuit (not shown in the Figure) through the scanning line G. The source 50S of the thin film transistor 50 may be connected to the data line S, and may be connected to an integrated circuit chip (IC, not shown in the Figure) through the data line S. The drain 50D of the thin film transistor 50 may be connected to the pixel electrode 60. A voltage may be applied to the pixel electrode 60 through the data line S, such that an electric field may be formed between the pixel electrode 60 and the common electrode 70, and the liquid crystal molecules (not shown in the Figure) of the liquid crystal layer may be deflected in such electric field, to control whether the light is emitted or not. The color resists 201 of the color resist layer 20 may have different colors, such that the light-exiting color may be different, thereby achieving the display of the display panel.

In one embodiment, the gate 50G of the thin film transistor 50 and the scanning line G may be located in the first metal layer M1. The data line S, the source 50S and the drain 50D of the thin film transistor 50 may be located in the second metal layer M2. The active portion 50E of the thin film transistor 50 may be located in the active layer 501. Optionally, the first metal layer M1 and the active layer 501 may be disposed between the color resist layer 20 and the substrate 10. It should be understood that for illustrative purposes, the first metal layer M1 may be located between the active layer 501 and the second metal layer M2, in other words, the thin film transistor 50 may be a transistor having a top gate structure as an example. In practical applications, the first metal layer M1 may also be located between the active layer 501 and the substrate 10, in other words, the thin film transistor 50 may be a transistor having a bottom gate structure, which may not be specifically limited by the present disclosure.

Figure 9:
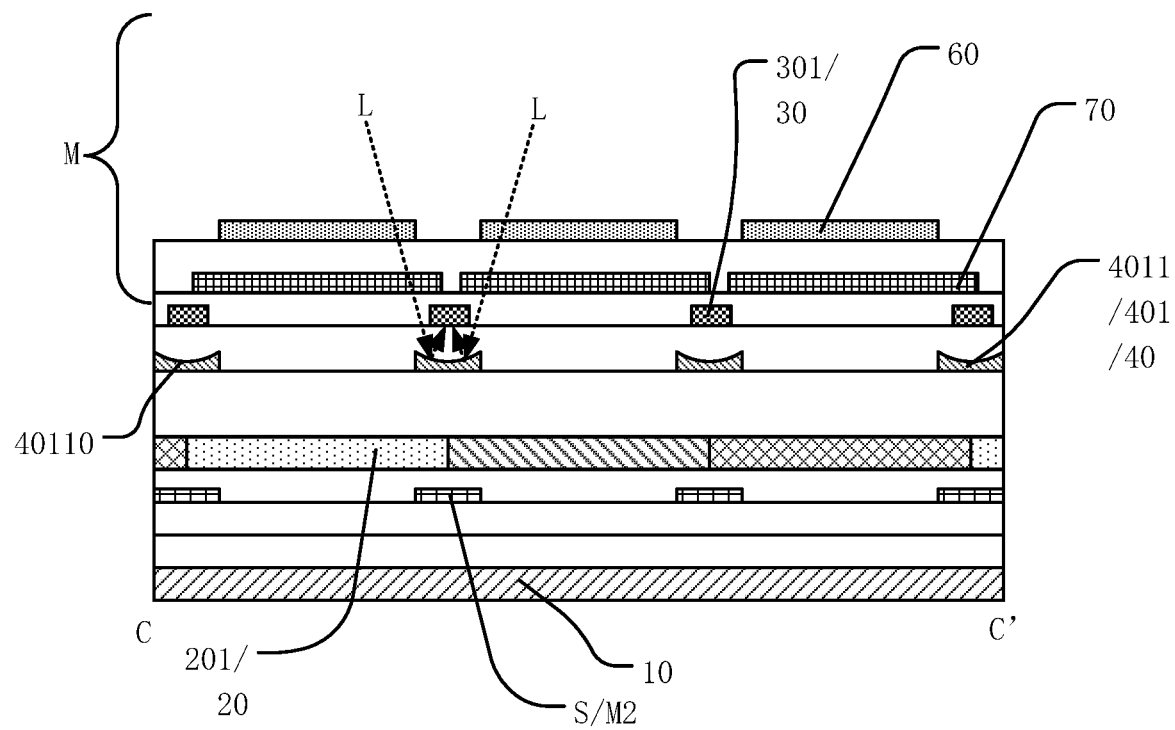
FIG. 9 illustrates a C-C' sectional view of another exemplary array substrate in FIG. 6 consistent with disclosed embodiments of the present disclosure.
Figure 10:
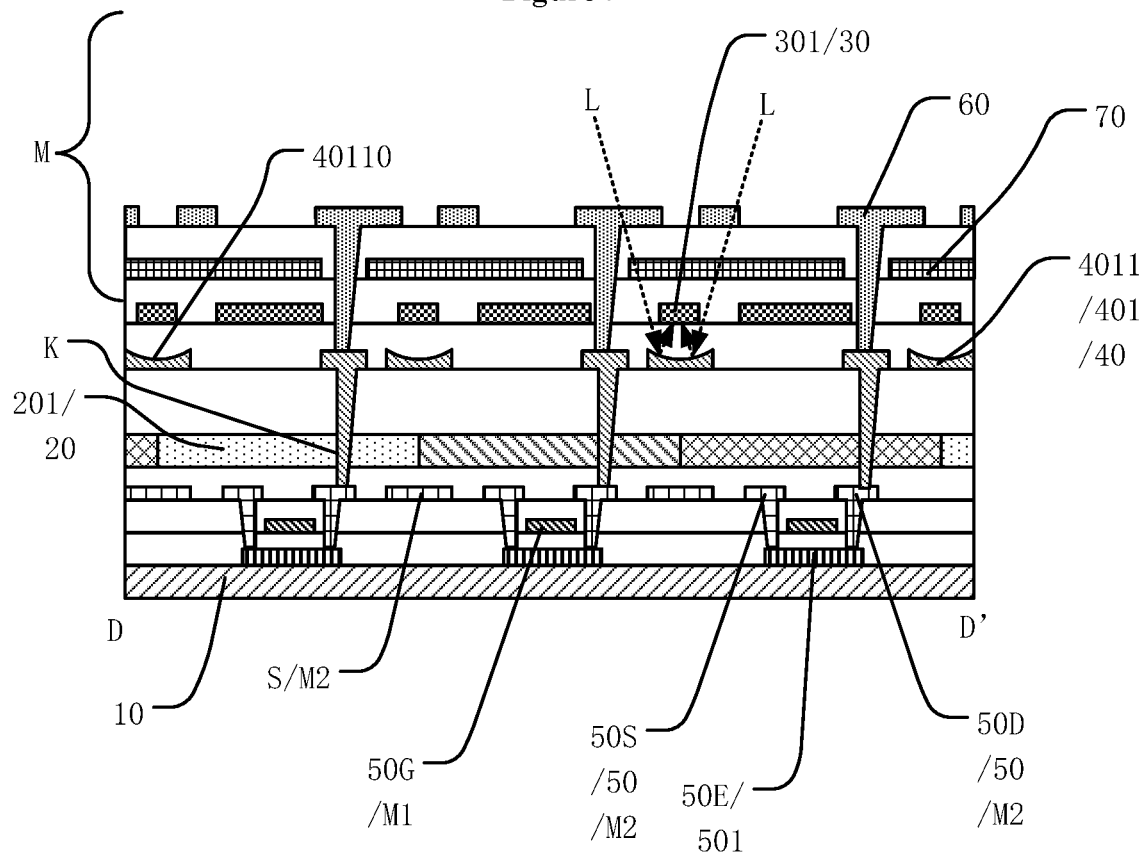
FIG. 10 illustrates a D-D' sectional view of another exemplary array substrate in FIG. 6 consistent with disclosed embodiments of the present disclosure.

The pixel electrode 60 may be disposed on the side of the color resist layer 20 away from the substrate 10. Optionally, the pixel electrode 60 may be disposed on the side of the black matrix layer 30 close to the color resist layer 20 (as shown in FIGS. 7-8). FIG. 9 illustrates a C-C' sectional view of the array substrate in FIG. 6; and FIG. 10 illustrates a D-D' sectional view of the array substrate in FIG. 6. In another embodiment, referring to FIGS. 9-10, the pixel electrode 60 may be disposed on the side of the black matrix layer 30 away from the color resist layer 20. In view of this, the common electrode 70 may be disposed on the side of the black matrix layer 30 away from the color resist layer 20. As long as the black matrix layer 30 is disposed on the side of the first metal layer M1, the second metal layer M2 and any other metal layer away from the substrate 10, and external ambient light is prevented from being irradiated on the metal line of each metal layer to cause the light reflection phenomenon, the disposure of the pixel electrode may not be limited by the present disclosure.

Figure 11:
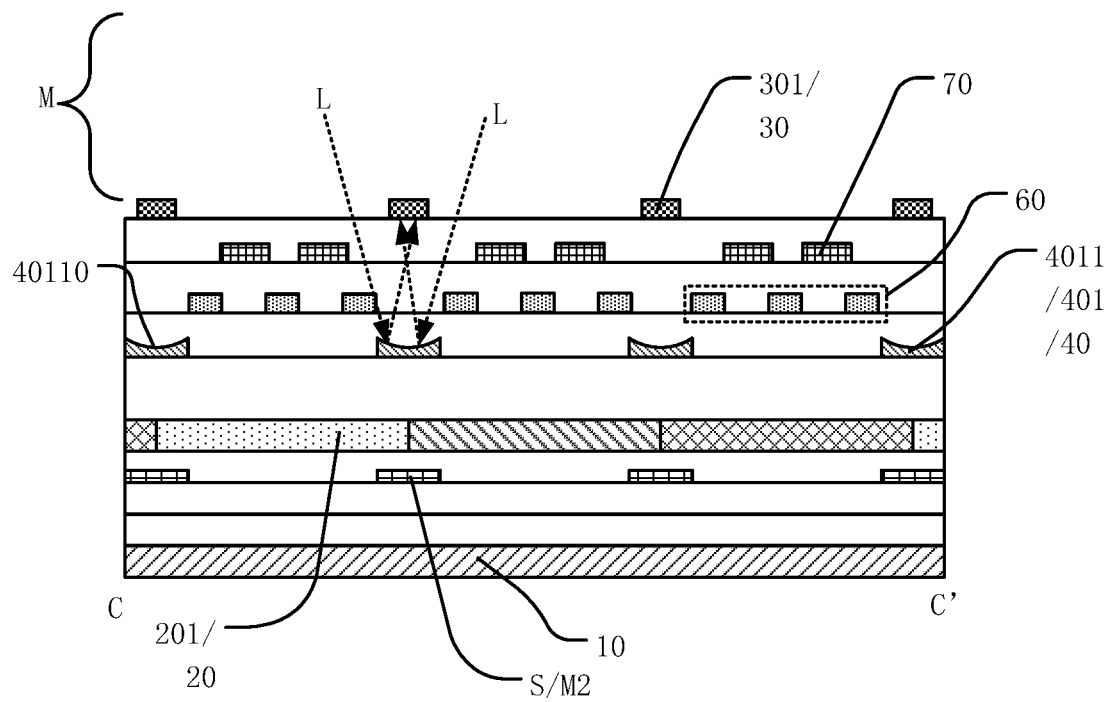
FIG. 11 illustrates a C-C' sectional view of another exemplary array substrate in FIG. 6 consistent with disclosed embodiments of the present disclosure.
Figure 12:
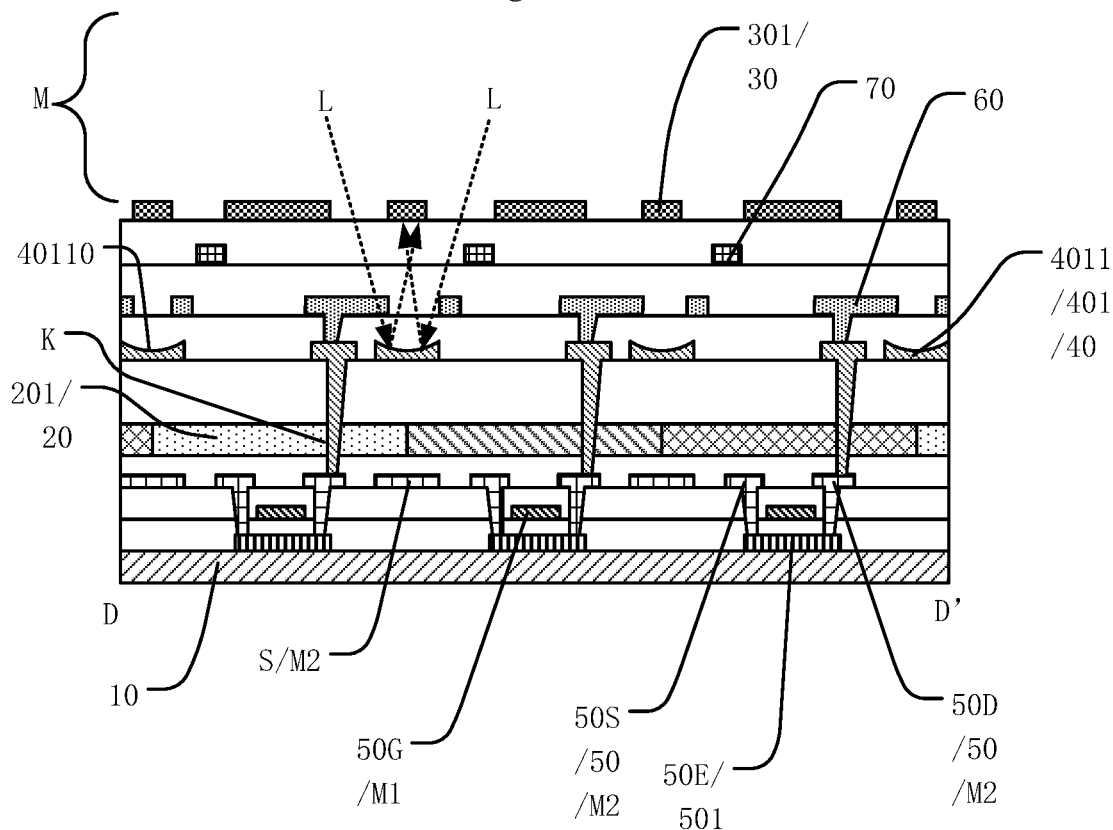
FIG. 12 illustrates a D-D' sectional view of another exemplary array substrate in FIG. 6 consistent with disclosed embodiments of the present disclosure.

In one embodiment, the common electrode 70 may be disposed on the side of the pixel electrode 60 close to the substrate 10 (as shown in FIGS. 7-8). FIG. 11 illustrates a C-C' sectional view of the array substrate in FIG. 6; and FIG. 12 illustrates a D-D' sectional view of the array substrate in FIG. 6. In another embodiment, the common electrode 70 may be disposed on the side of the pixel electrode 60 away from the substrate 10 (as shown in FIG. 11 and FIG. 12). As long as an electric field is formed between the pixel electrode 60 and the common electrode 70, and then the liquid crystal molecules of the liquid crystal layer are deflected under the electric field, thereby controlling whether the light is emitted or not, and achieving display of the display panel, the arrangement of the pixel electrode 60 and the common electrode 70 may not be limited by the present disclosure.

It should be understood that as shown in FIGS. 7-8, when the common electrode is disposed on the side of the pixel electrode 60 close to the substrate 10, the common electrode 70 may have a plurality of block structures (the common electrode 70 may be multiplexed touch-control electrode blocks) or may have a one-piece structure including a plurality of vias (not shown in the figure). The via may be used to electrically connect the pixel electrode 60 to the drain 50D of the thin film transistor 50. Optionally, to better generate a driving electric field between the pixel electrode 60 and the common electrode 70, the pixel electrode 60 may have a comb-shaped structure. In view of this, when the common electrode 70 has a one-piece structure, a common signal may be provided through the common electrode 70 having the one-piece structure. When the common electrode 70 has a plurality of block structures and is multiplexed as touch-control electrode blocks, in the display stage, the common signal may be together provided through a plurality of signal input lines; and in the touch-control stage, touch-control signals may be transmitted through the plurality of signal input lines, respectively, which may not be limited by the present disclosure. Optionally, for illustrative purposes, FIGS. 7-8 may merely illustrate that the common electrode 70 may have a plurality of block structures, and one sub-pixel may correspond to one block structure of the common electrode 70. For specific implementation, one block structure of the common electrode 70 may correspond to a plurality of sub-pixels, which may not be limited by the present disclosure.

When the common electrode is disposed on the side of the pixel electrode 60 away from the substrate 10, the overlapped region between the common electrode 70 and the comb-shaped structure of the pixel electrode 60 may need to have a hollowed-out structure (as shown in FIG. 11). For illustrative purposes, the comb-shaped structure of the pixel electrode 60 may merely be shown in the cross-sectional view, and may not be shown in the top view. When the common electrode is disposed on the side of the pixel electrode 60 away from the substrate 10, the common electrode 70 may have a one-piece structure, while may have a hollowed-out structure in the region overlapped with the pixel electrode 60. Therefore, an electric field may be generated between the pixel electrode 60 and the common electrode 70 for driving the deflection of the liquid crystal molecules. In view of this, the common electrode 70 may not have the via that is used to electrically connect the pixel electrode 60 to the drain 50D of the thin film transistor 50, and the common signal may be provided through the common electrode 70 having the one-piece structure in the display stage.

In another embodiment, referring to FIGS. 11-12, the common electrode 70 may have the plurality of block structures. The common electrode 70 may be multiplexed the touch-control electrode blocks, and in view of this, the overlapped region between the common electrode 70 having the block structures and the pixel electrode 60 may still need to have a hollowed-out structure. When the common electrode 70 has block structures and is multiplexed as touch-control electrode blocks, in the display stage, the common signal may be together provided through a plurality of signal input lines; and in the touch-control stage, touch-control signals may be transmitted through the plurality of signal input lines, respectively, which may not be limited by the present disclosure, and may be determined according to practical applications in specific implementation.

Optionally, when the common electrode 70 has block structures, referring to FIGS. 11-12, one block structure of the common electrode 70 may correspond to one sub-pixel. In another embodiment, one block structure of the common electrode 70 may correspond to a plurality of sub-pixels, which may not be limited by the present disclosure. For illustrative purposes, FIGS. 11-12 may merely illustrate that one block structure of the common electrode 70 corresponds to one sub-pixel as an example. In specific implementation, the quantity of sub-pixels corresponding to one block structure of the common electrode 70 may be determined according to practical applications, and may not be limited by the present disclosure.

It should be noted that FIGS. 6-8 merely exemplary illustrate the structure of the array substrate 000, which may include but may not be limited to the above-mentioned structure, and may further include various insulating film layers. In specific implementation, the structure of the array substrate with the COA structure in the related art may be referred for understanding, which may not be repeated herein.

It should be further explained that when the color resists 201 of the color resist layer 20 in a same direction, such as the second direction Y, are color resists 201 of a same color, the plurality of color resists 201 of the same color in the same direction may be combined into an entire strip structure, to reduce the difficulty of the manufacturing process. A via K may be formed at the required opening position of the entire strip structure, to facilitate the connection between the film layer under the color resist 201 and the film layer above the color resist 201. For example, when the thin film transistor 50 under the color resist 201 is electrically connected to the pixel electrode 60 above the color resist 201, the color resist 201 having the entire strip structure may have the via K. Optionally, the position of the via K of the color resist 201 having the entire strip structure may overlap the position of the via that electrically connects the drain 50D of the thin film transistor 50 to the pixel electrode 60, which may avoid forming the via in the insulating film layer at different positions of the array substrate 000 to affect the display effect.

In certain embodiments, referring to FIGS. 6-8, a third metal layer M3 may be disposed between the color resist layer 20 and the black matrix layer 30. The active layer 501, the first metal layer M1, and the second metal layer M2 may be disposed between the third metal layer M3 and the substrate 10. The third metal layer M3 may include a plurality of first touch-control signal lines TP1, and at least a portion of the first touch-control signal line TP1 may be multiplexed as the reflection portion 4011.

In the array substrate 000, the third metal layer M3 may be disposed between the color resist layer 20 and the black matrix layer 30. The third metal layer M3 may be configured for disposing the first touch-control signal line TP1. When the common electrode 70 is multiplexed as a touch-control electrode, the first touch-control signal line TP1 may be electrically connected to the common electrode 70 (not shown in the Figure, and the specific connection structure may be understood with reference to the connection structure in the touch-control display panel), to transmit the touch-control signal for the common electrode 70, thereby achieving the touch-control function when the array substrate 000 is used in a touch-control display panel.

The third metal layer M3 including the plurality of first touch-control signal lines TP1 may be disposed between the color resist layer 20 and the black matrix layer 30, the first touch-control signal line TP1 may often be extended along the second direction Y to a step region of the array substrate 000 (electrically connected to the driving chip), and the third metal layer M3 may be made of a metal material with a reflective effect. Therefore, in the disclosed embodiments, at least a portion of the first touch-control signal line TP1 may be multiplexed as the reflection portion 4011. By making at least a portion of the first touch-control signal line TP1 have the structure of the reflection portion 4011 (the recessed structure of the first surface 40110), the first light L may be converged to the light-shielding strip 301 by the first surface 40110 of the at least the portion of the first touch-control signal line TP1 (the reflection portion 4011), and may be absorbed by the black light-shielding strip 301, thereby avoiding the light leakage. Further, the orthographic projection of at least a portion of the light-shielding strip 301 on the substrate 10 may be located within the orthographic projection of the first touch-control signal line TP1 on the substrate 10. In other words, the width W1 of the orthographic projection of the at least portion of the light-shielding strip 301 on the substrate 10 may be smaller than the width W2 of the orthographic projection of the first touch-control signal line TP1 on the substrate 10. In other words, the light-shielding strip 301 of the black matrix layer 30 may be set substantially narrow (as shown in FIGS. 7-8), which may increase the aperture ratio and facilitate to improve the display quality without causing light leakage.

In addition, because the structure of the at least portion of the first touch-control signal line TP1 in the array substrate 000 is multiplexed as the reflection portion 4011, the array substrate 000 may not need additional film layer to form the reflection portion 4011, which may facilitate the thinning of the array substrate 000 and may facilitate to realize the thinning of the display panel.

The at least portion of the first touch-control signal line TP1 may be multiplexed as the reflection portion 4011. In one embodiment, among the plurality of first touch-control signal lines TP1 in the array substrate 000, a certain amount of the first touch-control signal lines TP1 may be multiplexed as the reflection portion 4011, or the entire first touch-control signal lines TP1 may be multiplexed as the reflection portion 4011. In another embodiment, among a certain amount of the first touch-control signal lines TP1, partial segments of a same one first touch-control signal line TP1 may be multiplexed as the reflection portion 4011 (partial segments of the first touch-control signal line TP1 may be made into a recessed structure of the first surface 40110). In certain embodiments, among the entire first touch-control signal lines TP1, partial segments of a same one first touch-control signal line TP1 may be multiplexed as the reflection portion 4011. The structure of the first touch-control signal line TP1 may be determined according to practical applications, and may not be limited by the present disclosure.

It should be understood that when the common electrode 70 is used as a touch-control electrode, the first touch-control signal lines TP1 electrically connected to a same one common electrode 70 may include an actual touch-control signal line and a virtual touch-control signal line. Both the actual touch-control signal line and the virtual touch-control signal line may be located in the third metal layer M3. The virtual touch-control signal line may not be connected to the driving chip, and each common electrode 70 used as the touch-control electrode may be connected to the driving chip through the actual touch-control signal line for transmitting the touch-control detection signal. The virtual touch-control signal line may often be used to reduce the resistance difference and capacitance difference between the common electrodes 70 used as touch-control electrodes to ensure touch-control accuracy.

In one embodiment, the specific structure of the first touch-control signal line TP1 including the actual touch-control signal line and the virtual touch-control signal line may not be described in detail, which may be understood with reference to the touch-control structure in the related art. At least portion of the first touch-control signal line TP1 multiplexed as the reflection portion 4011 may be an actual touch-control signal line or a virtual touch-control signal line, which may not be limited by the present disclosure, and may be determined according to practical applications in specific implementation.

It should be noted that for illustrative purposes, FIGS. 7-8 illustrate that the second metal layer M2 may be disposed on the side of the color resist layer 20 close to the substrate 10 as an example. In another embodiment, the second metal layer M2 may be disposed on the side of the color resist layer 20 away from the substrate 10. As long as the active layer 501, the first metal layer M1, and the second metal layer M2 are disposed between the third metal layer M3 and the substrate 10, the disposure position of the second metal layer M2 may not be limited by the present disclosure.

It should be understood that because the drain 50D of the thin film transistor 50 in the second metal layer M2 needs to be electrically connected to the pixel electrode 60, to prevent the via for electrically connecting the drain 50D and the pixel electrode 60 from being too deep, a lap portion D1 (as shown in FIG. 8) for achieving electrical connection between the drain 50D of the thin film transistor 50 and the pixel electrode 60 may be disposed in the third metal layer M3. In other words, the drain 50D of the thin film transistor 50 may be first connected to the lap portion D1 of the third metal layer M3 through a shallow via, and then the lap portion D1 of the third metal layer M3 may be connected to the pixel electrode 60 through another shallow via, to achieve the electrical connection between the drain 50D of the thin film transistor 50 and the pixel electrode 60, which may facilitate to reduce the difficulty of the manufacturing process and to improve the display quality.

Figure 13:
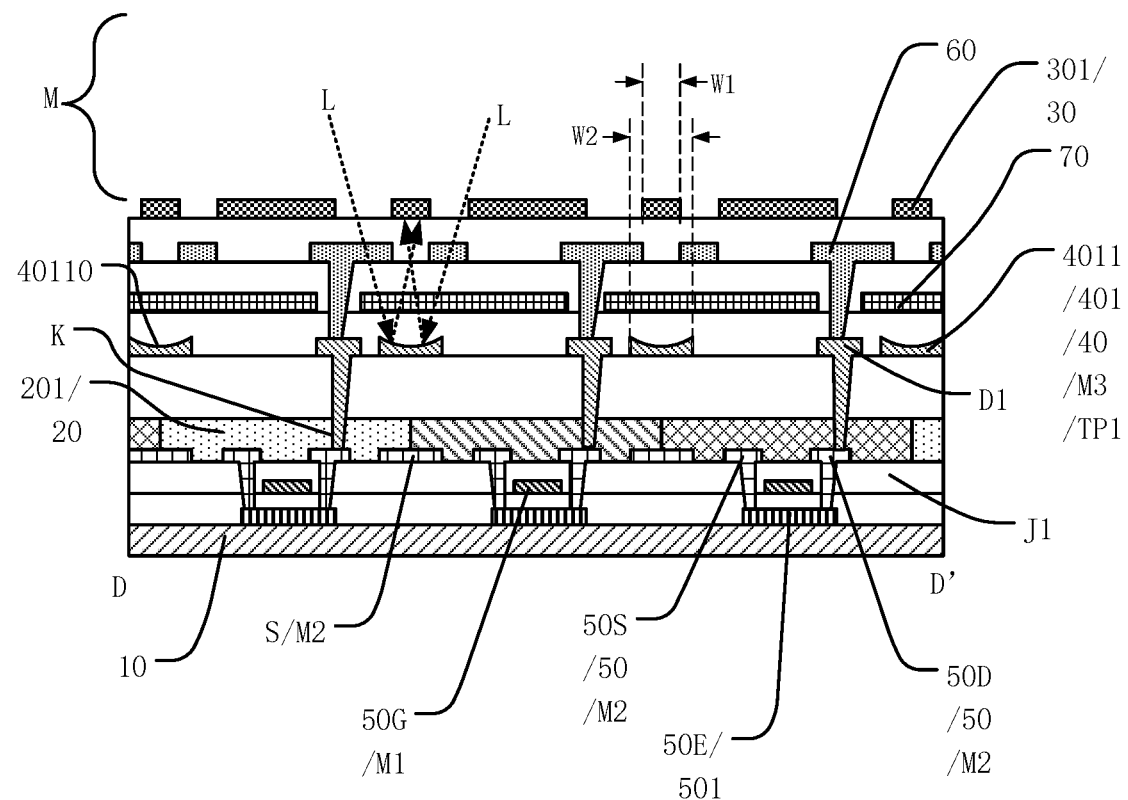
FIG. 13 illustrates a D-D' sectional view of another exemplary array substrate in FIG. 6 consistent with disclosed embodiments of the present disclosure.
Figure 14:
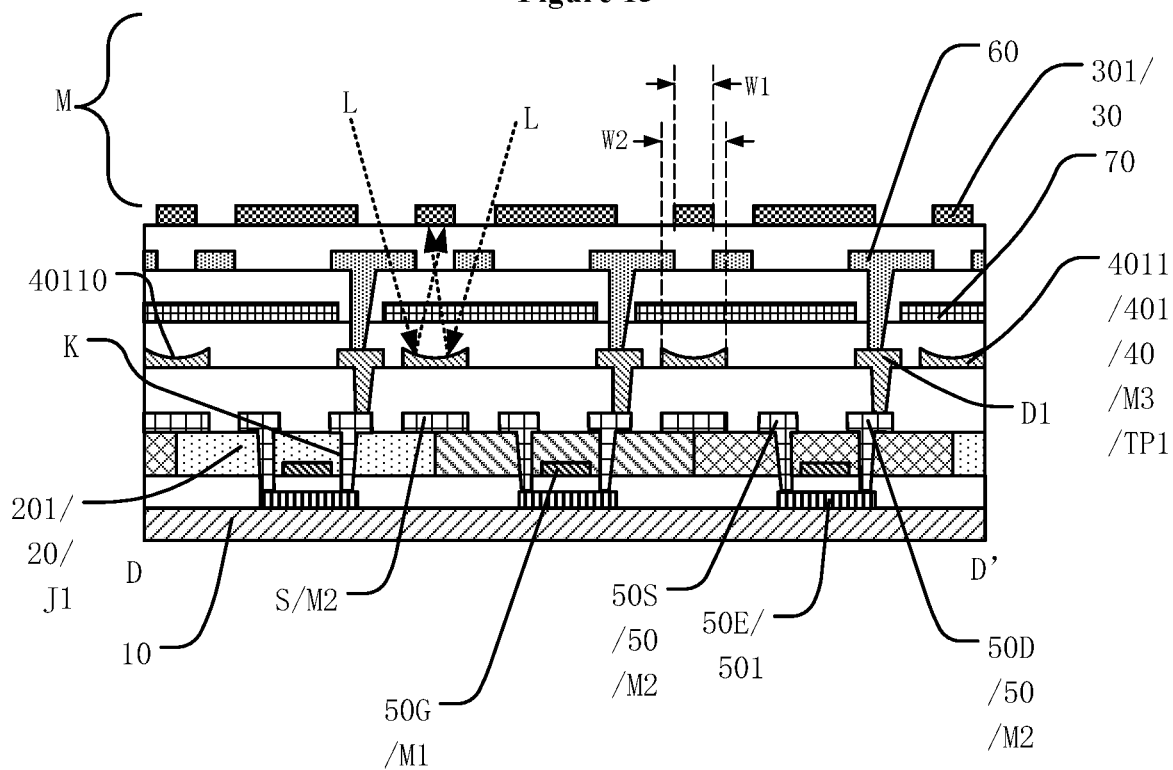
FIG. 14 illustrates a D-D' sectional view of another exemplary array substrate in FIG. 6 consistent with disclosed embodiments of the present disclosure.

FIG. 13 illustrates another D-D' sectional view of the array substrate in FIG. 6, and FIG. 14 illustrates another D-D' sectional view of the array substrate in FIG. 6. In certain embodiments, referring to FIG. 6 and FIGS. 13-14, a first insulating layer J1 may be disposed between the first metal layer M1 and the second metal layer M2, and the second metal layer M2 may be attached to and in contact with the color resist layer 20.

In one embodiment, the array substrate 000 may further include a plurality of insulating layers for insulating two conductive film layers from each other. At least the first insulating layer J1 may be disposed between the first metal layer M1 and the second metal layer M2. The second metal layer M2 may be attached to and in direct contact with the color resist layer 20. In other words, the color resist layer may serve as an insulating layer between the second metal layer M2 and any other conductive film layer while having the light filtering effect of the color resist 201. Therefore, there may be no need to dispose an additional insulating layer between the second metal layer M2 and any other conductive film layer, which may facilitate thinning of the array substrate 000.

Optionally, in one embodiment, the second metal layer M2 may be disposed on the side of the color resist layer 20 close to the substrate 10 (as shown in FIG. 13). In other words, the first metal layer M1, the active layer 501, and the second metal layer M2 may be disposed between the color resist layer 20 and the substrate 10. The first metal layer M1 may be disposed on the side of the active layer 501 close to the substrate 10 (the thin film transistor 50 may be a transistor with a bottom gate structure, not shown in the Figure). Alternatively, the first metal layer M1 may be disposed on the side of the active layer 501 away from the substrate 10 (as shown in FIG. 13, the thin film transistor 50 may be a transistor with a top gate structure).

In view of this, both the first metal layer M1 and the second metal layer M2 may be disposed between the color resist layer 20 and the substrate 10, and the second metal layer M2 may be disposed on the side of the first metal layer M1 close to the color resist layer 20. At least the first insulating layer J1 may be disposed between the first metal layer M1 and the second metal layer M2 to insulate the two metal conductive layers. The side of the second metal layer M2 away from the first metal layer M1 may be attached to and in direct contact with the color resist layer 20. In other words, after the second metal layer M2 is formed and patterned, the color resist 201 of the color resist layer 20 may be directly formed on the top of the second metal layer M2. The color resist layer 20 may be made of an insulating material. Therefore, the color resist layer 20 may insulate the second metal layer M2 from any other conductive film layer over the color resist layer 20 (e.g., the second metal layer M3 or any other conductive film layer) while having the light filtering effect of the color resist 201. Further, because the color resist layer 20 needs to have the structure of the color resist 201, a thickness of the color resist layer 20 may be substantially large, which may facilitate to weaken the signal coupling between the second metal layer M2 and any other conductive film layer, thereby improving the display quality.

Optionally, in one embodiment, the second metal layer M2 may be disposed on the side of the color resist layer 20 away from the substrate 10 (as shown in FIG. 14). In other words, the first metal layer M1 and the active layer 501 may be disposed between the color resist layer 20 and the substrate 10, and the second metal layer M2 may be disposed between the color resist layer 20 and the black matrix layer 30. The first metal layer M1 may be disposed on the side of the active layer 501 close to the substrate 10 (the thin film transistor 50 may be a transistor with a bottom gate structure, not shown in the Figure). Alternatively, the first metal layer M1 may be disposed on the side of the active layer 501 away from the substrate 10 (as shown in FIG. 14, the thin film transistor 50 may be a transistor with a top gate structure).

In view of this, the second metal layer M2 may be disposed on the side of the color resist layer 20 away from the substrate 10, and the side of the second metal layer M2 close to the first metal layer M1 may be attached to and in direct contact with the color resist layer 20. In other words, after the color resist 201 of the color resist layer 20 is formed, the second metal layer M2 may be directly formed on the top of the color resist layer 20. The color resist layer 20 may be made of an insulating material. Therefore, the color resist layer 20 may insulate the second metal layer M2 from the first metal layer M1 while having the light filtering effect of the color resist 201.

In addition, the side of the first metal layer M1 facing towards the second metal layer M2 may be attached to and in direct contact with the color resist layer 20. In other words, after the first metal layer M1 is formed and patterned, the color resist layer 20 may be directly formed on the top of the first metal layer M1. The color resist layer 20 may be multiplexed as the first insulating layer J1 between the first metal layer M1 and the second metal layer M2, thereby further reducing the thickness of the array substrate 000. Further, because the color resist layer 20 needs to have the structure of the color resist 201, a thickness of the color resist layer 20 may often be substantially large, which may facilitate to weaken the signal coupling between the second metal layer M2 and the first metal layer M1, thereby improving the display quality.

Figure 15:
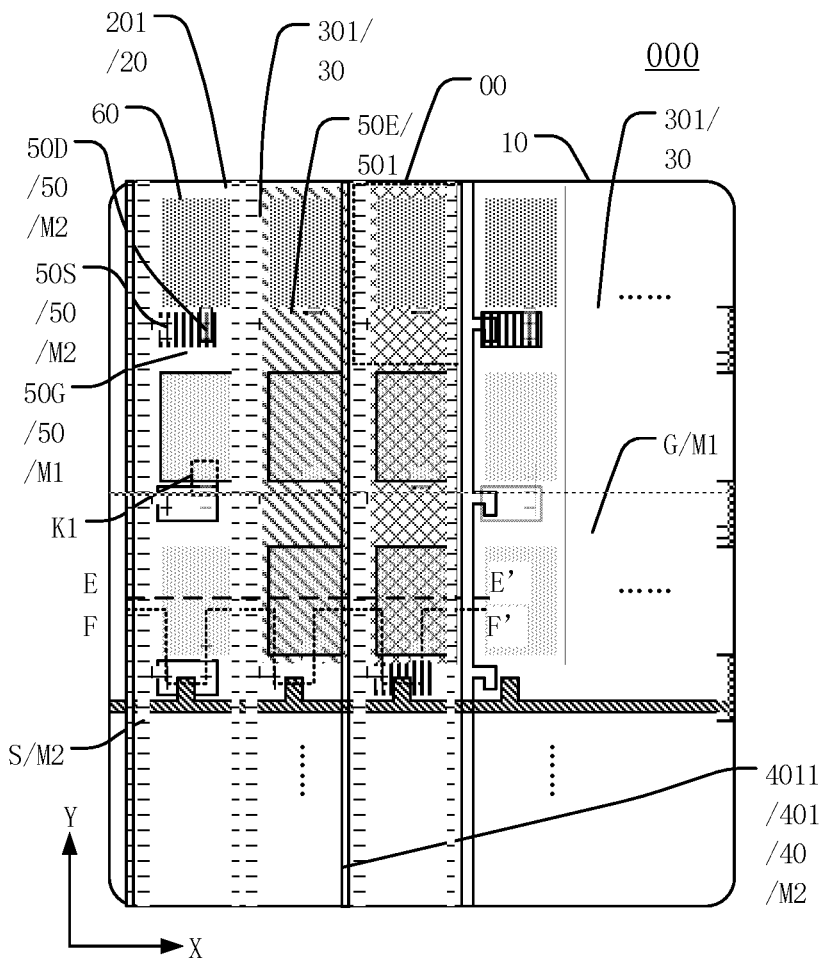
FIG. 15 illustrates a schematic top view of another exemplary array substrate consistent with disclosed embodiments of the present disclosure.
Figure 16:
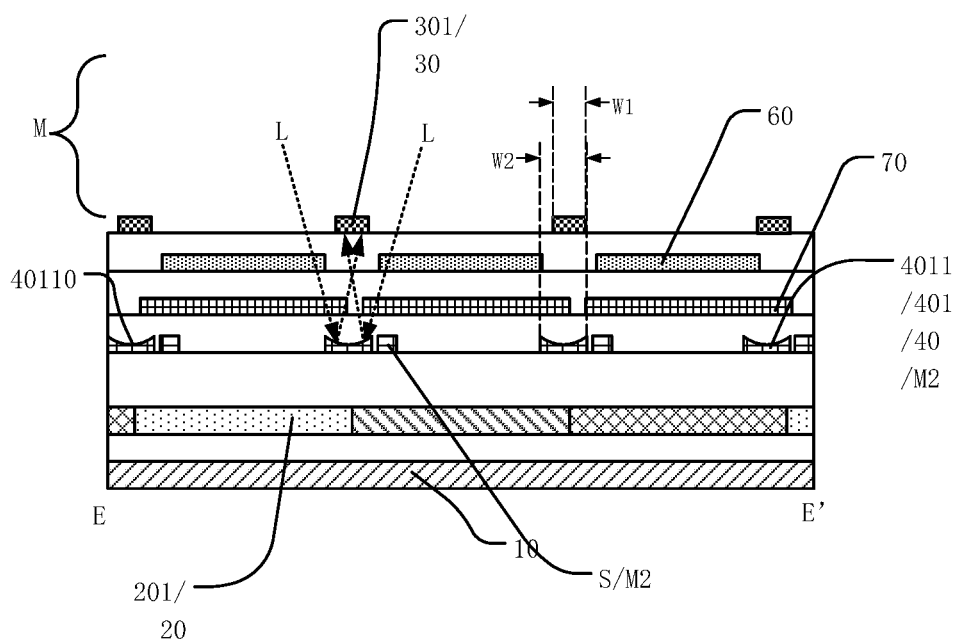
FIG. 16 illustrates a E-E' sectional view of another exemplary array substrate in FIG. 15 consistent with disclosed embodiments of the present disclosure.
Figure 17:
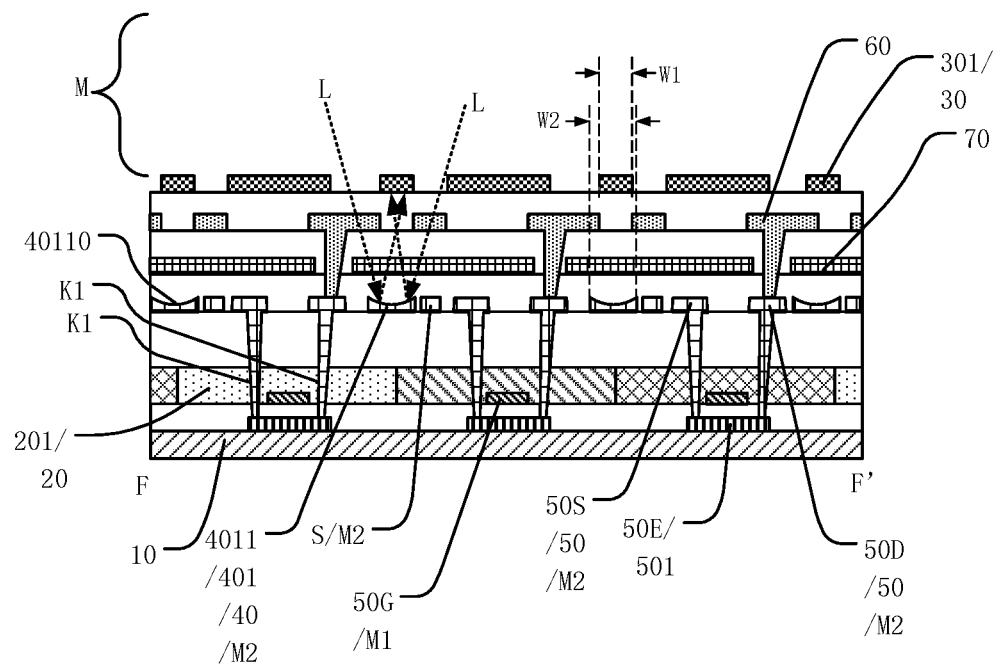
FIG. 17 illustrates a F-F' sectional view of another exemplary array substrate in FIG. 15 consistent with disclosed embodiments of the present disclosure.

FIG. 15 illustrates a schematic top view of another array substrate consistent with disclosed embodiments of the present disclosure; FIG. 16 illustrates a E-E' sectional view of the array substrate in FIG. 15; and FIG. 17 illustrates a F-F' sectional view of the array substrate in FIG. 15. For illustrative purposes, a transparency filling may be performed in FIG. 15. In certain embodiments, referring to FIGS. 15-17, the second metal layer M2 of the array substrate 000 may be disposed on the side of the color resist layer 20 away from the substrate 10, and the active layer 501 and the first metal layer M1 may be disposed between the substrate 10 and the second metal layer M2.

The color resist 201 may include a first via K1, and each of the source 50S and the drain 50D of the thin film transistor 50 may be electrically connected to the active portion 50E through the first via K1. The reflection portion 4011 may be formed in a same layer and made of a same material as the second metal layer M2.

The second metal layer M2 of the array substrate 000 may be disposed on the side of the color resist layer 20 away from the substrate 10. In other words, the color resist layer 20 may be disposed between the second metal layer M2 and the first metal layer M1. In view of this, the reflection portion 4011 disposed between the color resist layer 20 and the black matrix layer 30 may be formed in a same layer and made of a same material as the second metal layer M2. In other words, the reflection portion 4011 may be made of the material of the second metal layer M2, which may facilitate to reduce the overall thickness of the array substrate 000.

When the second metal layer M2 is disposed on the side of the color resist layer 20 away from the substrate 10, because the active layer 501 and the first metal layer M1 are disposed between the substrate 10 and the second metal layer M2, in one embodiment, the active layer 501 and the first metal layer M1 may be disposed between the color resist layer 20 on the side of the second metal layer M2 close to the substrate 10 and the substrate 10. Therefore, the source 50S and the drain 50D of the thin film transistor 50 may be electrically connected to the active portion 50E through the color resist layer 20 where the color resist 201 is located. In other words, the color resist 201 of the color resist layer 20 may include the first via K1 penetrating through the color resist layer 20 along a thickness direction, and each of the source 50S and the drain 50D of the thin film transistor 50 may be electrically connected to the active portion 50E through the first via K1.

It should be noted that the preset disclosure merely illustrates that the second metal layer M2 may be disposed on the side of the color resist layer 20 away from the substrate 10, and any other film layer, such as the third metal layer M3, etc., may be disposed on the side of the color resist layer 20 away from the substrate 10. As long as the second metal layer M2 is disposed on the side of the color resist layer 20 away from the substrate 10, and the reflection portion 4011 on the side of the color resist layer 20 away from the substrate 10 for reflecting and converging the first light L is formed in a same layer and made of a same material as the second metal layer M2, the disposure of the second metal layer may not be limited by the present disclosure.

The first metal layer M1 and the active layer 501 may be disposed on the side of the color resist layer 20 close to the substrate 10. In one embodiment, the first metal layer M1 may be disposed on the side of the active layer 501 close to the substrate 10 (the thin film transistor 50 may be a transistor with a bottom gate structure, not shown in the Figure). In another embodiment, the first metal layer M1 may be disposed on the side of the active layer 501 away from the substrate 10 (as shown in FIG. 17, the thin film transistor 50 may be a transistor with a top gate structure), which may not be limited by the present disclosure.

Figure 18:
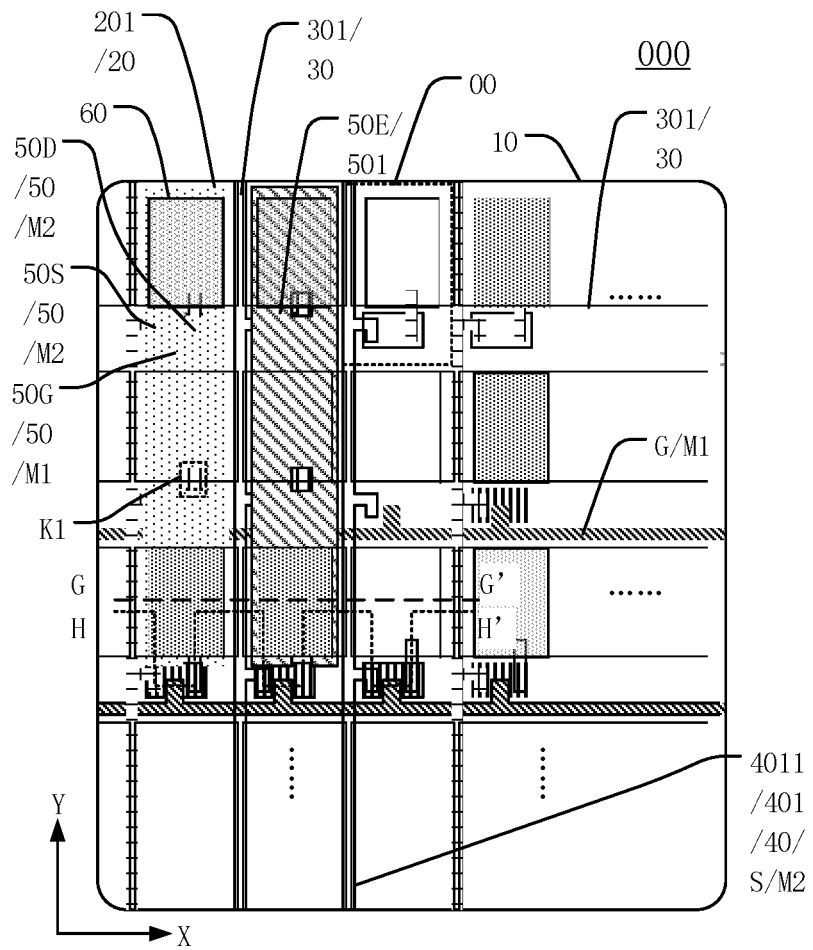
FIG. 18 illustrates a schematic top view of another exemplary array substrate consistent with disclosed embodiments of the present disclosure.
Figure 19:
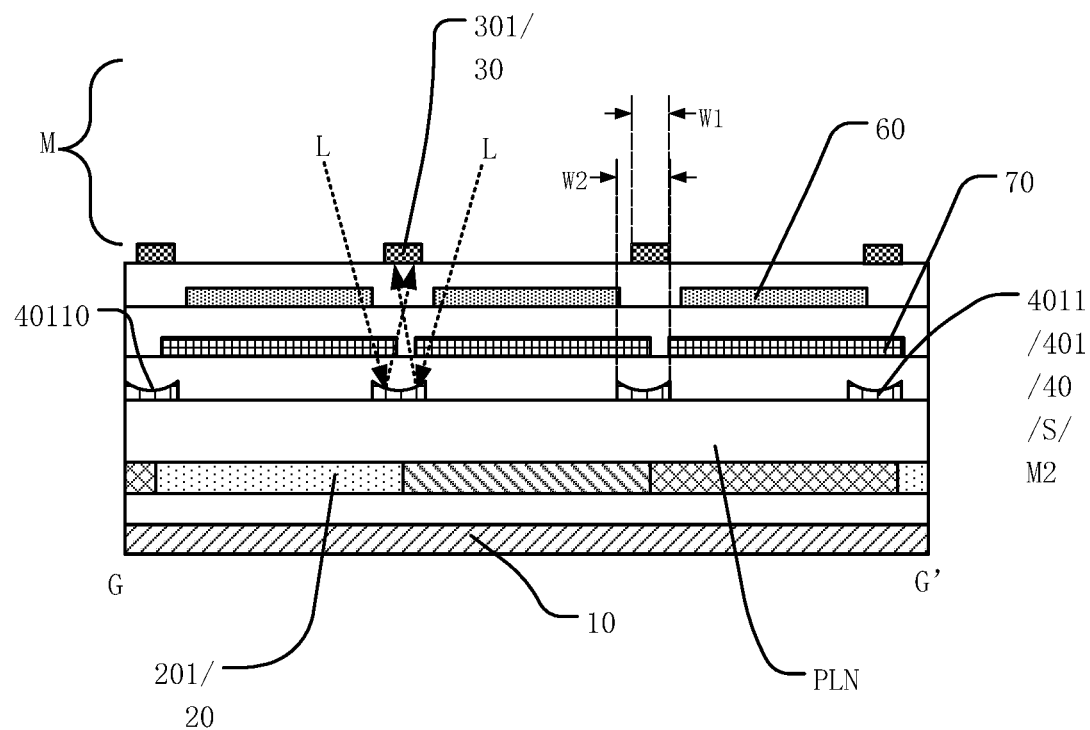
FIG. 19 illustrates a G-G' sectional view of another exemplary array substrate in FIG. 18 consistent with disclosed embodiments of the present disclosure.
Figure 20:
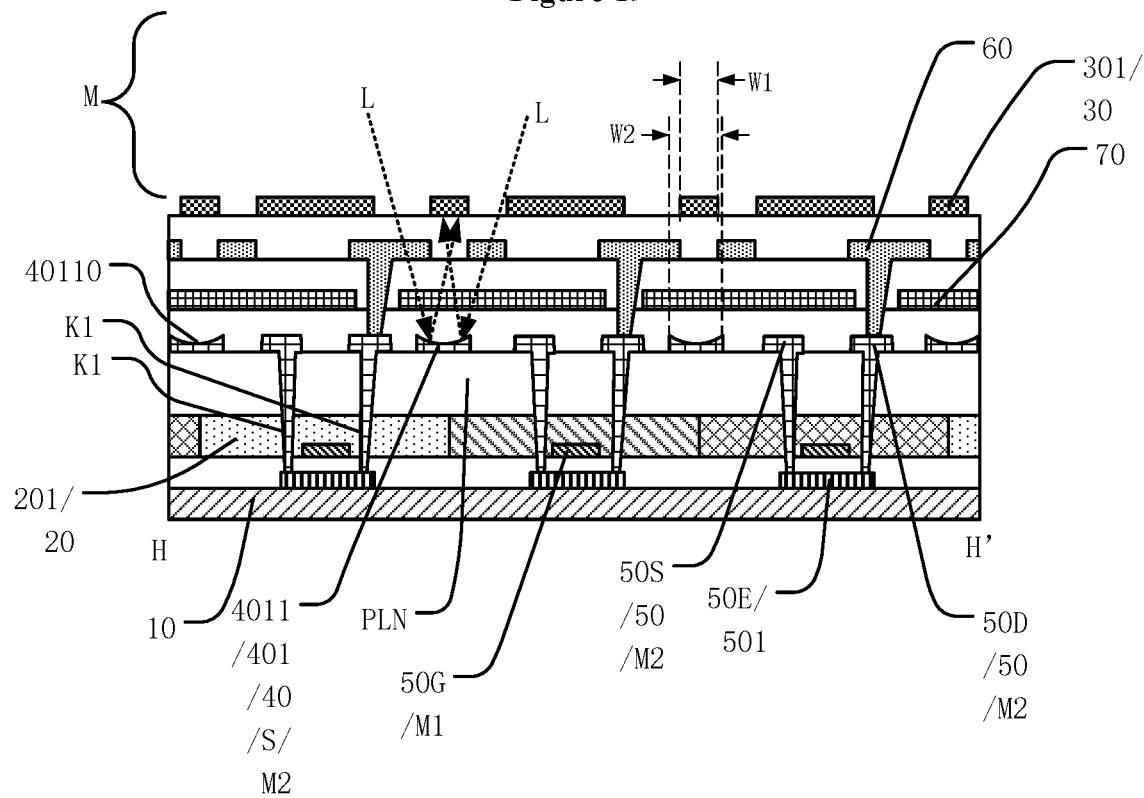
FIG. 20 illustrates a H-H' sectional view of another exemplary array substrate in FIG. 18 consistent with disclosed embodiments of the present disclosure.

FIG. 18 illustrates a schematic top view of another array substrate consistent with disclosed embodiments of the present disclosure; FIG. 19 illustrates a G-G' sectional view of the array substrate in FIG. 18; and FIG. 20 illustrates a H-H' sectional view of the array substrate in FIG. 18. For illustrative purposes, a transparency filling may be performed in FIG. 18. In certain embodiments, referring to FIGS. 18-20, the second metal layer M2 of the array substrate 000 may be disposed on the side of the color resist layer 20 away from the substrate 10, and the active layer 501 and the first metal layer M1 may be disposed between the substrate 10 and the second metal layer M2.

The color resist 201 may include the first via K1, and each of the source 50S and the drain 50D of the thin film transistor 50 may be electrically connected to the active portion 50E through the first via K1. The reflection portion 4011 may be formed in a same layer and made of a same material as the second metal layer M2, and at least a portion of the data lines S may be multiplexed as the reflection portion 4011.

The second metal layer M2 of the array substrate 000 may be disposed on the side of the color resist layer 20 away from the substrate 10. In other words, the color resist layer 20 may be disposed between the second metal layer M2 and the first metal layer M1. In view of this, the reflection portion 4011 disposed between the color resist layer 20 and the black matrix layer 30 may be formed in a same layer and made of a same material as the second metal layer M2. Further, the portion of the data lines S in the second metal layer M2 may be directly multiplexed as the reflection portion 4011, which may facilitate to reduce the overall thickness of the array substrate 000, may facilitate to reduce the quantity of layout structures of the second metal layer M2, may facilitate to increase the layout space of the second metal layer M2, may avoid the occurrence of short-circuit phenomenon between different structures of the second metal layer M2, and may facilitate to improve the product yield.

When the second metal layer M2 is disposed on the side of the color resist layer 20 away from the substrate 10, because the active layer 501 and the first metal layer M1 are disposed between the substrate 10 and the second metal layer M2, in one embodiment, the active layer 501 and the first metal layer M1 may be disposed between the color resist layer 20 on the side of the second metal layer M2 close to the substrate 10 and the substrate 10. Therefore, the source 50S and the drain 50D of the thin film transistor 50 may be electrically connected to the active portion 50E through the color resist layer 20 where the color resist 201 is located. In other words, the color resist 201 of the color resist layer 20 may include the first via K1 penetrating through the color resist layer 20 along a thickness direction, and each of the source 50S and the drain 50D of the thin film transistor 50 may be electrically connected to the active portion 50E through the first via K1.

It should be noted that the preset disclosure merely illustrates that the second metal layer M2 may be disposed on the side of the color resist layer 20 away from the substrate 10, and any other film layer, such as the third metal layer M3, etc., may be disposed on the side of the color resist layer 20 away from the substrate 10. As long as the second metal layer M2 is disposed on the side of the color resist layer 20 away from the substrate 10, and the reflection portion 4011 on the side of the color resist layer 20 away from the substrate 10 for reflecting and converging the first light L is formed in a same layer and made of a same material as the at least portion of the data lines of the second metal layer M2, the disposure of the second metal layer M2 may not be limited by the present disclosure.

The first metal layer M1 and the active layer 501 may be disposed on the side of the color resist layer 20 close to the substrate 10. In one embodiment, the first metal layer M1 may be disposed on the side of the active layer 501 close to the substrate 10 (the thin film transistor 50 may be a transistor with a bottom gate structure, not shown in the Figure). In another embodiment, the first metal layer M1 may be disposed on the side of the active layer 501 away from the substrate 10 (as shown in FIG. 20, the thin film transistor 50 may be a transistor with a top gate structure), which may not be limited by the present disclosure.

Optionally, the at least portion of the data lines S may be multiplexed as the reflection portion 4011. In one embodiment, among the plurality of data lines S in the array substrate 000, a certain amount of the data lines S may be multiplexed as the reflection portion 4011, or the entire data lines S may be multiplexed as the reflection portion 4011. In another embodiment, among a certain amount of the data lines S, partial segments of a same one data line S may be multiplexed as the reflection portion 4011 (partial segments of the data line S may be made into a recessed structure of the first surface 40110). In certain embodiments, among the entire data lines S, partial segments of a same one data line S may be multiplexed as the reflection portion 4011. The structure of the data lines S may be determined according to practical applications, and may not be limited by the present disclosure.

In certain embodiments, referring to FIGS. 18-20, a planarization layer PLN may be disposed between the black matrix layer 30 and the color resist layer 20. The present disclosure may explain that the planarization layer PLN may be disposed between the black matrix layer 30 and the color resist layer 20 in the array substrate 000. The planarization layer PLN may be configured to improve the planarization degree of the formation surfaces of the common electrode 70 and the pixel electrode 60.

Optionally, referring to FIGS. 18-20, the planarization layer PLN may be disposed on the side of the second metal layer M2 close to the color resist layer 20. In other words, at least the planarization layer PLN and the color resist layer 20 may be disposed between the second metal layer M2 and the first metal layer M1, thereby facilitating to reduce the signal coupling between the first metal layer M1 and the second metal layer M2.

It should be understood that when the second metal layer M2 is disposed on the side of the color resist layer 20 away from the substrate 10, the positions of the common electrode 70 and the pixel electrode 60 may refer to FIGS. 11-12, where the common electrode 70 may be located on the side of the pixel electrode 60 away from the substrate 10, or may refer to FIGS. 19-20 where the common electrode 70 may be disposed on the side of the pixel electrode 60 close to the substrate 10, which may not be limited by the present disclosure.

Figure 21:
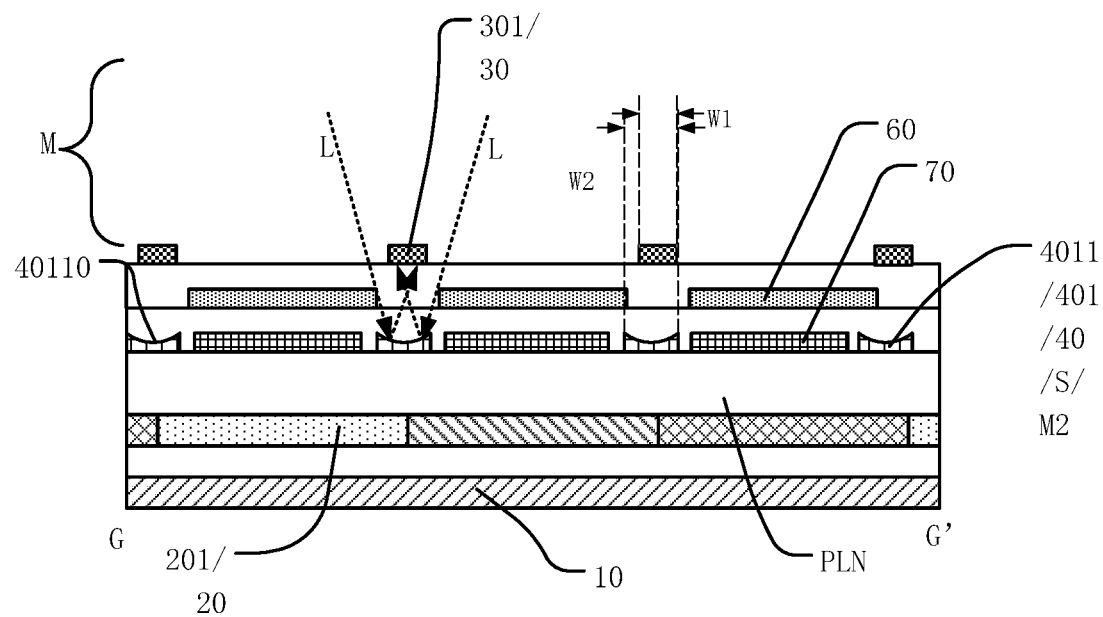
FIG. 21 illustrates a G-G' sectional view of another exemplary array substrate in FIG. 18 consistent with disclosed embodiments of the present disclosure.
Figure 22:
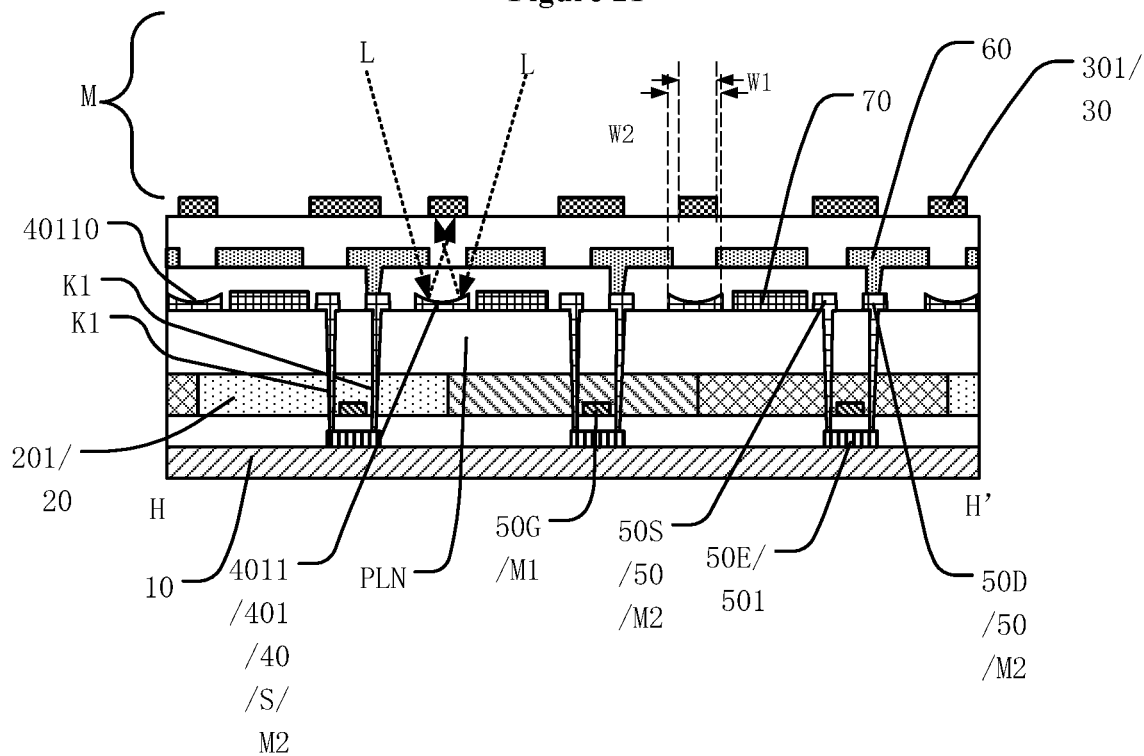
FIG. 22 illustrates a H-H' sectional view of another exemplary array substrate in FIG. 18 consistent with disclosed embodiments of the present disclosure.

FIG. 21 illustrates another G-G' sectional view of the array substrate in FIG. 18; and FIG. 22 illustrates another H-H' sectional view of the array substrate in FIG. 18. Further, in one embodiment, referring to FIG. 18 and FIGS. 21-22, the planarization layer PLN may be disposed on the side of the second metal layer M2 close to the color resist layer 20. In other words, a surface of the planarization layer PLN away from the substrate 10 may have a desired planarization degree, and the common electrode 70 may be disposed on the side of the pixel electrode 60 close to the substrate 10. The common electrode 70 and the second metal layer M2 may be disposed in a same layer.

The present disclosure may explain that when the second metal layer M2 is disposed on the side of the color resist layer 20 away from the substrate 10, and the planarization layer PLN is disposed on the side of the second metal layer M2 close to the color resist layer 20, because the surface of the planarization layer PLN away from the substrate 10 has a desired planarization degree, the common electrode 70 may be directly disposed on the surface of the planarization layer PLN away from the substrate 10. Therefore, the common electrode 70 and the second metal layer M2 may be formed in a same layer and made of different materials, thereby further reducing the overall thickness of the array substrate 000, and facilitating the thinning of the panel.

It should be understood that after the planarization layer PLN is formed, the second metal layer M2 may be first formed on the surface of the planarization layer PLN away from the substrate 10 and may be patterned, then the common electrode 70 may be formed on the surface of the planarization layer PLN away from the substrate 10. In another embodiment, after the planarization layer PLN is formed, the common electrode 70 may be first formed on the surface of the planarization layer PLN away from the substrate 10 and may be patterned, then the second metal layer M2 may be formed on the surface of the planarization layer PLN away from the substrate 10 and may be patterned. As long as the common electrode 70 and the second metal layer M2 are formed in a same layer and made of different materials, and the common electrode 70 and the data lines S of the second metal layer M2 are insulated from each other, the disposure of the common electrode 70 and the second metal layer M2 may not be limited by the present disclosure.

Figure 23:
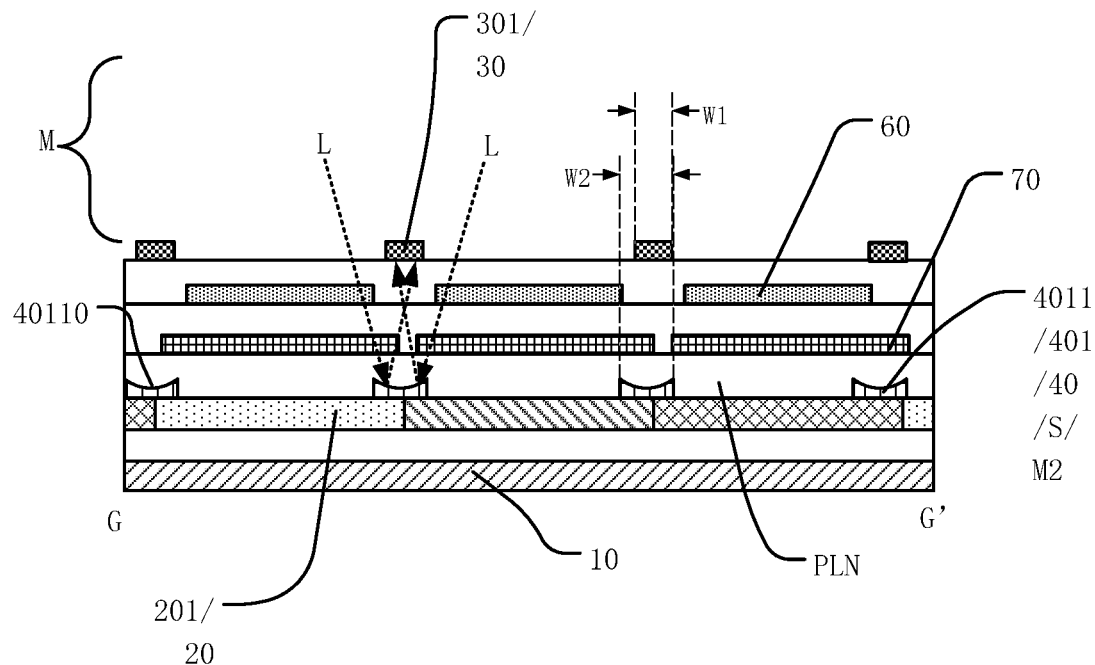
FIG. 23 illustrates a G-G' sectional view of another exemplary array substrate in FIG. 18 consistent with disclosed embodiments of the present disclosure.
Figure 24:
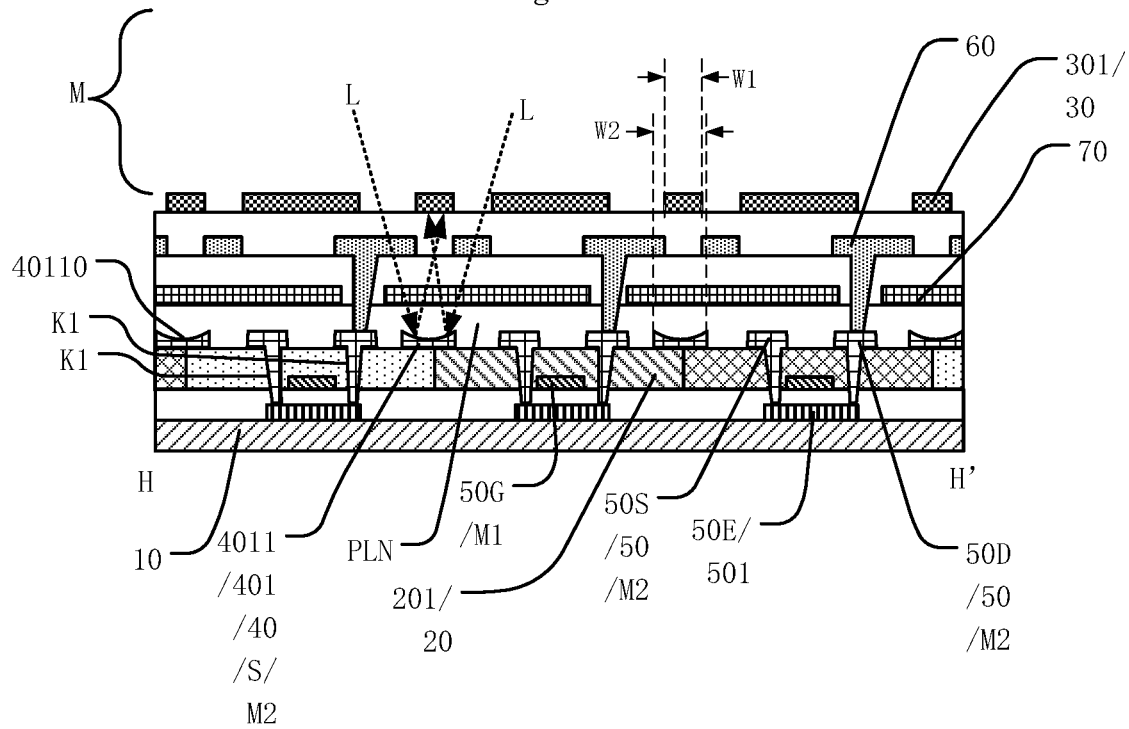
FIG. 24 illustrates a H-H' sectional view of another exemplary array substrate in FIG. 18 consistent with disclosed embodiments of the present disclosure.

FIG. 23 illustrates another G-G' sectional view of the array substrate in FIG. 18; and FIG. 24 illustrates another H-H' sectional view of the array substrate in FIG. 18. Further, in one embodiment, referring to FIG. 18 and FIGS. 23-24, the planarization layer PLN may be disposed on the side of the second metal layer M2 close to the black matrix layer 30.

In the present disclosure, the planarization layer PLN may be disposed on the side of the second metal layer M2 close to the black matrix layer 30. In other words, at least the planarization layer PLN may be disposed between the second metal layer M2 and the pixel electrode 60, which may facilitate to reduce the signal coupling between the second metal layer M2 and the pixel electrode 60.

Further, referring to FIGS. 23-24, when the second metal layer M2 is disposed between the planarization layer PLN and the color resist layer 20, the second metal layer M2 may be attached to and in contact with the color resist layer 20. After the color resist layer 20 is formed, the second metal layer M2 may be directly formed on the color resist layer 20; and after the second metal layer M2 is patterned, the planarization layer PLN may be directly formed on the second metal layer M2. In other words, the color resist layer 20 may be multiplexed as an insulating layer between the second metal layer M2 and the first metal layer M1 while having the light filtering effect of the color resist 201. Therefore, there may be no need to dispose an additional insulating layer between the second metal layer M2 and the first metal layer M1, which may facilitate to reduce the thickness of the array substrate 000.

Further, in one embodiment, as shown in FIGS. 23-24, the first metal layer M1 may be attached to and in contact with the color resist layer 20. In view of this, the first metal layer M1 may be disposed between the color resist layer 20 and the substrate 10, and the side of the first metal layer M1 facing towards the second metal layer M2 may be attached to and in direct contact with the color resist layer 20. In other words, after the first metal layer M1 is formed and patterned, the color resist layer 20 may be directly formed on the first metal layer M1. The color resist layer 20 may be multiplexed as an insulating layer between the first metal layer M1 and the second metal layer M2, which may further reduce the thickness of the array substrate 000. In addition, because the color resist layer 20 needs to have the structure of the color resist 201, a thickness of the color resist layer 20 may be substantially large, which may facilitate to weaken the signal coupling between the second metal layer M2 and the first metal layer M1, thereby improving the display quality.

Figure 25:
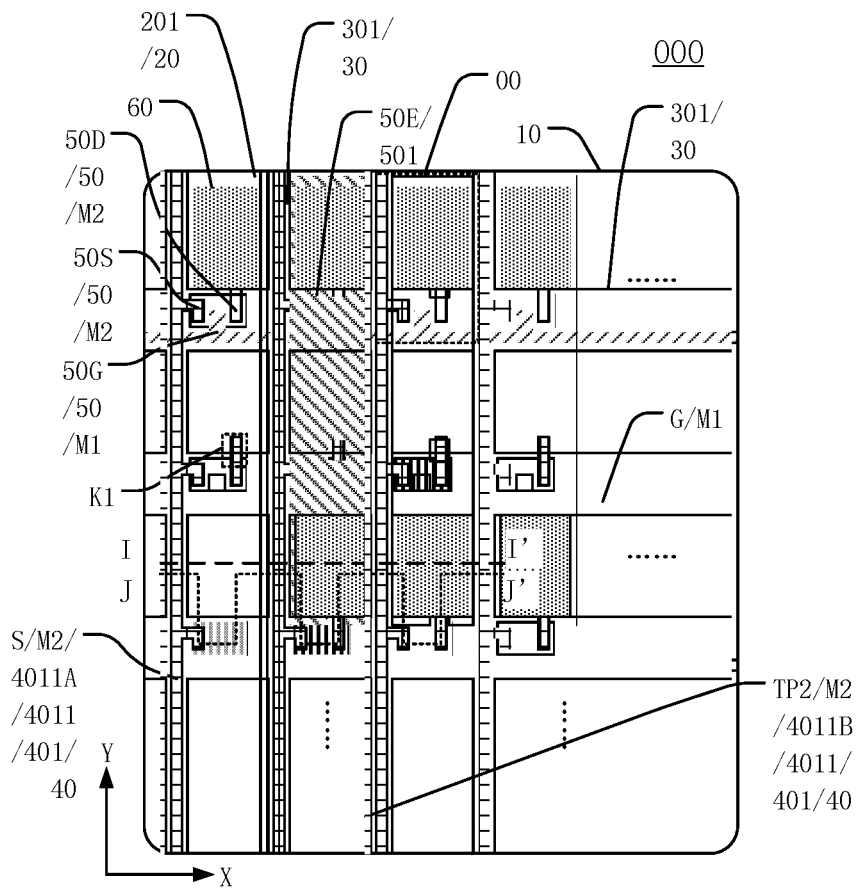
FIG. 25 illustrates a schematic top view of another exemplary array substrate consistent with disclosed embodiments of the present disclosure.
Figure 26:
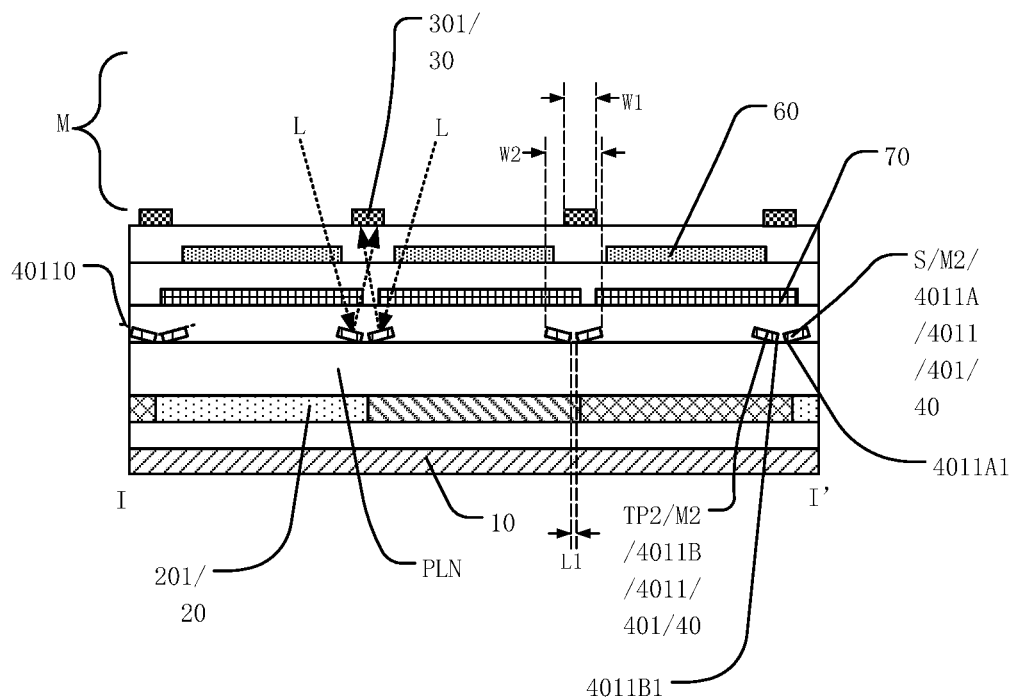
FIG. 26 illustrates a I-I' sectional view of another exemplary array substrate in FIG. 25 consistent with disclosed embodiments of the present disclosure.
Figure 27:
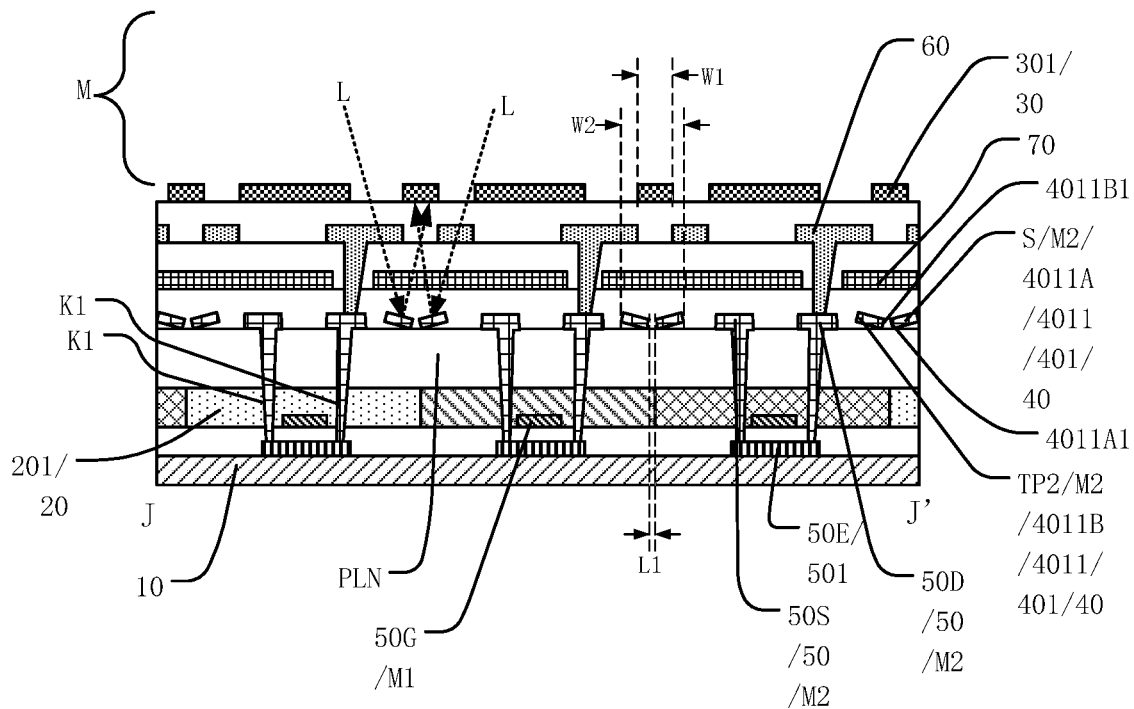
FIG. 27 illustrates a J-J' sectional view of another exemplary array substrate in FIG. 25 consistent with disclosed embodiments of the present disclosure.
Figure 28:
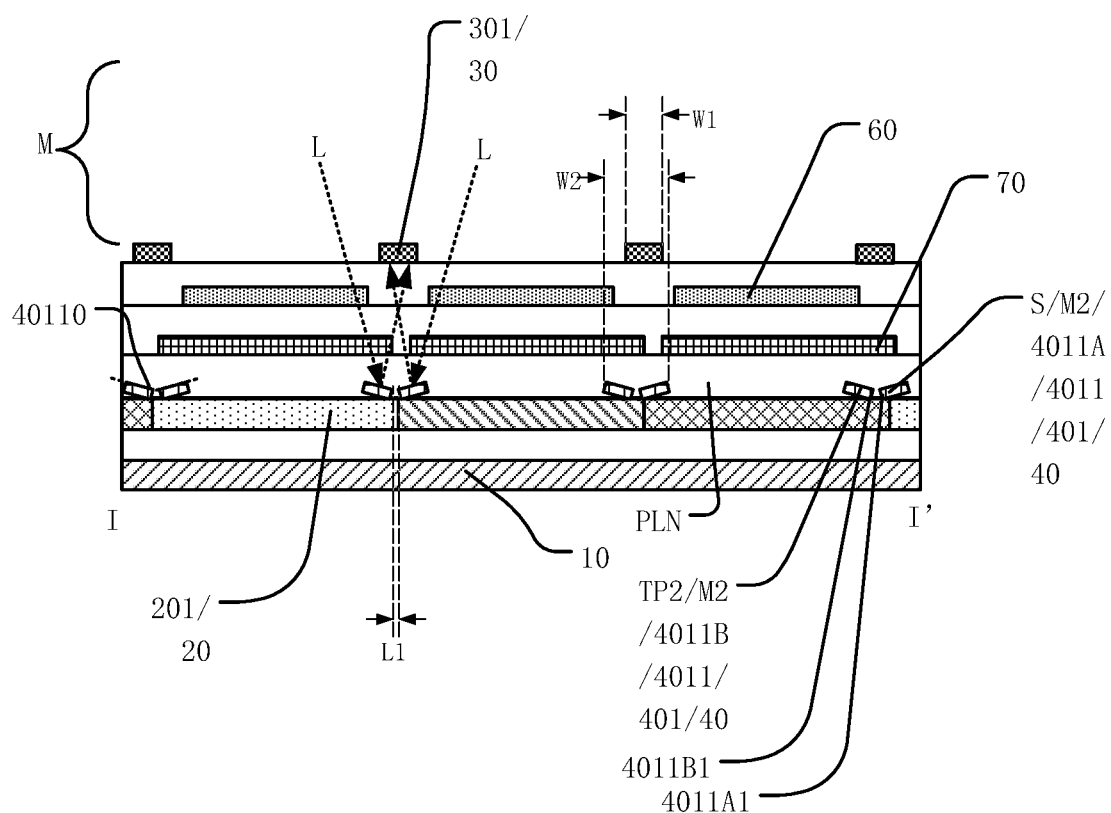
FIG. 28 illustrates a I-I' sectional view of another exemplary array substrate in FIG. 25 consistent with disclosed embodiments of the present disclosure.
Figure 29:
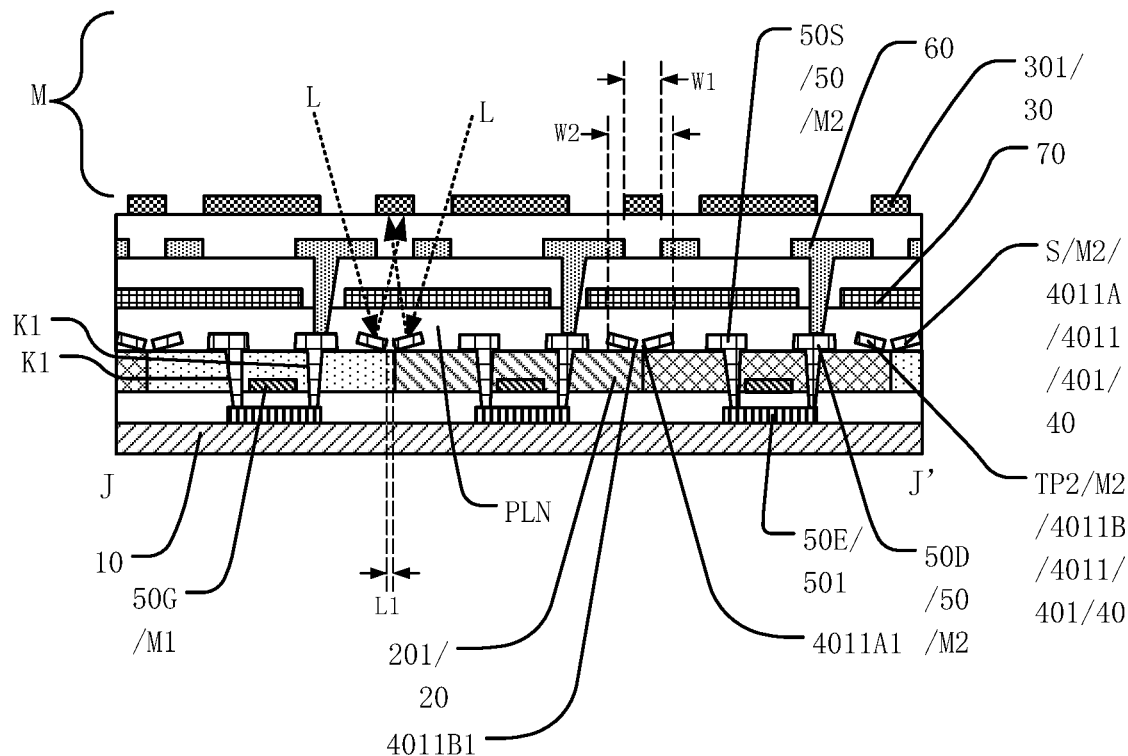
FIG. 29 illustrates a J-J' sectional view of another exemplary array substrate in FIG. 25 consistent with disclosed embodiments of the present disclosure.

FIG. 25 illustrates a schematic top view of another array substrate consistent with disclosed embodiments of the present disclosure; FIG. 26 illustrates a I-I' sectional view of the array substrate in FIG. 25; FIG. 27 illustrates a J-J' sectional view of the array substrate in FIG. 25; FIG. 28 illustrates another I-I' sectional view of the array substrate in FIG. 25; and FIG. 29 illustrates another J-J' sectional view of the array substrate in FIG. 25. For illustrative purposes, a transparency filling may be performed in FIG. 25. In one embodiment, referring to FIGS. 25-27, the planarization layer PLN may be disposed on the side of the second metal layer M2 close to the color resist layer 20. In another embodiment, referring to FIG. 25 and FIGS. 28-29, the planarization layer PLN may be disposed on the side of the second metal layer M2 close to the black matrix layer 30, and the second metal layer M2 may further include a plurality of second touch-control signal lines TP2.

At least one reflection portion 4011 may include a first sub-portion 4011A and a second sub-portion 4011B. Among one data line S and one second touch-control signal line TP2 that are adjacently disposed, the data line S may be multiplexed as the first sub-portion 4011A, and the second touch-control signal line TP2 may be multiplexed as the second sub-portion 4011B.

The present disclosure may explain that when the second metal layer M2 is disposed between the color resist layer 20 and the black matrix layer 30, in addition to the data lines S and the source 50S and the drain 50D of the thin film transistor 50, the second metal layer M2 may further include the plurality of second touch-control signal lines TP2. In other words, the second metal layer M2 may be configured for disposing the second touch-control signal lines TP2. When the common electrode 70 is multiplexed as touch-control electrodes, the second touch-control signal line TP2 may be electrically connected to the common electrode 70 (not shown in the Figure, and the specific connection structure may be understood by referring to the connection structure in a touch-control display panel) to transmit a touch-control signal to the common electrode 70, thereby achieving the touch-control function when the array substrate 000 is used in a touch-control display panel.

The second metal layer M2 including the plurality of second touch-control signal lines TP2 may be disposed between the color resist layer 20 and the black matrix layer 30, the second touch-control signal line TP2 may often be extended along the second direction Y to a step region of the array substrate 000 (electrically connected to the driving chip), and the second metal layer M2 may be made of a metal material with a reflective effect. Therefore, in the disclosed embodiments, at least one reflection portion 4011 may include the first sub-portion 4011A and the second sub-portion 4011B. Among one data line S and one second touch-control signal line TP2 that are adjacently disposed, the data line S may be multiplexed as the first sub-portion 4011A, and the second touch-control signal line TP2 may be multiplexed as the second sub-portion 4011B. In other words, the adjacent data line S and the second touch-control signal line TP2 may jointly form the structure of the reflection portion 4011, such that the first light L may be converged to the light-shielding strip 301 by the reflection portion 4011 composed of the adjacent data line S and the second touch-control signal line TP2, and may be absorbed by the black light-shielding strip 301, thereby avoiding light leakage.

The orthographic projection of at least a portion of the light-shielding strip 301 on the substrate 10 may be located within a range of the joint orthographic projections of the adjacent data line S and the second touch-control signal line TP2 on the substrate 10. In other words, the light-shielding strip 301 of the black matrix layer 30 may be set substantially narrow, which may increase the aperture ratio and improve the display quality without causing light leakage. In the present disclosure, because the second metal layer M2 in the array substrate 000 is used for disposing the second touch-control signal lines TP2, and the data line S and the second touch-control signal line TP2 of the second metal layer M2 together are multiplexed as the reflection portion 4011, there may be no need to provide additional film layer for disposing the second touch-control signal line TP2 and the reflection portion 4011 in the array substrate 000, thereby facilitating the further thinning of the array substrate 000, and facilitating to further reduce the thickness of the display panel.

In the present disclosure, at least one reflection portion 4011 may include the first sub-portion 4011A and the second sub-portion 4011B. In one embodiment, the structure of part of the reflection portions 4011 may include the first sub-portion 4011A and the second sub-portion 4011B, and the structure of remaining reflection portions 4011 may merely include the data line S (making an upper surface of the data line S have the recessed structure of the first surface 40110), or may merely include the second touch-control signal line TP2 (making an upper surface of the second touch-control signal line TP2 have the recessed structure of the first surface 40110). In another embodiment, the structure of the entire reflection portions 4011 may include the first sub-portion 4011A and the second sub-portion 4011B. Among one data line S and one second touch-control signal line TP2 that are adjacently disposed, the data line S may be multiplexed as the first sub-portion 4011A, and the second touch-control signal line TP2 may be multiplexed as the second sub-portion 4011B, which may not be limited by the present disclosure.

Among one data line S and one second touch-control signal line TP2 that are adjacently disposed, the data line S may be multiplexed as the first sub-portion 4011A, and the second touch-control signal line TP2 may be multiplexed as the second sub-portion 4011B. In other words, among the plurality of data lines S and the plurality of second touch-control signal lines TP2, a certain amount of the data lines S may be multiplexed as the first sub-portion 4011A, and a certain amount of the second touch-control signal lines TP2 corresponding to the adjacent certain amount of the data lines S may be multiplexed as the second sub-portion 4011B. Alternatively, the entire data lines S may be multiplexed as the first sub-portion 4011A, and the entire second touch-control signal lines TP2 may be multiplexed as the second sub-portion 4011B. Alternatively, among a certain amount of the second touch-control signal lines TP2 and the data lines S, partial segments of a same one second touch-control signal line TP2 may be multiplexed as the second sub-portion 4011B (making an upper surface of the second touch-control signal line TP2 have the recessed structure of the first surface 40110), and partial segments of a same one data line S corresponding to the second touch-control signal line TP2 may be multiplexed as the first sub-portion 4011A. Alternatively, among the entire second touch-control signal lines TP2 and data lines S, partial segments of a same one second touch-control signal line TP2 may be multiplexed as the second sub-portion 4011B, and partial segments of a same one data line S corresponding to the second touch-control signal line TP2 may be multiplexed as the first sub-portion 4011A. The structures of the data lines S and the second touch-control signal lines TP2 may be determined according to practical applications, and may not be limited by the present disclosure.

It should be understood that when the common electrode 70 is used as touch-control electrodes, the second touch-control signal lines TP2 electrically connected to a same one common electrode 70 may include an actual touch-control signal line and a virtual touch-control signal line. Both the actual touch-control signal line and the virtual touch-control signal line may be located in the second metal layer M2. The virtual touch-control signal line may not be connected to the driving chip, and each common electrode 70 used as the touch-control electrode may be connected to the driving chip through the actual touch-control signal line for transmitting the touch-control detection signal. The virtual touch-control signal line may often be used to reduce the resistance difference and capacitance difference between the common electrodes 70 used as touch-control electrodes to ensure touch-control accuracy.

In one embodiment, the specific structure of the second touch-control signal line TP2 including the actual touch-control signal line and the virtual touch-control signal line may not be described in detail, which may be understood with reference to the touch-control structure in the related art. The second touch-control signal line TP2 multiplexed as the second sub-portion 4011B may be an actual touch-control signal line or a virtual touch-control signal line, which may not be limited by the present disclosure, and may be determined according to practical applications in specific implementation.

It should be noted that FIGS. 26-29 may merely exemplarily illustrate that among one data line S and one second touch-control signal line TP2 that are adjacently disposed, the data line S may be multiplexed as the first sub-portion 4011A, and the second touch-control signal line TP2 may be multiplexed as the second sub-portion 4011B. The data line S and the second touch-control signal line TP2 that are adjacently disposed may together form the structure of the reflection portion 4011 including the recessed first surface 40110. In specific implementation, the data line S and the second touch-control signal line TP2 that are adjacently disposed may have any other structure, to form the reflection portion 4011 including the recessed first surface 40110, which may not be limited by the present disclosure, and may not be repeated herein.

In certain embodiments, referring to FIGS. 25-29, in a direction parallel to the plane of the substrate 10, an end of the first sub-portion 4011A close to the second sub-portion 4011B may be a first end 4011A1, and an end of the second sub-portion 4011B close to the first sub-portion 4011A may be a second end 4011B1. The first end 4011A1 and the second end 4011B1 may be insulated from each other.

The present disclosure may further explain that among one data line S and one second touch-control signal line TP2 that are adjacently disposed in the second metal layer M2, the data line S may be multiplexed as the first sub-portion 4011A of the reflection portion 4011, and the second touch-control signal line TP2 may be multiplexed as the second sub-portion 4011B of the same reflection portion 4011. Because the data line S is configured to apply a voltage to the pixel electrode 60, and the second touch-control signal line TP2 is configured to transmit a touch-control signal, the realized functions of the data line S and the second touch-control signal line TP2 may be different. Therefore, in a direction parallel to the plane of substrate 10, one end of the first sub-portion 4011A close to the second sub-portion 4011B may be the first end 4011A1, one end of the second sub-portion 4011B close to the first sub-portion 4011A may be the second end 4011B1, and the first end 4011A1 and the second end 4011B1 may be insulated from each other. Therefore, the data line S and the second touch-control signal line TP2 that are adjacently disposed may not interfere with each other, which may ensure the use effect of the array substrate 000.

Optionally, referring to FIGS. 25-29, the first end 4011A1 and the second end 4011B1 may be insulated from each other. In other words, in a direction parallel to the plane of the substrate 10, a distance L1 between the first end 4011A1 and the second end 4011B1 may be greater than 0, to ensure that the data line S and the second touch-control signal line TP2 that are adjacently disposed may not interfere with each other, which may ensure the use effect of the array substrate 000.

Figure 30:
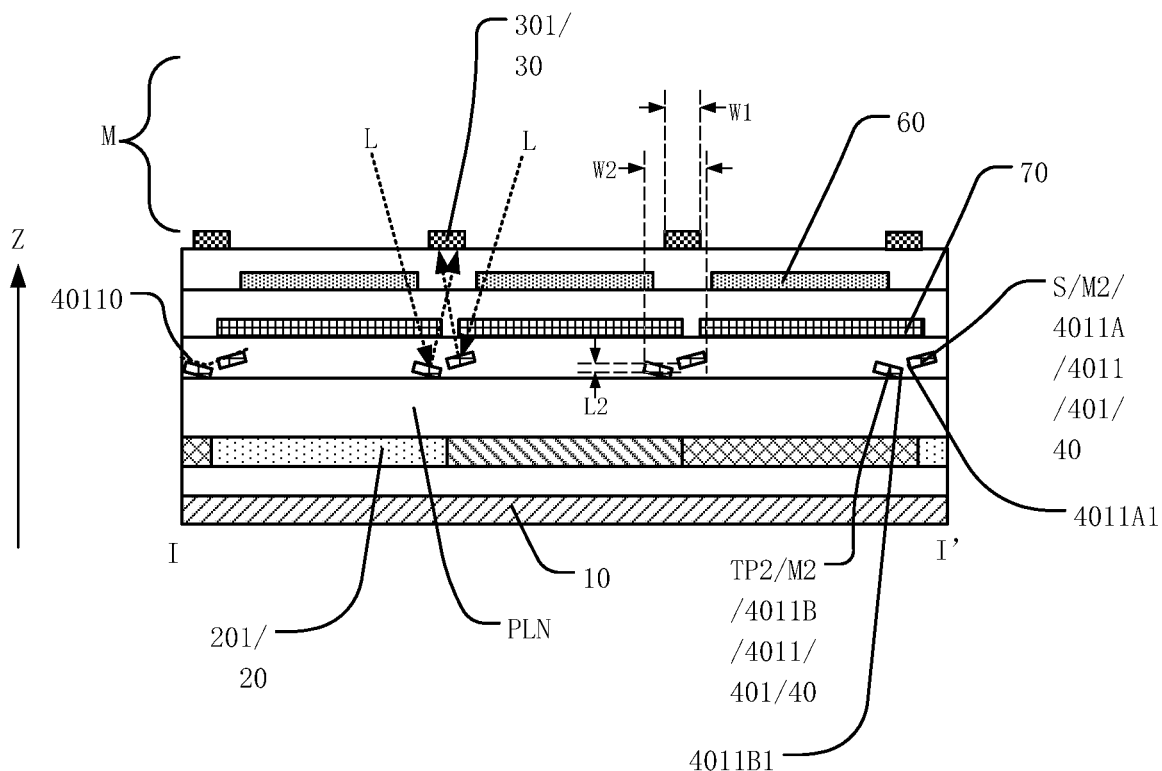
FIG. 30 illustrates a I-I' sectional view of another exemplary array substrate in FIG. 25 consistent with disclosed embodiments of the present disclosure.
Figure 31:
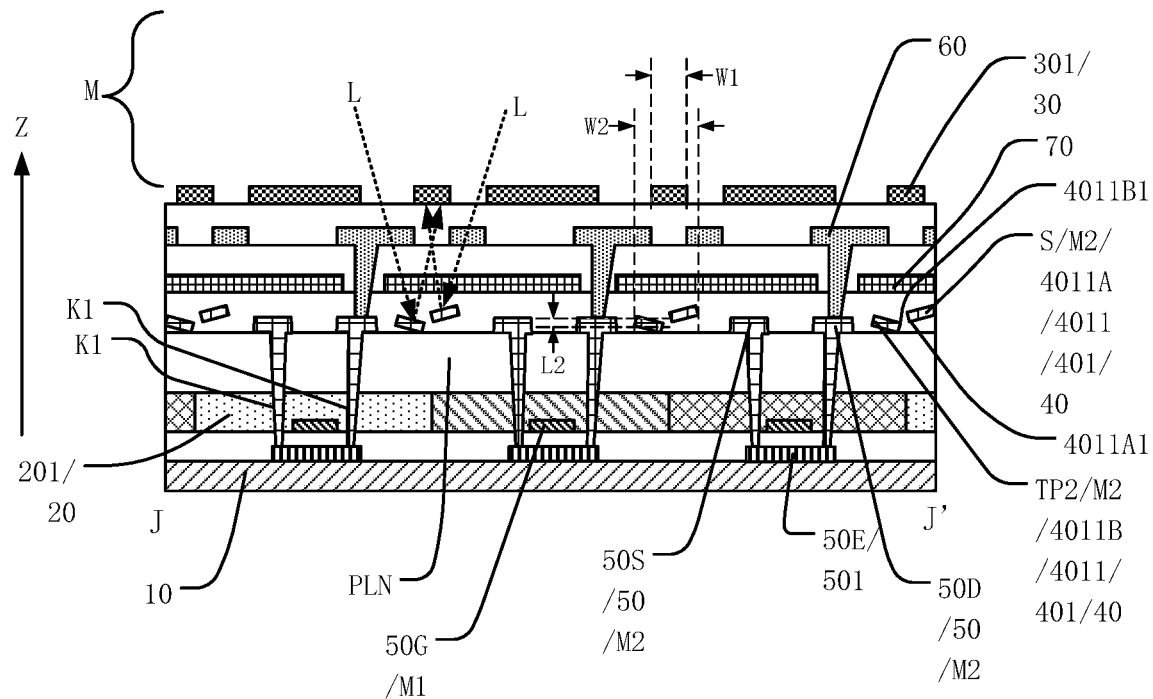
FIG. 31 illustrates a J-J' sectional view of another exemplary array substrate in FIG. 25 consistent with disclosed embodiments of the present disclosure.

FIG. 30 illustrates another I-I' sectional view of the array substrate in FIG. 25; and FIG. 31 illustrates another J-J' sectional view of the array substrate in FIG. 25. Optionally, referring to FIG. 25 and FIGS. 30-31, the first end 4011A1 and the second end 4011B1 may be insulated from each other. In other words, in a direction Z perpendicular to the plane of the substrate 10, a distance L2 between the first end 4011A1 and the second end 4011B1 may be greater than 0. In other words, the first end 4011A1 and the second end 4011B1 may be staggered from each other in the direction Z perpendicular to the plane of the substrate 10, and may not be in a same horizontal plane, to ensure that the data line S and the second touch-control signal line TP2 that are adjacently disposed may not interfere with each other, which may ensure the use effect of the array substrate 000.

Figure 32:
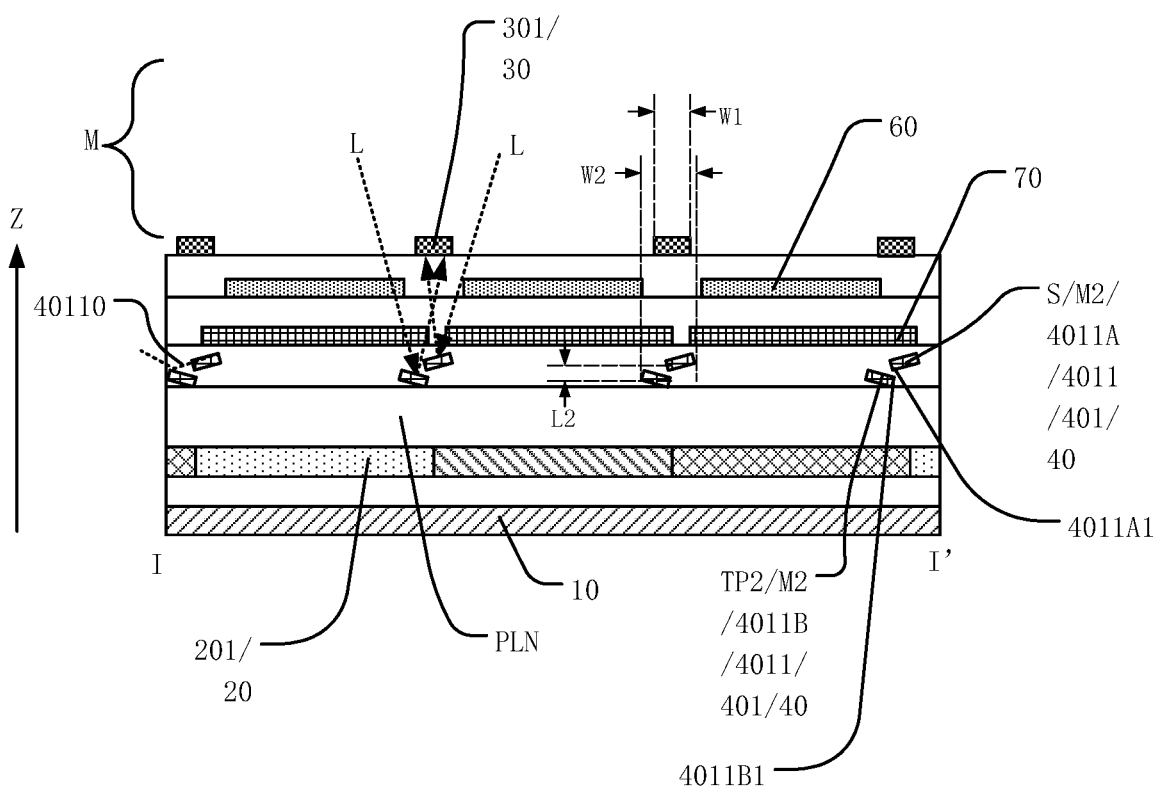
FIG. 32 illustrates a I-I' sectional view of another exemplary array substrate in FIG. 25 consistent with disclosed embodiments of the present disclosure.
Figure 33:
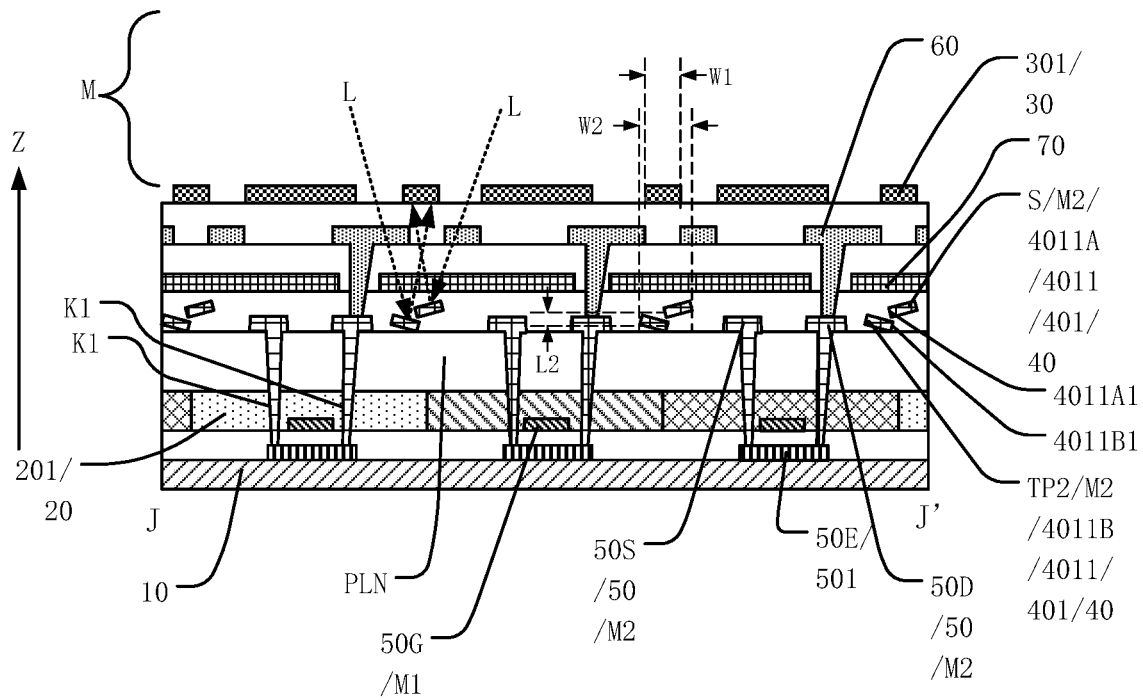
FIG. 33 illustrates a J-J' sectional view of another exemplary array substrate in FIG. 25 consistent with disclosed embodiments of the present disclosure.

FIG. 32 illustrates another I-I' sectional view of the array substrate in FIG. 25; and FIG. 33 illustrates another J-J' sectional view of the array substrate in FIG. 25. In certain embodiments, referring to FIG. 25 and FIGS. 32-33, in the direction Z perpendicular to the plane of the substrate 10, the distance L2 between the first end 4011A1 and the second end 4011B1 may be greater than 0, and an orthographic projection of the first sub-portion 4011A on the substrate 10 may at least partially overlap an orthographic projection of the second sub-portion 4011B on the substrate 10.

The present disclosure may explain that the first end 4011A1 and the second end 4011B1 may be insulated from each other. In other words, in the direction Z perpendicular to the plane of the substrate 10, the distance L2 between the first end 4011A1 and the second end 4011B1 may be greater than 0. In other words, the first end 4011A1 and the second end 4011B1 may be staggered from each other in the direction Z perpendicular to the plane of the substrate 10, and may not be in a same horizontal plane. Therefore, the data line S and the second touch-control signal line TP2 that are adjacently disposed may not interfere with each other, and the orthographic projection of the first sub-portion 4011A on the substrate 10 may at least partially overlap the orthographic projection of the second sub-portion 4011B on the substrate 10. Thus, a total width of the first sub-portion 4011A and the second sub-portion 4011B in a direction parallel to the plane of the substrate 10 (i.e., the width W2 of the reflection portion 4011) may be reduced, thereby facilitating to increase the aperture ratio.

Figure 34:
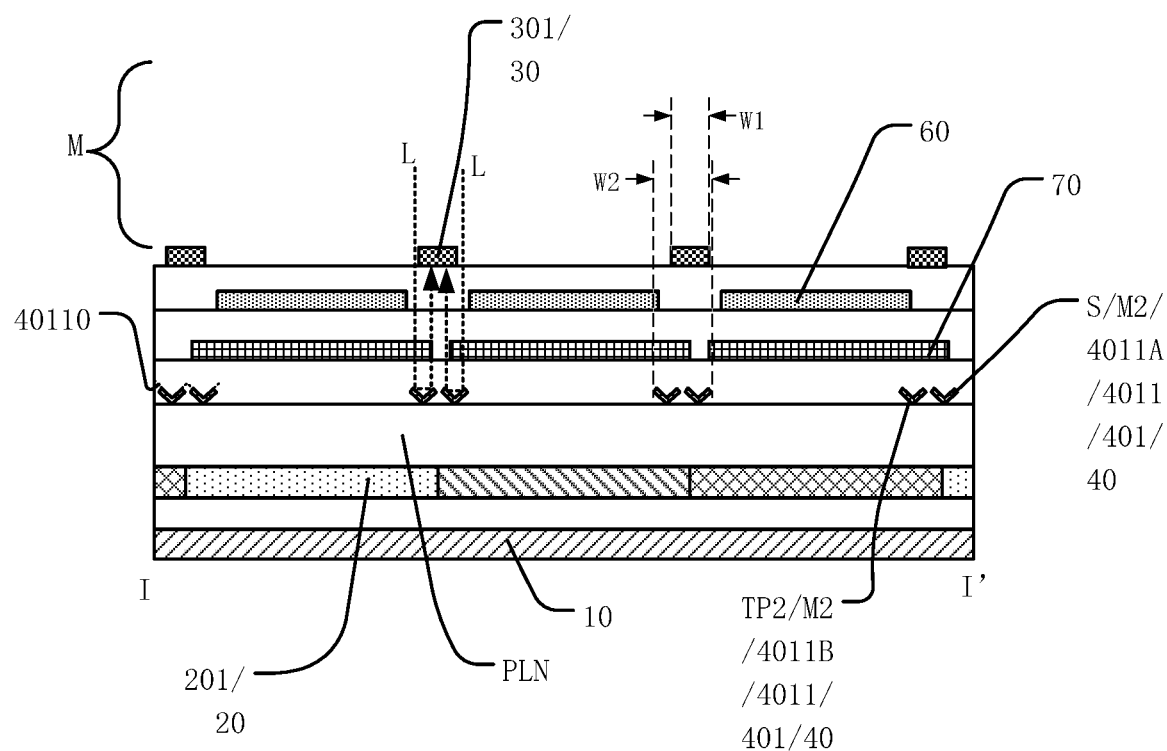
FIG. 34 illustrates a I-I' sectional view of another exemplary array substrate in FIG. 25 consistent with disclosed embodiments of the present disclosure.
Figure 35:
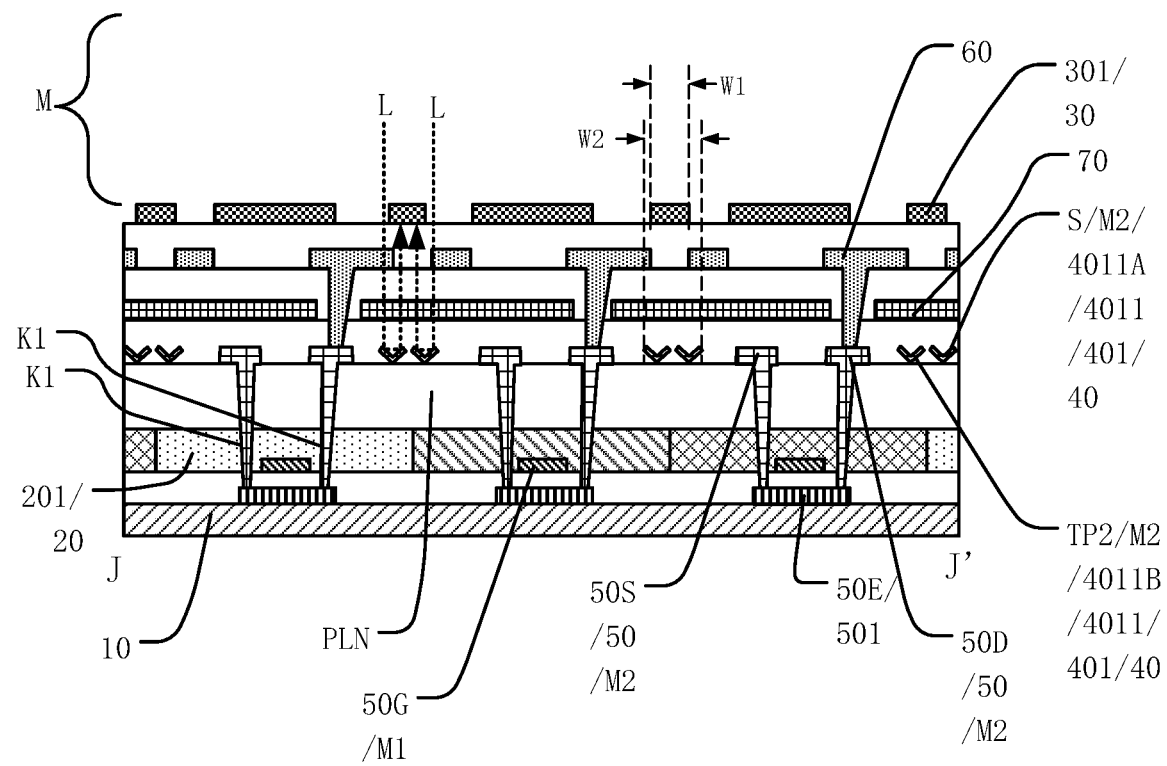
FIG. 35 illustrates a J-J' sectional view of another exemplary array substrate in FIG. 25 consistent with disclosed embodiments of the present disclosure.

FIG. 34 illustrates another I-I' sectional view of the array substrate in FIG. 25; and FIG. 35 illustrates another J-J' sectional view of the array substrate in FIG. 25. In certain embodiments, referring to FIG. 25 and FIGS. 34-35, each of the first sub-portion 4011A and the second sub-portion 4011B may have a recessed structure. In one embodiment, the data line S multiplexed as the first sub-portion 4011A of the reflection portion 4011 may have a surface away from the substrate 10, and the surface may have a structure recessed towards the substrate 10. The second touch-control signal line TP2 multiplexed as the second sub-portion 4011B of the reflection portion 4011 may have a surface away from the substrate 10, and the surface may have a structure recessed towards the substrate 10. Therefore, the first surface 40110 of the reflection portion 4011 overall may include a plurality of recessed structures, to effectively reflect and converge the light.

Optionally, referring to FIGS. 34-35, the recessed structure of the first sub-portion 4011A may include a structure in which two right-angle surfaces intersect, and the recessed structure of the second sub-portion 4011B may include a structure in which two right-angle surfaces intersect. Thus, the first light L may be incident on one right-angle surface of the first sub-portion 4011A from the first side M, and then may be reflected to the other right-angle surface of the first sub-portion 4011A, and may be reflected vertically back to the light-shielding strip 301. The first light L may be incident on one right-angle surface of the second sub-portion 4011B from the first side M, and then may be reflected to the other right-angle surface of the second sub-portion 4011B, and may be reflected vertically back to the light-shielding strip 301. Therefore, a substantially large amount of first light L may be converged to the light-shielding strip 301, which may effectively avoid light leakage phenomenon caused by the misalignment between the first light L when being reflected back to the first side M and the light-shielding strip 301.

In certain embodiments, referring to FIGS. 6-24, in one embodiment, the first surface 40110 of the reflection portion 4011 away from the substrate 10 may be an arc surface. The present disclosure may explain that the first surface 40110 of the reflection portion 4011 away from the substrate 10 may be an arc surface recessed towards the substrate 10, and the first light L may be reflected by the first surface 40110 having a recessed arc surface and may be converged to the light-shielding strip 301. Therefore, the width W1 of the light-shielding strip 301 may be set substantially narrow, which may improve the light leakage phenomenon and may facilitate to increase the aperture ratio.

It should be understood that the curvature of the arc of the first surface 40110 may not be limited by the present disclosure, and may be determined according to actual requirements in specific implementation, as long as the first light L is capable of being converged.

Figure 36:
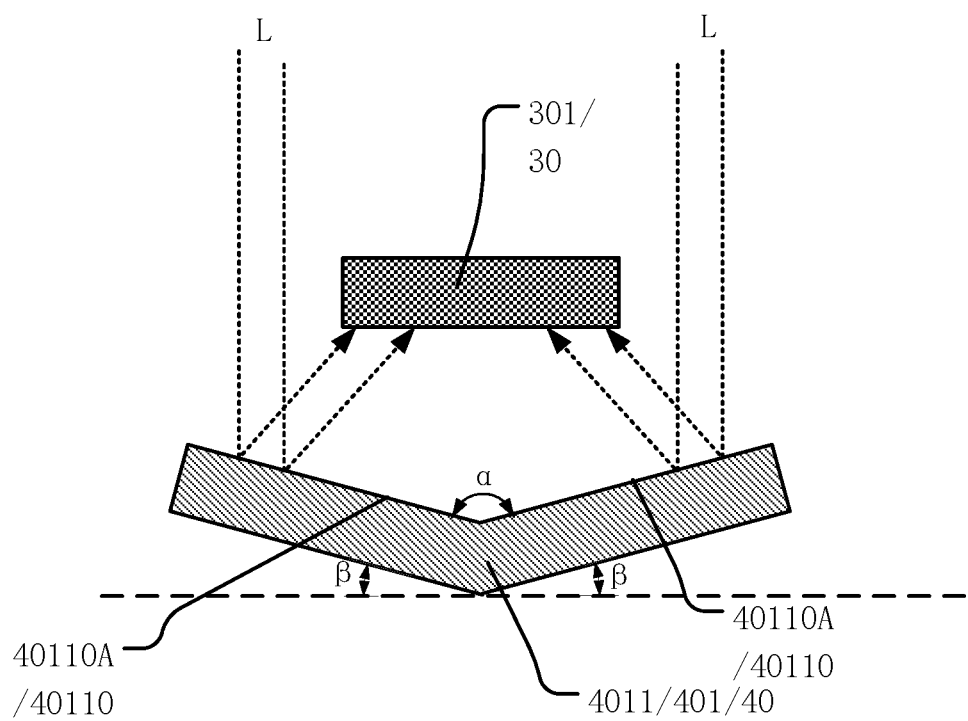
FIG. 36 illustrates a local zoom-in cross-sectional view of a reflection portion and a corresponding light-shielding strip of an exemplary array substrate consistent with disclosed embodiments of the present disclosure.

FIG. 36 illustrates a local zoom-in cross-sectional view of a reflection portion and a corresponding light-shielding strip of an array substrate consistent with disclosed embodiments of the present disclosure. Optionally, referring to FIGS. 6-24 and FIG. 36, the first surface 40110 of the reflection portion 4011 may include at least two intersecting inclined surfaces 40110A, and the angle α formed between the two inclined surfaces 40110A and facing towards the black matrix layer 30 may be an obtuse angle.

The present disclosure may explain that the first surface 40110 of the reflection portion 4011 may have a recessed structure formed by the intersection of at least two inclined surfaces 40110A. In other words, the first surface 40110 of the reflection portion 4011 may include at least two intersecting inclined surfaces 40110A, such that the first light L may be incident on the first surface 40110 from the first side M and reflected back to the first side M. Because the angle α formed between the two inclined surfaces 40110A and facing towards the black matrix layer 30 is an obtuse angle, the reflected first light L may be further converged by the recessed first surface 40110 to the substantially narrow light-shielding strip 301, to improve the light leakage phenomenon and increase the aperture ratio. Therefore, the first light L may avoid light loss caused by multiple reflections between the two inclined surfaces 40110A when the angle α is an acute angle, and the situation that the first light L cannot be converged to the light-shielding strip 301 when the angle α is an acute angle may be avoided.

Figure 37:
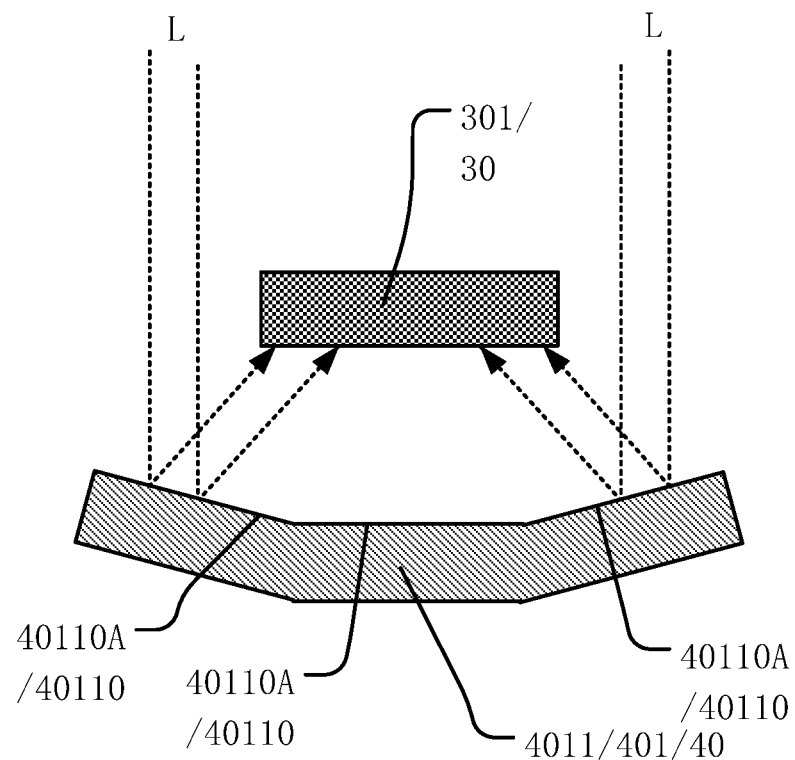
FIG. 37 illustrates a local zoom-in cross-sectional view of a reflection portion and a corresponding light-shielding strip of another exemplary array substrate consistent with disclosed embodiments of the present disclosure.
Figure 38:
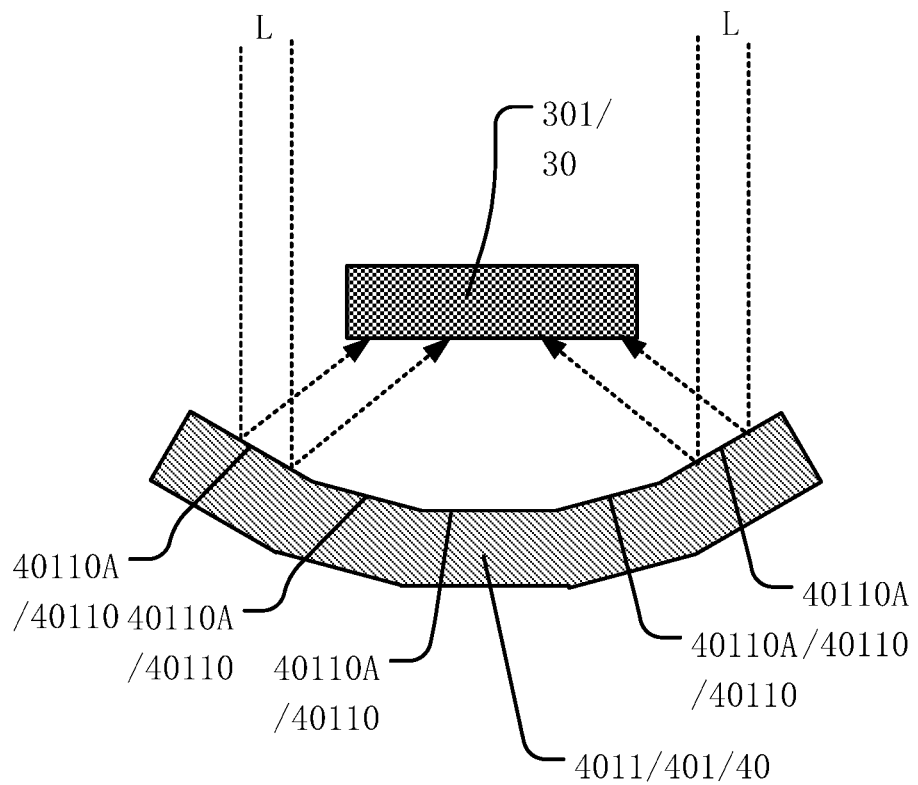
FIG. 38 illustrates a local zoom-in cross-sectional view of a reflection portion and a corresponding light-shielding strip of another exemplary array substrate consistent with disclosed embodiments of the present disclosure.
Figure 39:
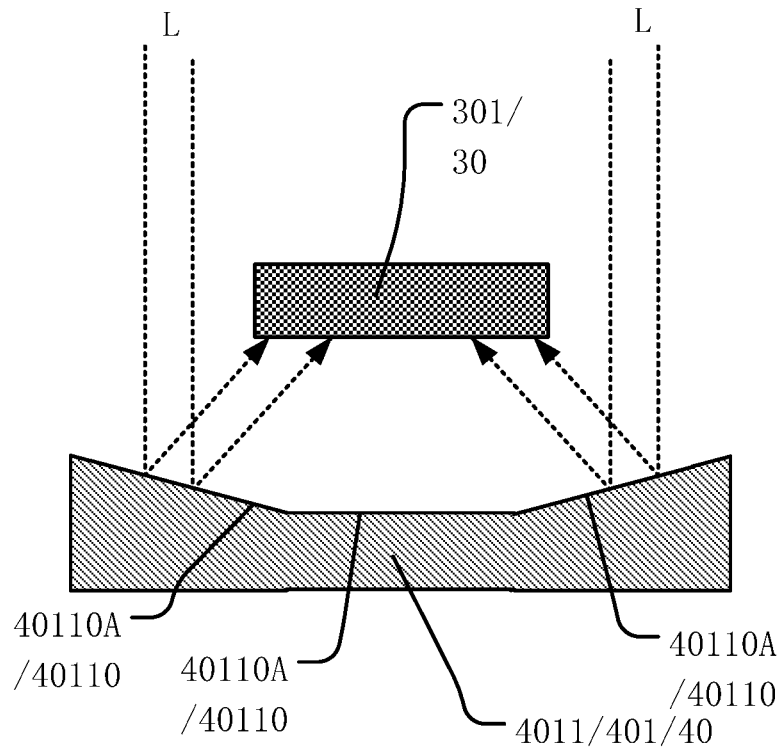
FIG. 39 illustrates a local zoom-in cross-sectional view of a reflection portion and a corresponding light-shielding strip of another exemplary array substrate consistent with disclosed embodiments of the present disclosure.

FIG. 37 illustrates a local zoom-in cross-sectional view of a reflection portion and a corresponding light-shielding strip of another array substrate consistent with disclosed embodiments of the present disclosure; FIG. 38 illustrates a local zoom-in cross-sectional view of a reflection portion and a corresponding light-shielding strip of another array substrate consistent with disclosed embodiments of the present disclosure; and FIG. 39 illustrates a local zoom-in cross-sectional view of a reflection portion and a corresponding light-shielding strip of another array substrate consistent with disclosed embodiments of the present disclosure. Optionally, referring to FIGS. 37-39, the first surface 40110 of the reflection portion 4011 may include at least a plurality of intersecting inclined surfaces 40110A, and the plurality of inclined surfaces 40110A may be connected to each other to form a structure recessed towards the substrate 10. The structure of the first surface 40110 may include but may not be limited to the above structure in specific implementation.

Optionally, referring to FIGS. 6-24 and FIG. 36, an angle β between the inclined surface 40110A and the plane of the substrate 10 may be less than or equal to 45°. The present disclosure may explain that the first surface 40110 of the reflection portion 4011 may include at least two intersecting inclined surfaces 40110A. When the angle α formed between the two inclined surfaces 40110A and facing towards the black matrix layer 30 is an obtuse angle, the angle β between the inclined surface 40110A and the plane of the substrate 10 may be less than or equal to 45°.

Figure 40:
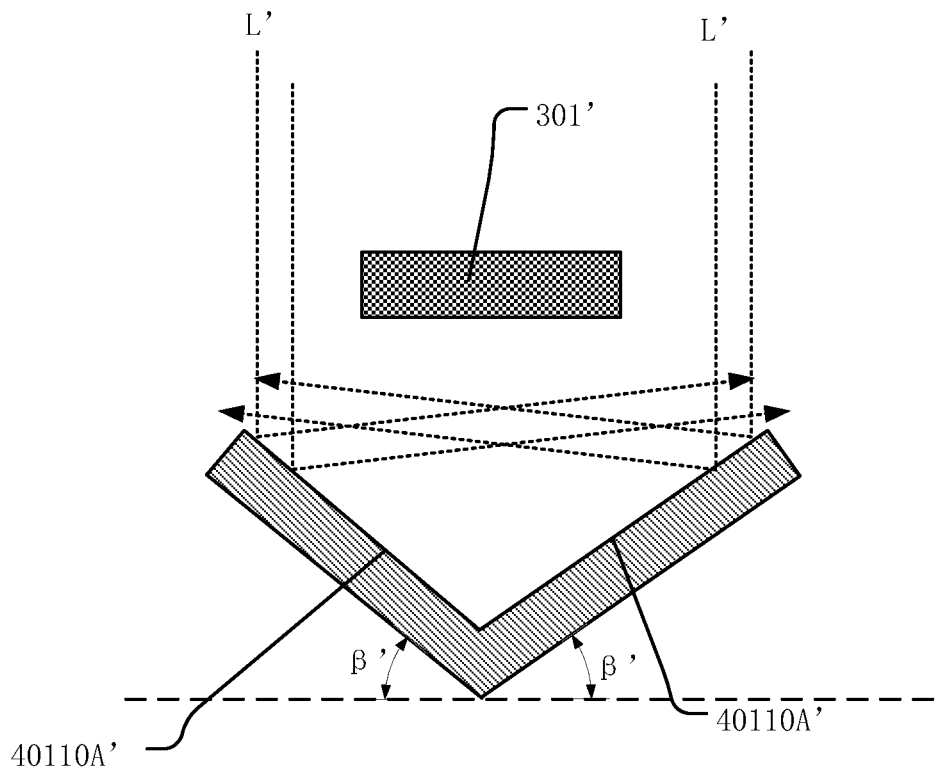
FIG. 40 illustrates a light transmission path diagram when an angle between an inclined surface and a plane of the substrate is greater than 45°.

FIG. 40 illustrates a light transmission path diagram when an angle between an inclined surface and a plane of the substrate is greater than 45°. Referring to FIG. 40, the light leakage phenomenon caused by the first light L' leaking from both sides of the light-shielding strip 301' after being reflected by the inclined surface 40110A' when the angle β' is greater than 45° may be avoided. Therefore, in the present disclosure, the angle between the inclined surface 40110A and the plane of the substrate 10 may be less than or equal to 45°, which may effectively reduce the width of the light-shielding strip 301, may increase the aperture ratio, and may avoid light leakage.

Figure 41:
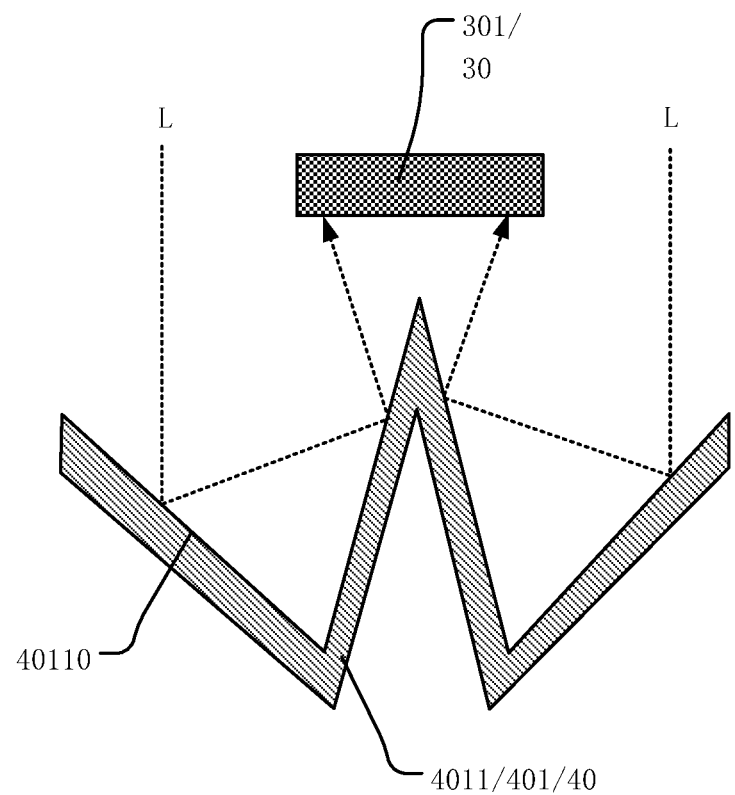
FIG. 41 illustrates a local zoom-in cross-sectional view of a reflection portion and a corresponding light-shielding strip of another exemplary array substrate consistent with disclosed embodiments of the present disclosure.

FIG. 41 illustrates a local zoom-in cross-sectional view of a reflection portion and a corresponding light-shielding strip of an array substrate consistent with disclosed embodiments of the present disclosure. Optionally, referring to FIGS. 6-24 and FIG. 41, the reflection portion 4011 may include a cross-section perpendicular to the plane of the substrate 10, and the cross-section may be perpendicular to an extension direction of the reflection portion 4011 (the cross-section may be understood as the plane graphics shown in FIG. 41). The first surface 40110 may have a W-shaped cross-section (as shown in FIG. 41).

The present disclosure may explain that the first surface 40110 of the reflection portion 4011 facing towards the black matrix layer 30 may have a saw-tooth structure formed by planes of different angles. In one embodiment, the reflection portion 4011 may include the cross-section perpendicular to the plane of the substrate 10, and the cross-section may be perpendicular to the extension direction of the reflection portion 4011 (as the plane graphics shown in FIG. 41). The first surface 40110 may have a W-shaped cross-section, such that after being incident on the W-shaped first surface 40110, the first light L may be reflected multiple times by the W-shaped first surface 40110 and may be converged to the light-shielding strip 301, to improve the light leakage phenomenon.

Figure 42:
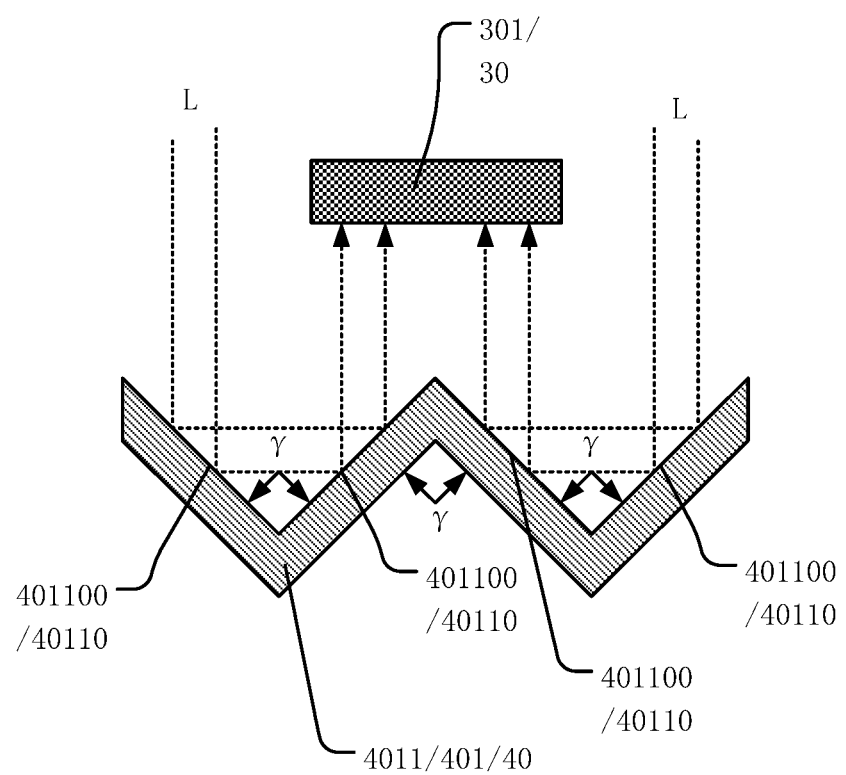
FIG. 42 illustrates a local zoom-in cross-sectional view of a reflection portion and a corresponding light-shielding strip of another exemplary array substrate consistent with disclosed embodiments of the present disclosure.

FIG. 42 illustrates a local zoom-in cross-sectional view of a reflection portion and a corresponding light-shielding strip of an array substrate consistent with disclosed embodiments of the present disclosure. Optionally, referring to FIGS. 6-24 and FIG. 42, the reflection portion 4011 may include a cross-section perpendicular to the plane of the substrate 10, and the cross-section may be perpendicular to the extension direction of the reflection portion 4011 (the cross-section may be understood as the plane graphics shown in FIG. 41). The first surface 40110 may have a W-shaped cross-section, which may be understood that the first surface 40110 may include four connected sub-surfaces 401100, and the angle γ formed between two adjacent sub-surfaces 401100 may be a right angle. In the present disclosure, the angle γ formed between two adjacent sub-surfaces 401100 may be a right angle, such that the first light L incident perpendicular to the plane of the substrate 10 may be reflected by one sub-surface 401100 to another one sub-surface 401100 with the angle γ being a right angle, and then may be reflected back to the first side M and may be absorbed by the light-shielding strip 301 (the optical transmission path of the first light L may be shown in FIG. 41), thereby effectively improving the light leakage phenomenon.

Figure 43:
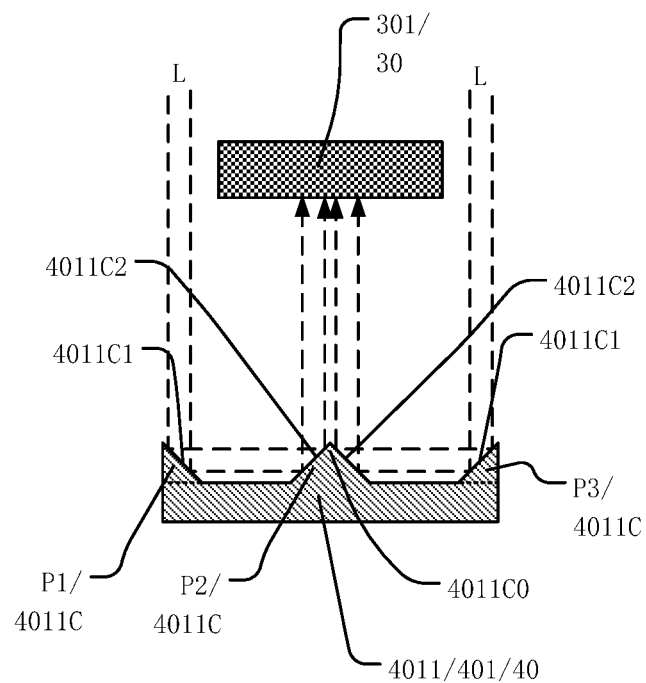
FIG. 43 illustrates a local zoom-in cross-sectional view of a reflection portion and a corresponding light-shielding strip of another exemplary array substrate consistent with disclosed embodiments of the present disclosure.

FIG. 43 illustrates a local zoom-in cross-sectional view of a reflection portion and a corresponding light-shielding strip of an array substrate consistent with disclosed embodiments of the present disclosure. Optionally, referring to FIGS. 6-24 and FIG. 43, the reflection portion 4011 may include at least three triangular prismatic strips 4011C arranged at intervals on the side facing the black matrix layer 30. Each triangular prismatic strip 4011C may include a right angle 4011C0, an oblique surface 4011C1 opposite to the right angle 4011C0, and two right-angle surfaces 4011C2 forming the right angle 4011C0.

The three triangular prismatic strips 4011C may include a first prismatic strip P1, a second prismatic strip P2, and a third prismatic strip P3, respectively. The second prismatic strip P2 may be located between the first prismatic strip P1 and the third prismatic strip P3. The right angle 4011C0 of the second prismatic strip P2 may face towards the black matrix layer 30. The oblique surface 4011C1 of the first prismatic strip P1 and the oblique surface 4011C1 of the third prismatic strip P3 may be disposed opposite to each other.

The first light L may be reflected by the oblique surface 4011C1 of the first prismatic strip P1 to the right-angle surface 4011C2 of the second prismatic strip P2, and then may be reflected by the right-angle surface 4011C2 of the second prismatic strip P2 to the light-shielding strip 301; and/or, the first light L may be reflected by the oblique surface 4011C1 of the third prismatic strip P3 to the right-angle surface 4011C2 of the second prismatic strip P2, and then may be reflected by the right-angle surface 4011C2 of the second prismatic strip P2 to the light-shielding strip 301.

The present disclosure may further explain that the reflection portion 4011 may include at least three triangular prismatic strips 4011C arranged at intervals on the side facing the black matrix layer 30. The three triangular prismatic strips 4011C may include the first prismatic strip P1, the second prismatic strip P2, and the third prismatic strip P3, respectively. The second prismatic strip P2 may be located between the first prismatic strip P1 and the third prismatic strip P3.

The three triangular prismatic strips 4011C may have different orientations. In one embodiment, the right-angle surface 4011C0 of the second prismatic strip P2 at the middle may face towards the black matrix layer 30, and the oblique surface 4011C1 of the first prismatic strip P1 and the oblique surface 4011C1 of the third prismatic strip P3 on both sides may be disposed opposite to each other, such that the first light L incident from the first side M may be first reflected by the oblique surface 4011C1 of the first prismatic strip P1 to the right-angle surface 4011C2 of the second prismatic strip P2, and then may be reflected back to the light-shielding strip 301 by the right-angle surface 4011C2 of the second prismatic strip P2. Alternatively, the first light L incident from the first side M may be first reflected by the oblique surface 4011C1 of the third prismatic strip P3 to the right-angle surface 4011C2 of the second prismatic strip P2, and then may be reflected back to the light-shielding strip 301 by the right-angle surface 4011C2 of the second prismatic strip P2. Therefore, the light leakage phenomenon may be improved, and at the same time, the light-shielding strip 301 may be made substantially narrow, to increase the aperture ratio.

Figure 44:
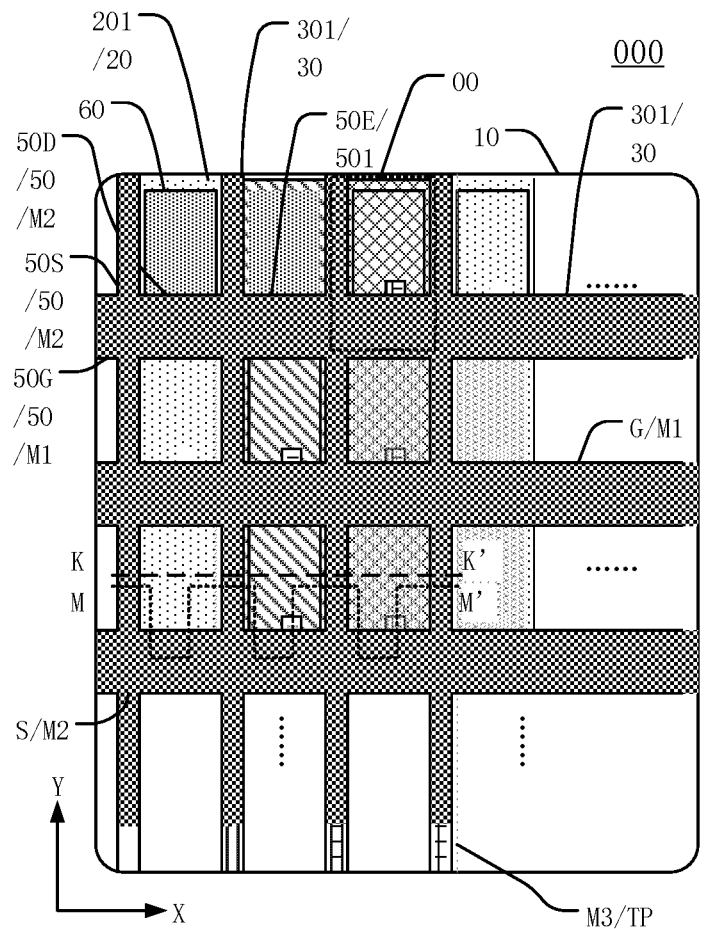
FIG. 44 illustrates a schematic top view of another exemplary array substrate consistent with disclosed embodiments of the present disclosure.
Figure 45:
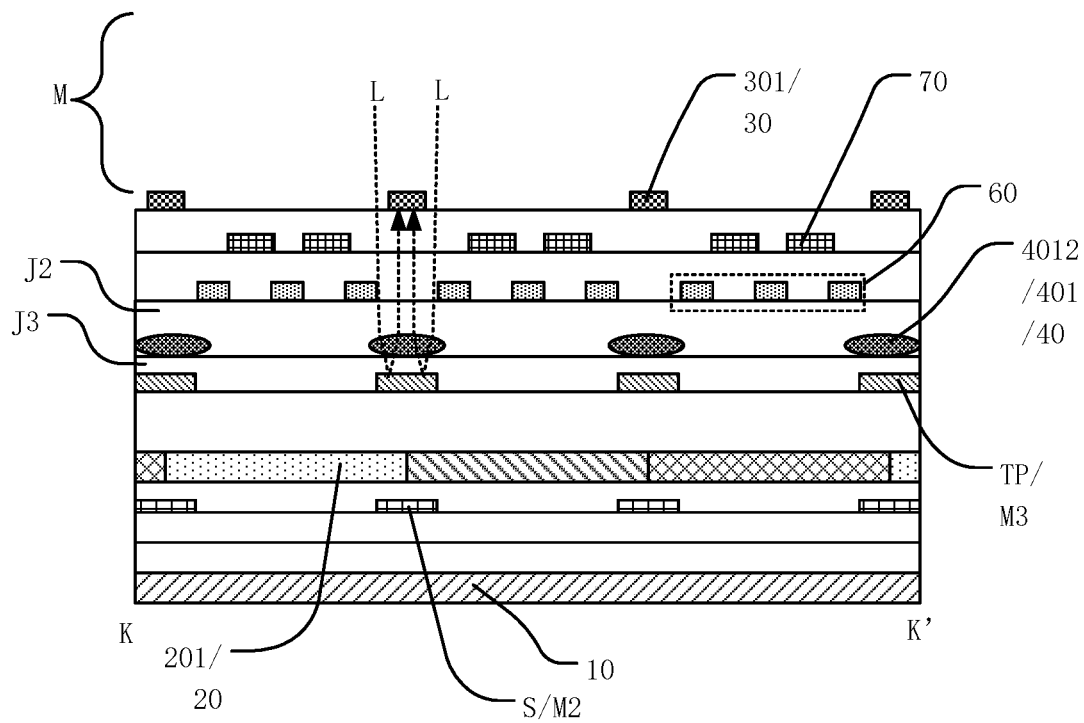
FIG. 45 illustrates a K-K' sectional view of another exemplary array substrate in FIG. 44 consistent with disclosed embodiments of the present disclosure.
Figure 46:
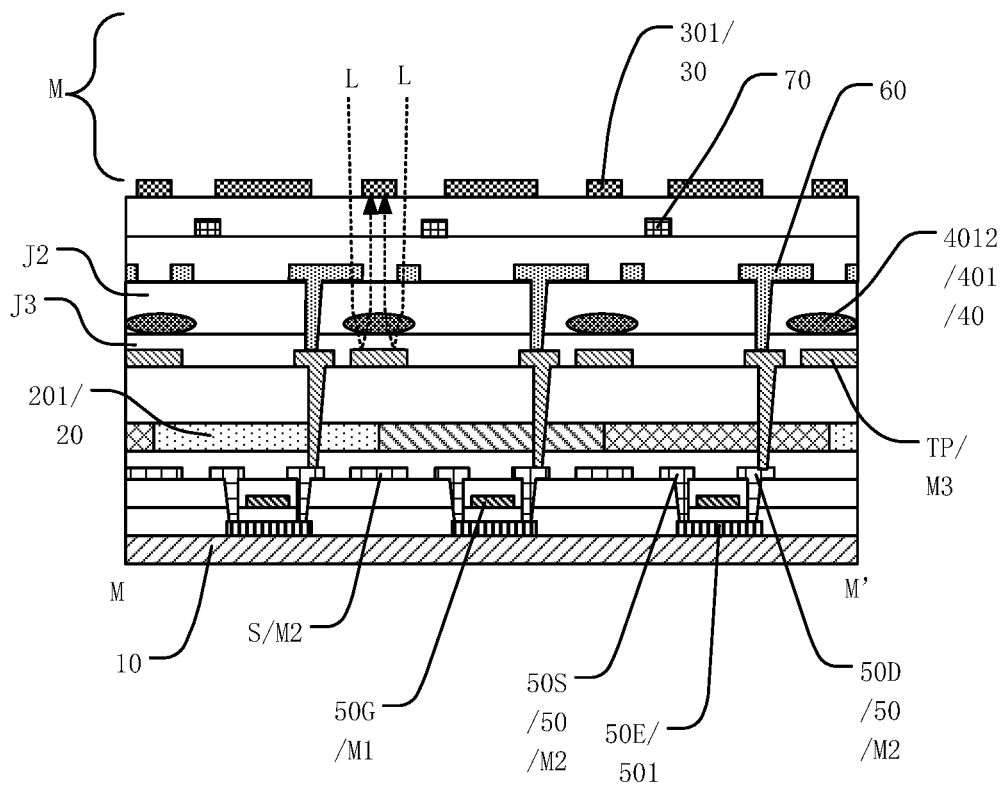
FIG. 46 illustrates an M-M' sectional view of another exemplary array substrate in FIG. 44 consistent with disclosed embodiments of the present disclosure.

FIG. 44 illustrates a schematic top view of another array substrate consistent with disclosed embodiments of the present disclosure; FIG. 45 illustrates a K-K' sectional view of the array substrate in FIG. 44; and FIG. 46 illustrates an M-M' sectional view of the array substrate in FIG. 44. For illustrative purposes, a transparency filling may be performed in FIG. 44, and the light-converging portion 401 may not be shown in FIG. 44. In certain embodiments, referring to FIGS. 44-46, the light-converging portion 401 may include a lens portion 4012. An orthographic projection of the lens portion 4012 on the plane of the substrate 10 may overlap the orthographic projection of the light-shielding strip 301 on the plane of the substrate 10. The lens portion 4012 may be made of a material including a transparent material.

A second insulating layer J2 may be disposed on a side of the lens portion 4012 facing towards the black matrix layer 30, and a third insulating layer J3 may be disposed on a side of the lens portion 4012 facing towards the color resist layer 20. A refractive index of the lens portion 4012 may be greater than a refractive index of the second insulating layer J2, and a refractive index of the lens portion 4012 may be greater than a refractive index of the third insulating layer J3.

The present disclosure may explain that the light-converging portion 401 disposed between the black matrix layer 30 and the color resist layer may include the lens portion 4012 with light transmission and light converging functions. The orthographic projection of the lens portion 4012 on the plane of the substrate 10 may overlap the orthographic projection of the light-shielding strip 301 on the plane of the substrate 10. Optionally, the orthographic projection of the lens portion 4012 on the plane of the substrate 10 may overlap the orthographic projection of a metal signal line under the lens portion 401 on the substrate 10. The metal signal line may include the data line S of the second metal layer M2, or the touch-control signal line TP of the third metal layer M3, that are disposed on a side of the lens portion 4012 close to the substrate 10. The functions of the data line S and the touch-control signal line TP may refer to corresponding descriptions in above disclosed embodiments, and may not be described in detail herein.

The lens portion 4012 may be made of a transparent material. The refractive index of the lens portion 4012 may be greater than the refractive index of the second insulating layer J2 above the lens portion 4012, and the refractive index of the lens portion 4012 may be greater than the refractive index of the third insulating layer J3 below the lens portion. In other words, the transparent material used in the lens portion 4012 may have a substantially large refractive index, which may be greater than the refractive indices of the materials of the insulating layers above and below the lens portion 4012.

After being incident on the metal signal line from the side of the black matrix layer 30 away from the substrate 10 (the first side M) and being reflected by the metal signal line, the first light L as the external ambient light may pass through the lens portion 4012. Because the transparent material used in the lens portion 4012 may have a substantially large refractive index, which may be greater than the refractive indices of the materials of the insulating layers above and below the lens portion 4012, the first light L may change the propagation direction after passing through the lens portion 4012. Therefore, the first light L emitted from the lens portion 4012 may be converged to the substantially narrow light-shielding strip 301, which may prevent the first light L incident on the metal signal line from the first side M from being directly reflected by the metal signal line to cause light leakage, and may prevent the decrease of the aperture ratio caused by the widened light-shielding strip 301 for shielding the first light L reflected by the metal signal line.

After being reflected back to the first side M by the metal signal line and passing through the lens portion 4012, the first light L may be converged to the light-shielding strip 301 and may be absorbed by the black light-shielding strip 301, thereby avoiding the light leakage phenomenon. Due to the convergence of the first light L by the lens portion 4012, even if the light-shielding strip 301 of the black matrix layer 30 is set substantially narrow, the light leakage phenomenon may not occur, and the aperture ratio may increase, which may facilitate to improve the display quality.

It should be understood that any other structure of the array substrate 000, such as the scanning line G, the thin film transistor 50, etc., may not be described in detail herein, and may refer to the structure of the array substrate 000 in the foregoing embodiments.

Optionally, to generate a driving electric field between the pixel electrode 60 and the common electrode 70, when the common electrode is disposed on the side of the pixel electrode 60 away from the substrate 10, the pixel electrode 60 may have a comb-shaped structure, and the overlapped region of the common electrode 70 and the comb-shaped structure of the pixel electrode 60 may have a hollowed-out structure (as shown in FIG. 45). For illustrative purposes, the comb-shaped structure of the pixel electrode 60 may merely be shown in the cross-sectional view, and may not be shown in the top view.

Optionally, the common electrode 70 may have a one-piece structure (not illustrate in the Figure), or may have a block structure. When the common electrode 70 has a block structure, one block structure of the common electrode 70 may correspond to one sub-pixel (as shown in FIG. 45 and FIG. 46). In another embodiment, one block structure of the common electrode 70 may correspond to a plurality of sub-pixels (not shown in the Figure). The specific working principle and structure of the common electrode may refer to corresponding descriptions associated with FIGS. 11-12, which may not be repeated herein.

It should be noted that the Figure may merely schematically illustrate the shape and structure of the lens portion 4012, which may include but may not be limited to the shape and structure in the Figure. The lens portion 4012 may also have any other shape and structure that are capable of converging the first light L into the substantially narrow light-shielding strip 301 after passing through the lens portion 4012. The shape and structure of the lens portion 4012 may be determined according to practical applications, which may not be limited herein.

Figure 47:
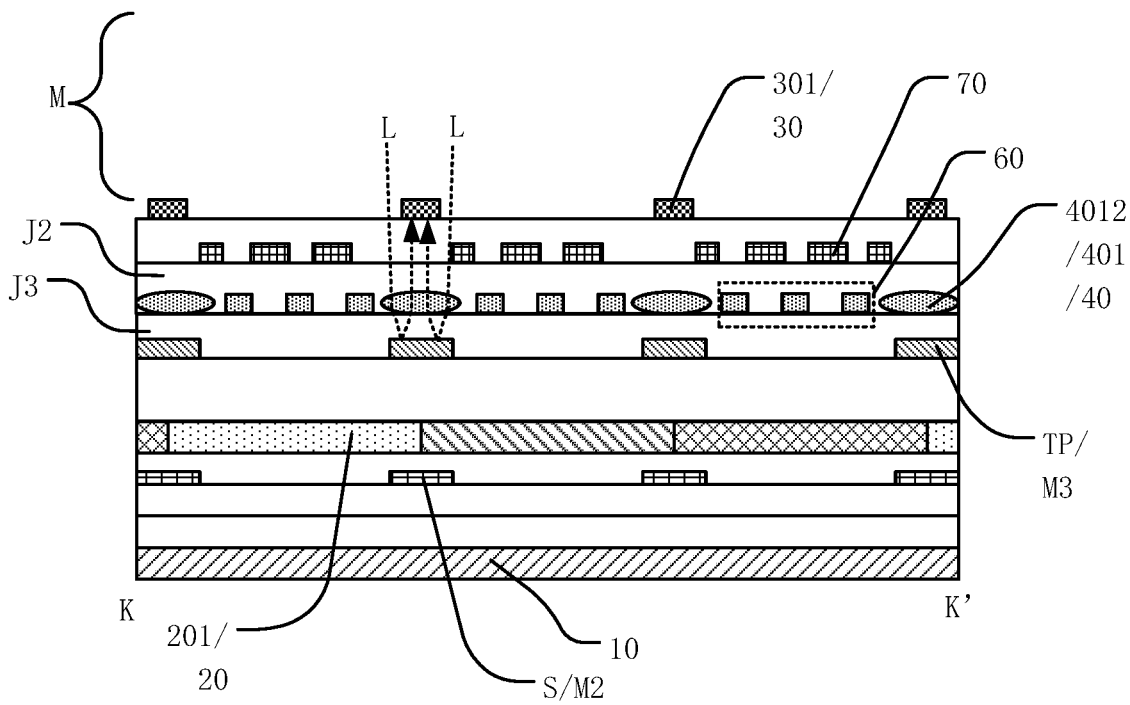
FIG. 47 illustrates a K-K' sectional view of another exemplary array substrate in FIG. 44 consistent with disclosed embodiments of the present disclosure.
Figure 48:
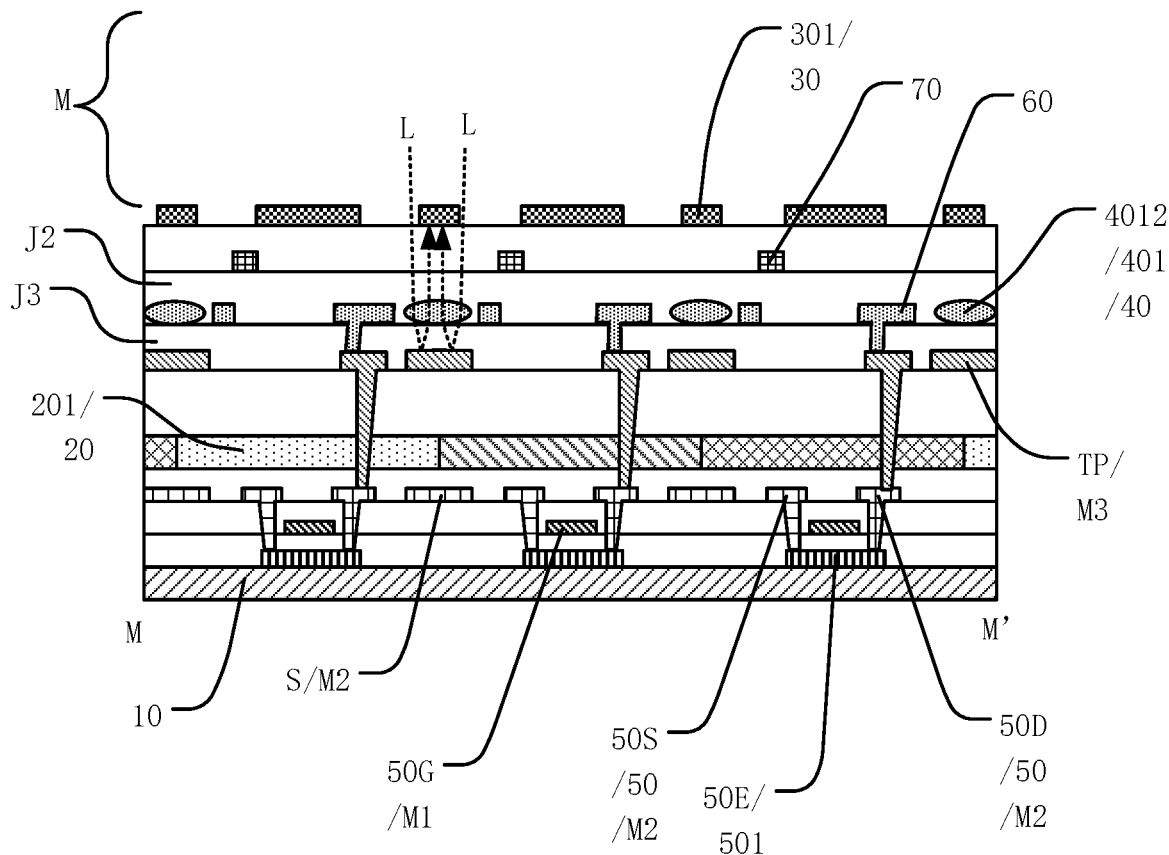
FIG. 48 illustrates an M-M' sectional view of another exemplary array substrate in FIG. 44 consistent with disclosed embodiments of the present disclosure.

FIG. 47 illustrates another K-K' sectional view of the array substrate in FIG. 44; and FIG. 48 illustrates another M-M' sectional view of the array substrate in FIG. 44. In certain embodiments, referring to FIG. 44 and FIGS. 47-48, the pixel electrode 60 may be disposed on the side of the color resist layer 20 away from the substrate 10, and the lens portion 4012 and the pixel electrode 60 may be formed in a same layer and made of a same material.

The present disclosure may explain that the pixel electrode 60 may often be made of indium tin oxide (ITO) semiconductor transparent conductive film, which may have desired conductivity and transparency. Each of the film layers above and below the pixel electrode 60 may be an insulating layer, such as an insulating layer made of an insulating material such as silicon nitride, which may have a refractive index smaller than the pixel electrode 60. Therefore, the lens portion 4012 may be formed in a same layer and made of a same material as the pixel electrode 60. While satisfying the effect of converging the first light L of the lens portion 4012, the array substrate 000 may not need additional transparent film layer to form the lens portion 4012, which may facilitate the thinning of the array substrate 000.

Optionally, referring to FIG. 44 and FIGS. 47-48, the common electrode 70 may be disposed on the side of the color resist layer 20 away from the substrate 10, and the common electrode 70 may be disposed on the side of the pixel electrode 60 away from the substrate 10. In one embodiment, the common electrode 70 may be disposed on the side of the pixel electrode 60 away from the substrate 10. In other words, the pixel electrode 60 may be farther away from the light-shielding strip 301 with respect to the common electrode 70. Therefore, when the lens portion 4012 and the pixel electrode 60 are formed in the same layer and made of the same material, a substantially large transmission space for the first light L in a direction perpendicular to the plane of the substrate 10 may be provided, which may prevent the lens portion 4012 from being too close to the light-shielding strip 301 to affect the converging effect of the lens portion 4012.

Optionally, the common electrode 70 may have a one-piece structure (not illustrate in the Figure), or may have a block structure. When the common electrode 70 has a block structure, one block structure of the common electrode 70 may correspond to one sub-pixel (as shown in FIG. 47 and FIG. 48). In another embodiment, one block structure of the common electrode 70 may correspond to a plurality of sub-pixels (not shown in the Figure). The specific working principle and structure of the common electrode may refer to corresponding descriptions associated with FIGS. 11-12, which may not be repeated herein.

Figure 49:
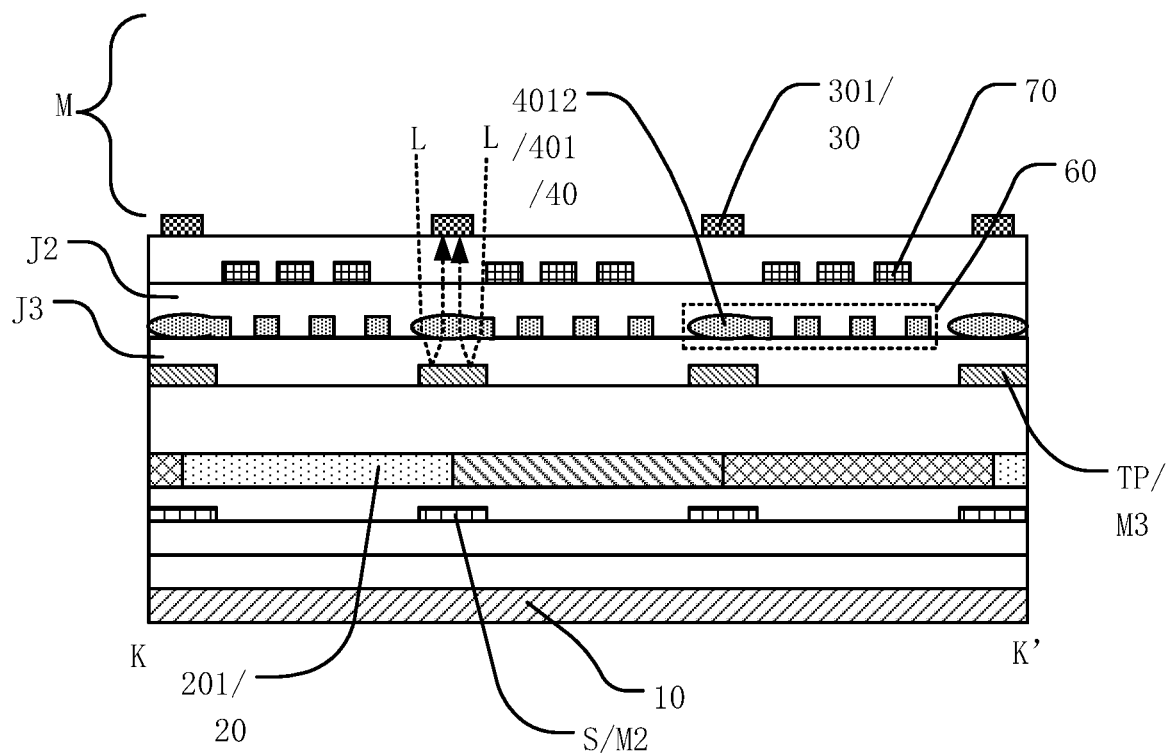
FIG. 49 illustrates a K-K' sectional view of another exemplary array substrate in FIG. 44 consistent with disclosed embodiments of the present disclosure.
Figure 50:
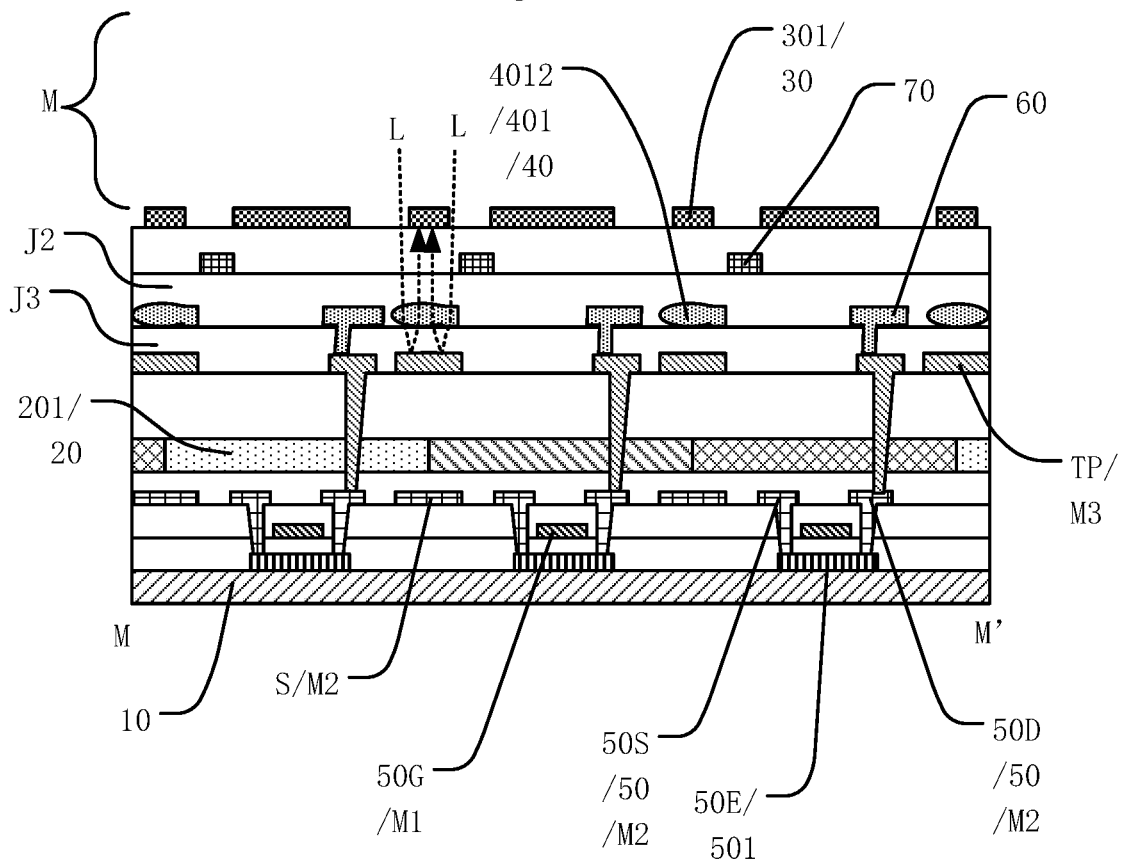
FIG. 50 illustrates an M-M' sectional view of another exemplary array substrate in FIG. 44 consistent with disclosed embodiments of the present disclosure.

FIG. 49 illustrates another K-K' sectional view of the array substrate in FIG. 44; and FIG. 50 illustrates another M-M' sectional view of the array substrate in FIG. 44. In certain embodiments, referring to FIG. 44 and FIGS. 49-50, the pixel electrode 60 may be disposed on the side of the color resist layer 20 away from the substrate 10, and at least a portion of the pixel electrode 60 may be multiplexed as the lens portion 4012.

The present disclosure may explain that the lens portion 4012 and the pixel electrode 60 may be formed in a same layer and made of a same material. While satisfying the effect of converging the first light L of the lens portion 4012, the array substrate 000 may not need additional transparent film layer to form the lens portion 4012, which may facilitate the thinning of the array substrate 000. Further, a portion region of the pixel electrode 60 may be multiplexed as the lens portion. In other words, at least a portion of the pixel electrode 60 may be designed in the shape and structure of the lens portion 4012. Not only an electric field for driving deflection of liquid crystal molecules may be formed between the pixel electrode 60 and the common electrode 70, but also the first light may be converged through the structure of the lens portion 4012, thereby improving light leakage phenomenon.

It should be understood that the region where the at least portion of the pixel electrode 60 is multiplexed as the lens portion 4012 may often be a region where the light-shielding strip 301 is located. In other words, the pixel electrode 60 may refer to an electrode located in the entire pixel electrode film layer in one sub-pixel 00. The region where the pixel electrode 60 is located may not only include the aperture region in the sub-pixel 00 used for light-transmitting display, but also include the non-aperture region where the light-shielding strip 301 is located. Therefore, the pixel electrode 60 in the region where the light-shielding strip 301 is located may be designed in the shape of the lens portion 4012, which may have little effect on the electric field generated between the pixel electrode 60 and the common electrode 70. Even if the electric field is influenced to a certain extent, the lens portion 4012 may be located in the non-aperture region where the light-shielding strip 301 is located, which may have little effect on the display or may be understood as no effect. Therefore, the partial structure of the pixel electrode 60 may be multiplexed as the lens portion 4012, to ensure the display effect.

Optionally, the common electrode 70 may have a one-piece structure (not illustrate in the Figure), or may have a block structure. When the common electrode 70 has a block structure, one block structure of the common electrode 70 may correspond to one sub-pixel (as shown in FIG. 49 and FIG. 50). In another embodiment, one block structure of the common electrode 70 may correspond to a plurality of sub-pixels (not shown in the Figure). The specific working principle and structure of the common electrode may refer to corresponding descriptions associated with FIGS. 11-12, which may not be repeated herein.

Figure 51:
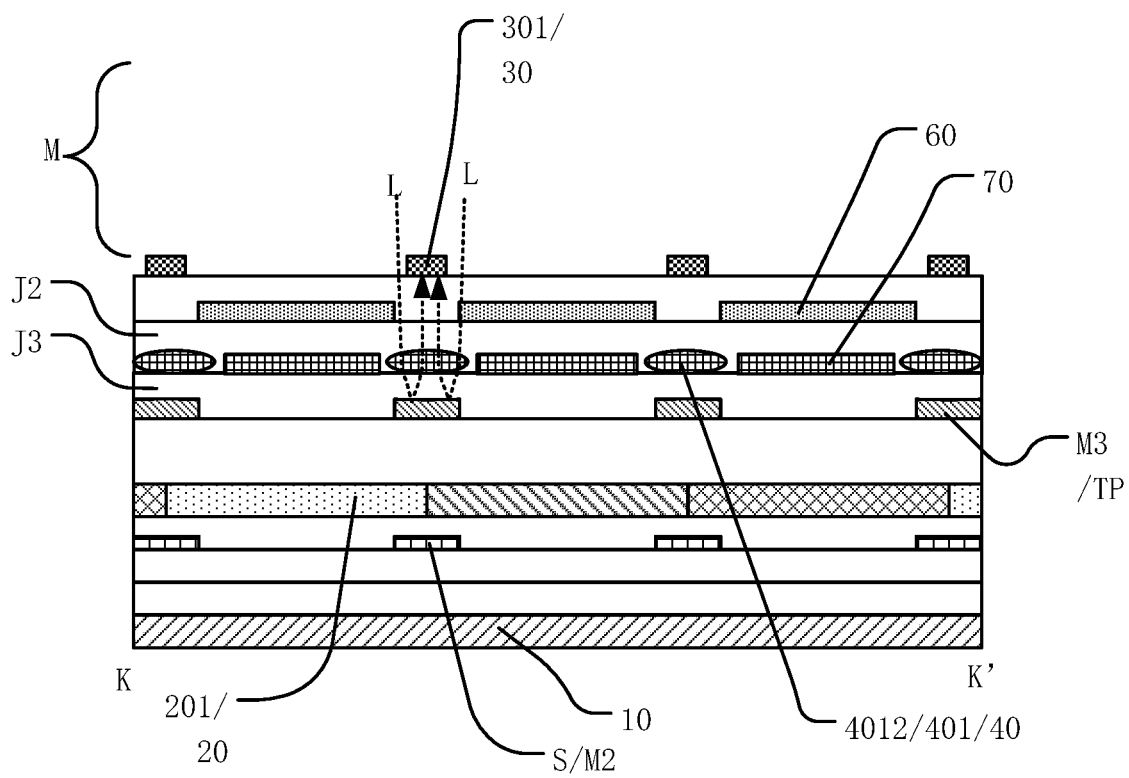
FIG. 51 illustrates a K-K' sectional view of another exemplary array substrate in FIG. 44 consistent with disclosed embodiments of the present disclosure.
Figure 52:
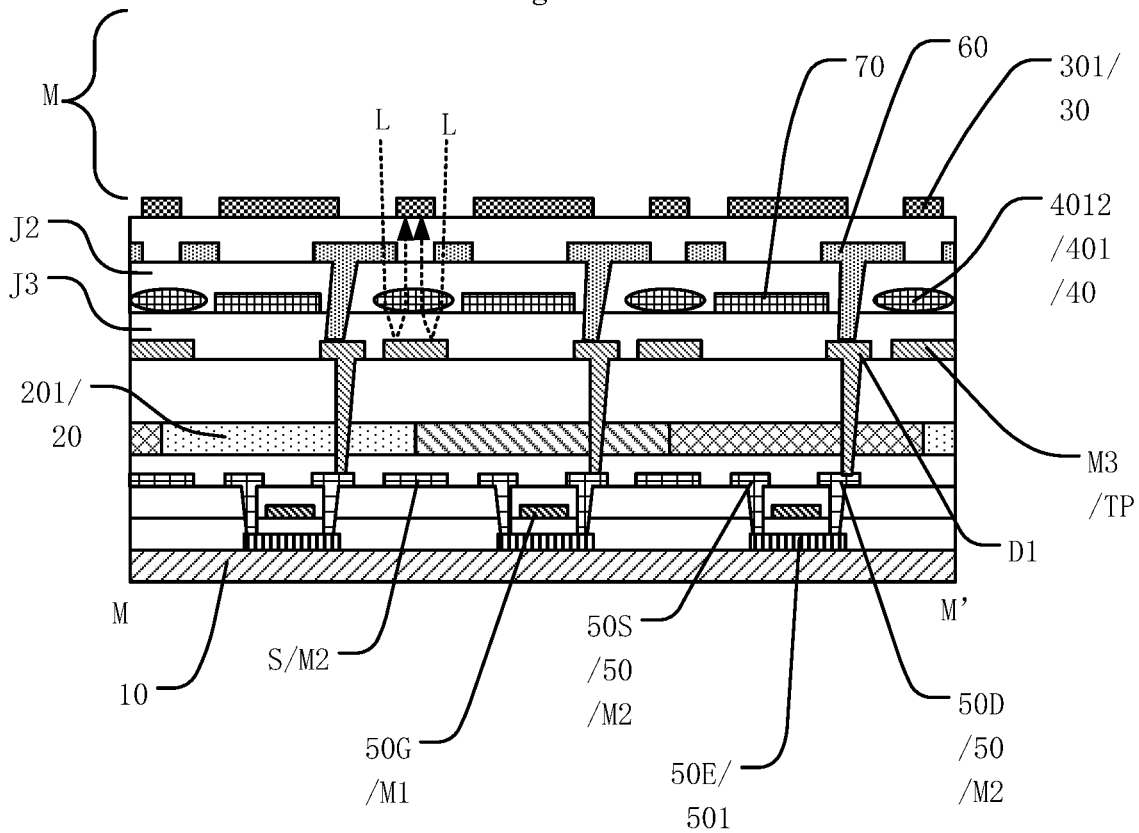
FIG. 52 illustrates an M-M' sectional view of another exemplary array substrate in FIG. 44 consistent with disclosed embodiments of the present disclosure.

FIG. 51 illustrates another K-K' sectional view of the array substrate in FIG. 44; and FIG. 52 illustrates another M-M' sectional view of the array substrate in FIG. 44. In certain embodiments, referring to FIG. 44 and FIGS. 51-52, the common electrode 70 may be disposed on the side of the color resist layer 20 away from the substrate 10, and the lens portion 4012 and the common electrode 70 may be formed in a same layer and made of a same material.

The present disclosure may explain that the common electrode 70 may often be made of indium tin oxide (ITO) semiconductor transparent conductive film, which may have desired conductivity and transparency. Each of the film layers above and below the common electrode 70 may be an insulating layer, such as an insulating layer made of an insulating material such as silicon nitride, which may have a refractive index smaller than the common electrode 70. Therefore, the lens portion 4012 may be formed in a same layer and made of a same material as the common electrode 70. While satisfying the effect of converging the first light L of the lens portion 4012, the array substrate 000 may not need additional transparent film layer to form the lens portion 4012, which may facilitate the thinning of the array substrate 000.

Optionally, referring to FIG. 44 and FIGS. 51-52, the pixel electrode 60 may be disposed on the side of the color resist layer 20 away from the substrate 10, and the common electrode 70 may be disposed on the side of the pixel electrode 60 close to the substrate 10. In one embodiment, the common electrode 70 may be disposed on the side of the pixel electrode 60 close to the substrate 10. In other words, the common electrode 70 may be farther away from the light-shielding strip 301 with respect to the pixel electrode 60. Therefore, when the lens portion 4012 and the common electrode 70 are formed in the same layer and made of the same material, a substantially large transmission space for the first light L in a direction perpendicular to the plane of the substrate 10 may be provided, which may prevent the lens portion 4012 from being too close to the light-shielding strip 301 to affect the converging effect of the lens portion 4012.

Figure 53:
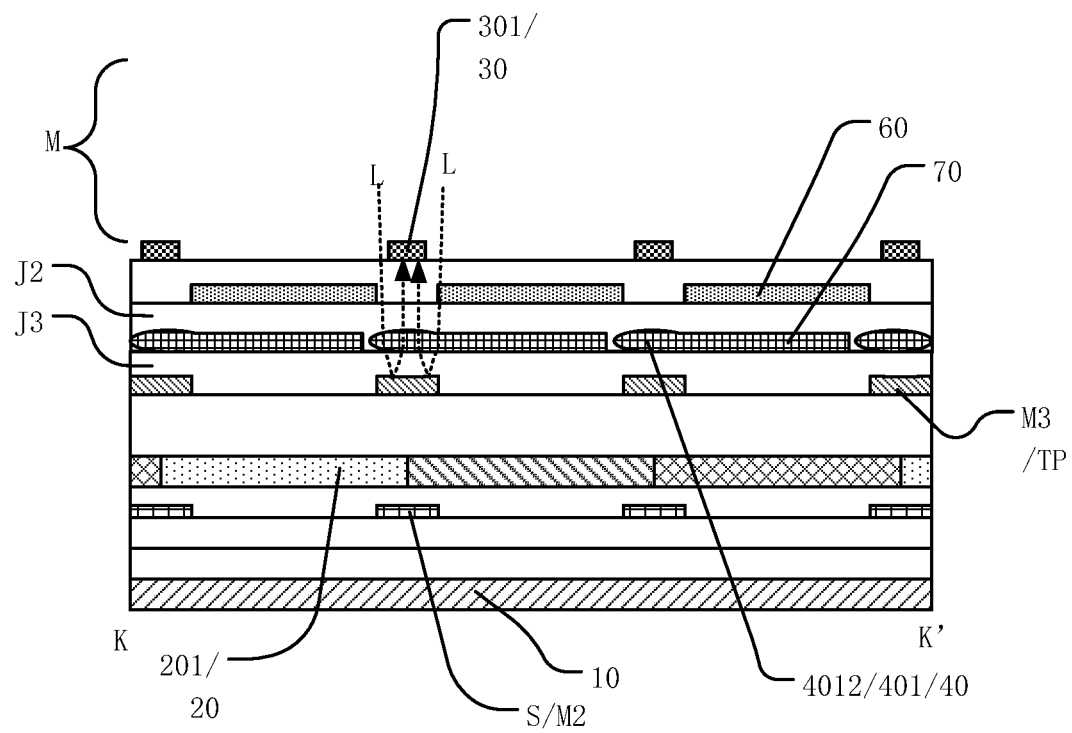
FIG. 53 illustrates a K-K' sectional view of another exemplary array substrate in FIG. 44 consistent with disclosed embodiments of the present disclosure.
Figure 54:
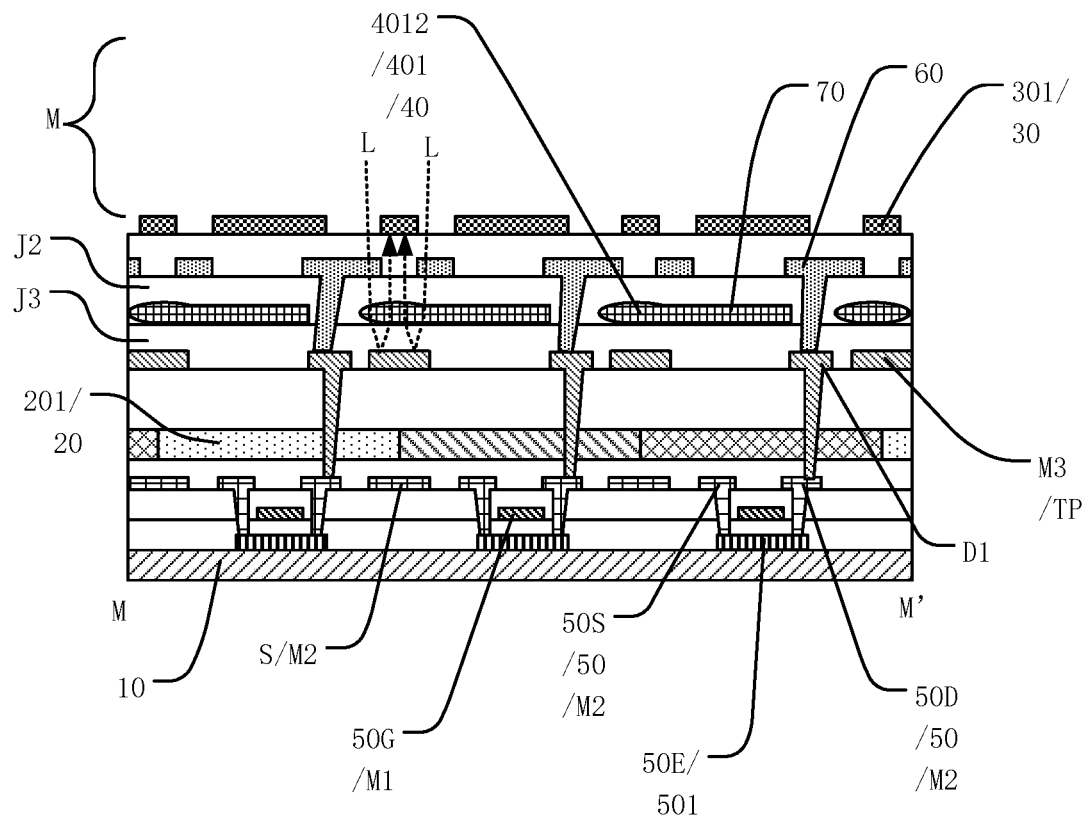
FIG. 54 illustrates an M-M' sectional view of another exemplary array substrate in FIG. 44 consistent with disclosed embodiments of the present disclosure.

FIG. 53 illustrates another K-K' sectional view of the array substrate in FIG. 44; and FIG. 54 illustrates another M-M' sectional view of the array substrate in FIG. 44. In certain embodiments, referring to FIG. 44 and FIGS. 53-54, at least a portion of the common electrode 70 may be multiplexed as the lens portion 4012.

The present disclosure may explain that the lens portion 4012 and the common electrode 70 may be formed in a same layer and made of a same material. While satisfying the effect of converging the first light L of the lens portion 4012, the array substrate 000 may not need additional transparent film layer to form the lens portion 4012, which may facilitate the thinning of the array substrate 000. Further, a portion region of the common electrode 70 may be multiplexed as the lens portion. In other words, at least a portion of the common electrode 70 may be designed in the shape and structure of the lens portion 4012. Not only an electric field for driving deflection of liquid crystal molecules may be formed between the common electrode 70 and the pixel electrode 60, but also the first light may be converged through the structure of the lens portion 4012, thereby improving light leakage phenomenon.

It should be understood that the region where the at least portion of the common electrode 70 is multiplexed as the lens portion 4012 may often be a region where the light-shielding strip 301 is located. Therefore, the common electrode 70 in the region where the light-shielding strip 301 is located may be designed in the shape of the lens portion 4012, which may have little effect on the electric field generated between the pixel electrode 60 and the common electrode 70. Even if the electric field is influenced to a certain extent, the lens portion 4012 may be located in the non-aperture region where the light-shielding strip 301 is located, which may have little effect on the display or may be understood as no effect. Therefore, the partial structure of the common electrode 70 may be multiplexed as the lens portion 4012, to ensure the display effect.

Figure 55:
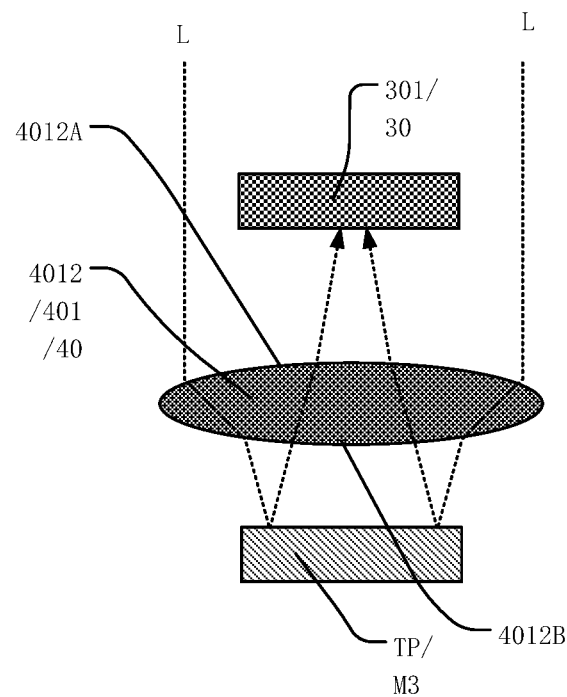
FIG. 55 illustrates a local zoom-in cross-sectional view of a lens portion and a corresponding light-shielding strip of an exemplary array substrate consistent with disclosed embodiments of the present disclosure.
Figure 56:
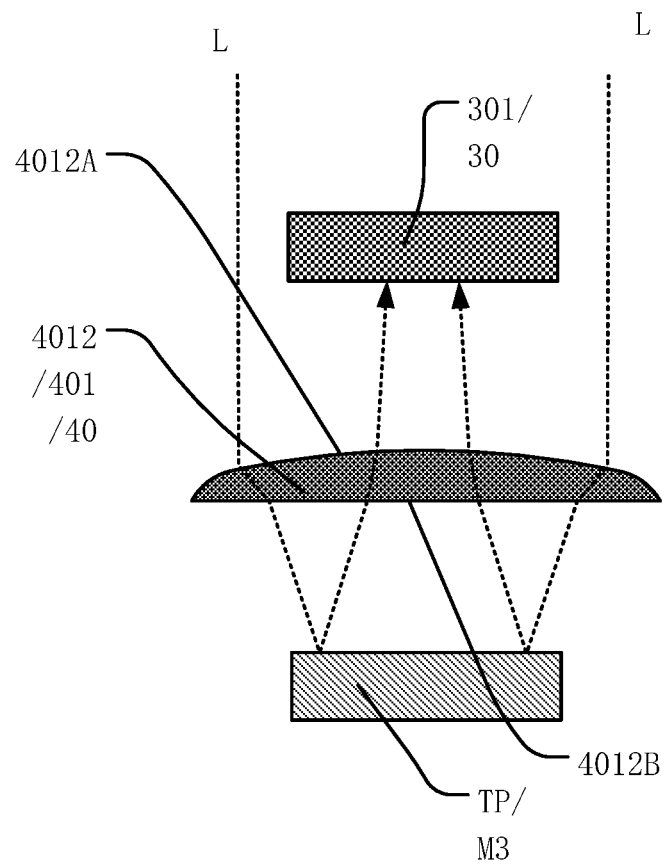
FIG. 56 illustrates a local zoom-in cross-sectional view of a lens portion and a corresponding light-shielding strip of another exemplary array substrate consistent with disclosed embodiments of the present disclosure.
Figure 57:
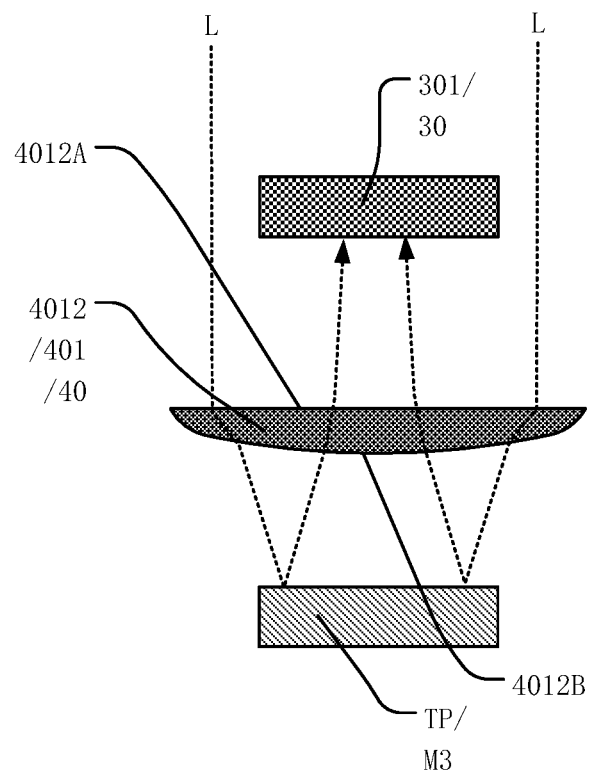
FIG. 57 illustrates a local zoom-in cross-sectional view of a lens portion and a corresponding light-shielding strip of another exemplary array substrate consistent with disclosed embodiments of the present disclosure.

FIG. 55 illustrates a local zoom-in cross-sectional view of a lens portion and a corresponding light-shielding strip of an array substrate consistent with disclosed embodiments of the present disclosure; FIG. 56 illustrates a local zoom-in cross-sectional view of a lens portion and a corresponding light-shielding strip of another array substrate consistent with disclosed embodiments of the present disclosure; and FIG. 57 illustrates a local zoom-in cross-sectional view of a lens portion and a corresponding light-shielding strip of another array substrate consistent with disclosed embodiments of the present disclosure. In certain embodiments, referring to FIGS. 44-57, a surface of the lens portion 4012 facing towards the black matrix layer 30 may be a second surface 4012A, and a surface of the lens portion 4012 facing towards the color resist layer 20 may be a third surface 4012B.

Referring to FIG. 55, the second surface 4012A may be protruded towards the black matrix layer 30, the third surface 4012B may be protruded towards the color resist layer 20, and the lens portion 4012 may have a convex lens structure.

Alternatively, referring to FIG. 56, the second surface 4012A may be an arc surface protruded towards the black matrix layer 30, and the third surface 4012B may be a flat surface.

Alternatively, referring to FIG. 57, the second surface 4012A may be a flat surface, and the third surface 4012B may be an arc surface protruded towards the color resist layer 20.

Figure 58:
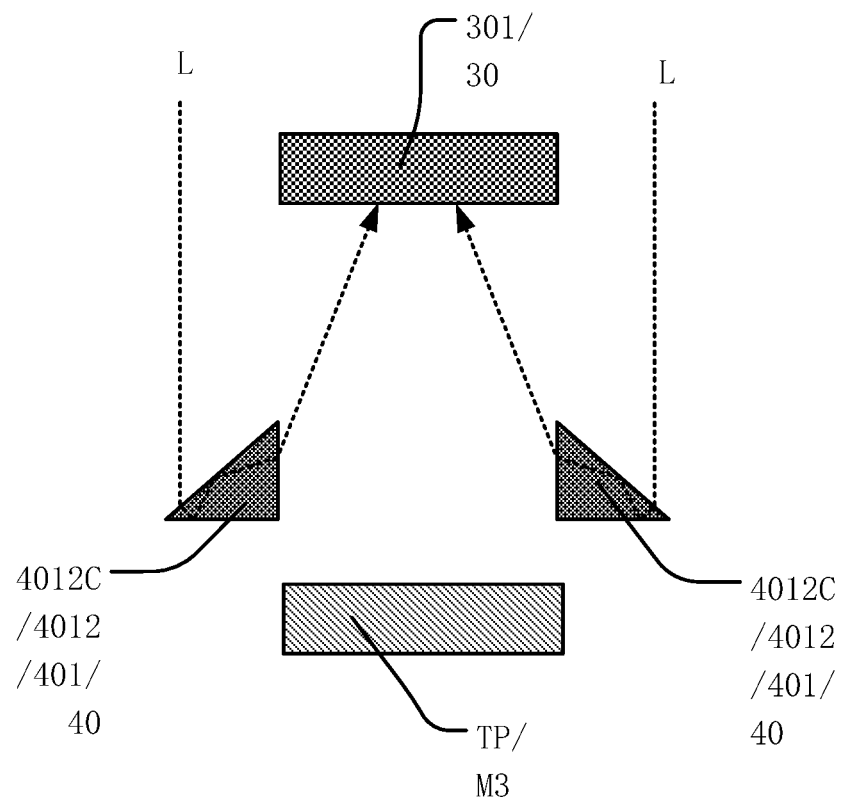
FIG. 58 illustrates a local zoom-in cross-sectional view of a lens portion and a corresponding light-shielding strip of another exemplary array substrate consistent with disclosed embodiments of the present disclosure.

It should be understood that the shape and structure of the lens portion 4012 may include but may not be limited to the shape in the above-disclosed embodiments. FIG. 58 illustrates a local zoom-in cross-sectional view of a lens portion and a corresponding light-shielding strip of an array substrate consistent with disclosed embodiments of the present disclosure. Optionally, referring to FIG. 58, the lens portion 4012 may have a structure including a plurality of prismatic strips 4012C. The first light L may be ultimately converged to the light-shielding strip 301 through the refraction in the prismatic strips 4012C. The shape of the lens portion 4012 may include any other shape, and may be determined according to practical applications in specific implementation, as long as the material of the lens portion 4012 is a transparent material, and the refractive index of the lens portion 4012 is greater than the refractive indices of insulating layers above and below the lens portion 4012, to converge the light.

Figure 59:
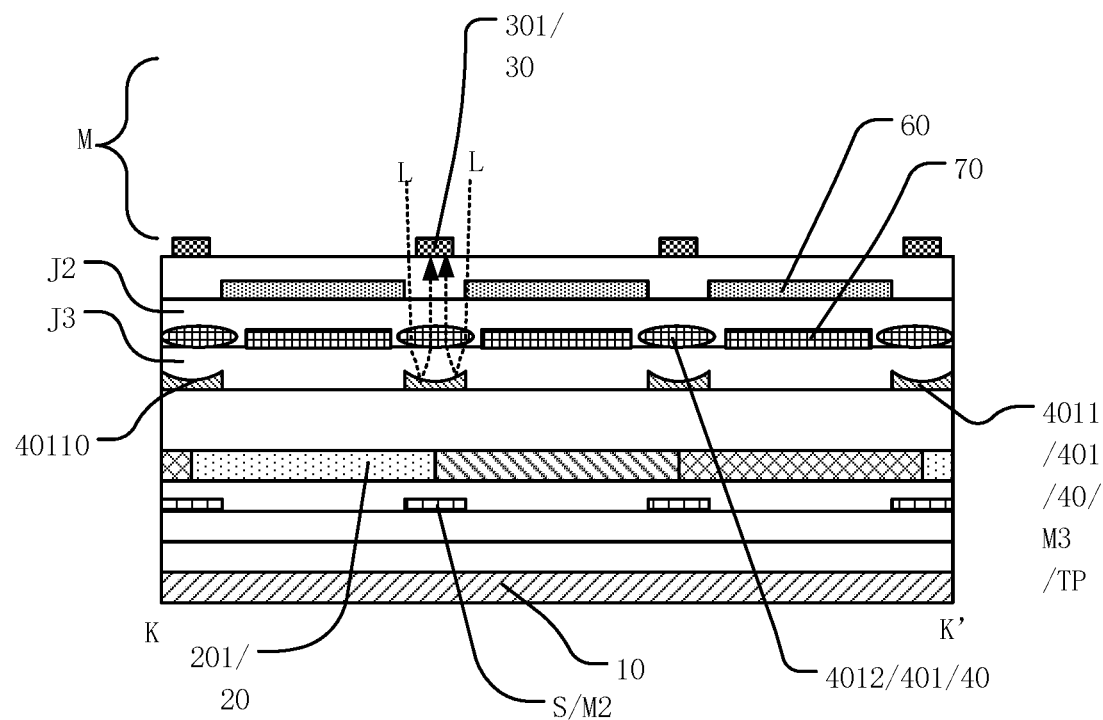
FIG. 59 illustrates a K-K' sectional view of another exemplary array substrate in FIG. 44 consistent with disclosed embodiments of the present disclosure.
Figure 60:
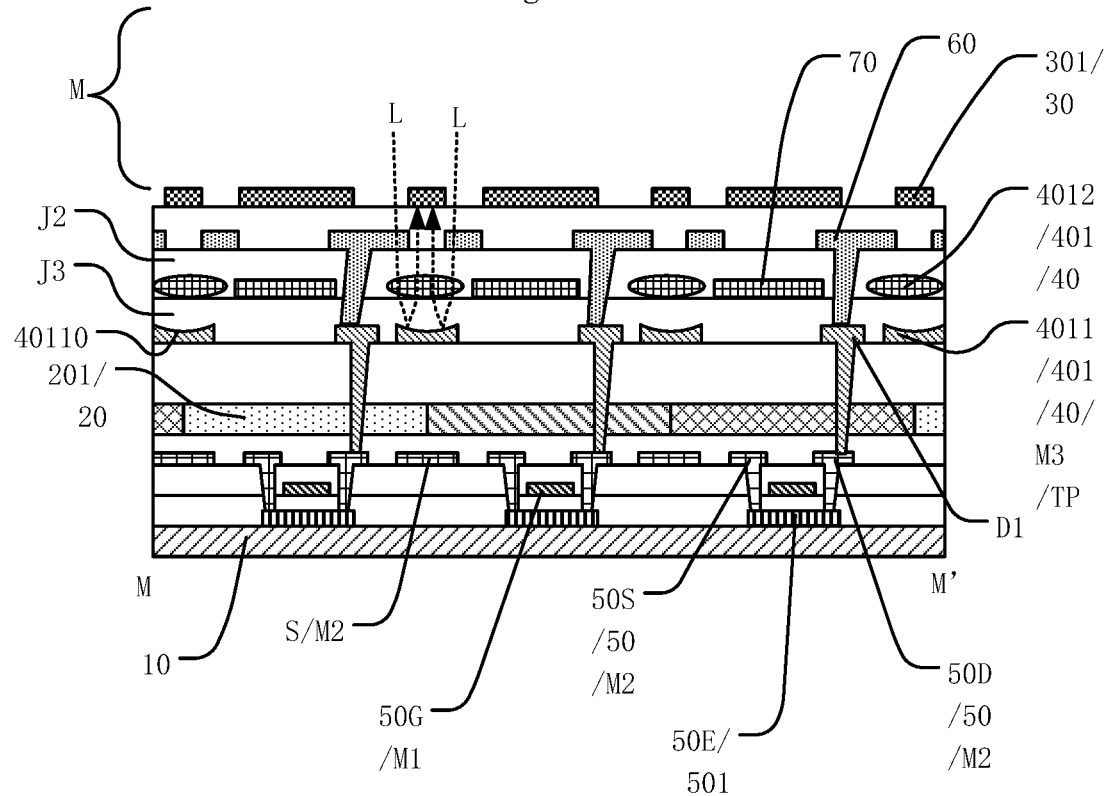
FIG. 60 illustrates an M-M' sectional view of another exemplary array substrate in FIG. 44 consistent with disclosed embodiments of the present disclosure.

FIG. 59 illustrates another K-K' sectional view of the array substrate in FIG. 44; and FIG. 60 illustrates another M-M' sectional view of the array substrate in FIG. 44. In certain embodiments, referring to FIG. 44 and FIGS. 59-60, the light-converging portion 401 disposed between the color resist layer 20 and the black matrix layer 30 may include the reflection portion 4011 and the lens portion 4012. The orthographic projection of the reflection portion 4011 on the substrate 10 may overlap the orthographic projection of the lens portion 4012 on the substrate 10, and the orthographic projection of the light-shielding strip 301 on the substrate 10 may be within the orthographic projection of the reflection portion 4011 on the substrate 10. Therefore, through the joint action of the reflection portion 4011 and the lens portion 4012, after being reflected by the first surface 40110 of the reflection portion 4011, the first light L from the first side M may be further converged to the light-shielding strip 301 through the lens portion 4012. Therefore, the light leakage phenomenon may be effectively improved, and the width of the light-shielding strip 301 may be designed substantially narrow to further increase the aperture ratio.

It should be noted that the specific structure of the reflection portion 4011 and the lens portion 4012 (e.g., in a same layer as any other film layer, being multiplexed, etc.) and the combined effect of the reflection portion 4011 and the lens portion 4012 may be understood with reference to the above embodiments, which may not be repeated herein.

Figure 61:
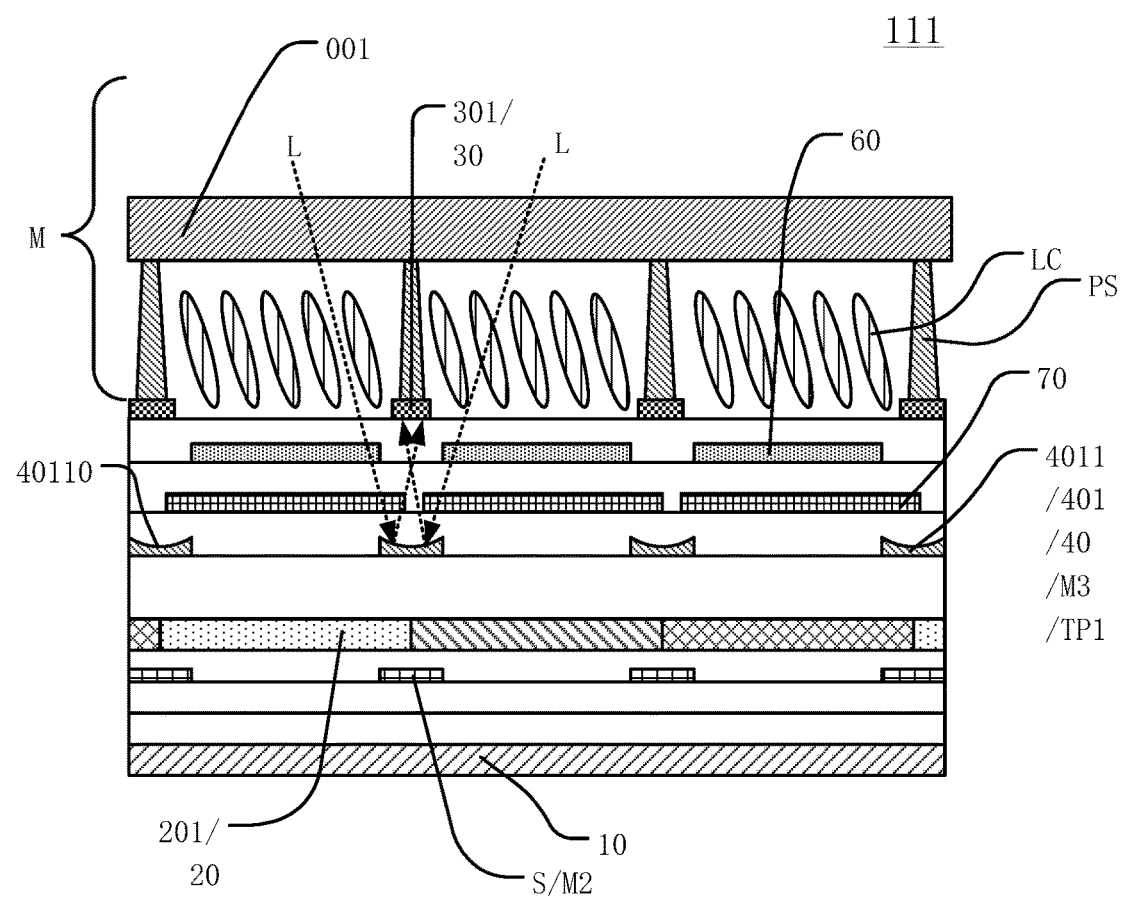
FIG. 61 illustrates a schematic local cross-sectional view of an exemplary display panel consistent with disclosed embodiments of the present disclosure.

FIG. 61 illustrates a schematic local cross-sectional view of a display panel consistent with disclosed embodiments of the present disclosure. In certain embodiments, referring to FIG. 61, the display panel 111 may include the array substrate 000 provided in any of the disclosed embodiments and the first substrate 001, and the array substrate 000 and the first substrate 001 may be disposed opposite to each other. The display panel 111 may also include a liquid crystal layer LC, and a photo spacer PS for maintaining a cell thickness, etc., disposed between the first substrate 001 and the array substrate 000.

Optionally, FIG. 61 merely illustrates the structure of the photo spacer PS. In specific implementation, the photo spacer PS may be disposed on the side of the array substrate 000, and may be formed in a same manufacturing process as the array substrate 000 (as shown in FIG. 61). In another embodiment, the photo spacer PS may be disposed on the side of the first substrate 001 (not shown in the Figure), and may be formed in a same manufacturing process as the first substrate 001, which may not be specifically limited by the present disclosure. The display panel 111 may have the beneficial effects of the array substrate 000 provided in any of the disclosed embodiments, and may refer to specific descriptions of the array substrate 000 provided in any of the disclosed embodiments, which may not be repeated herein.

Figure 62:
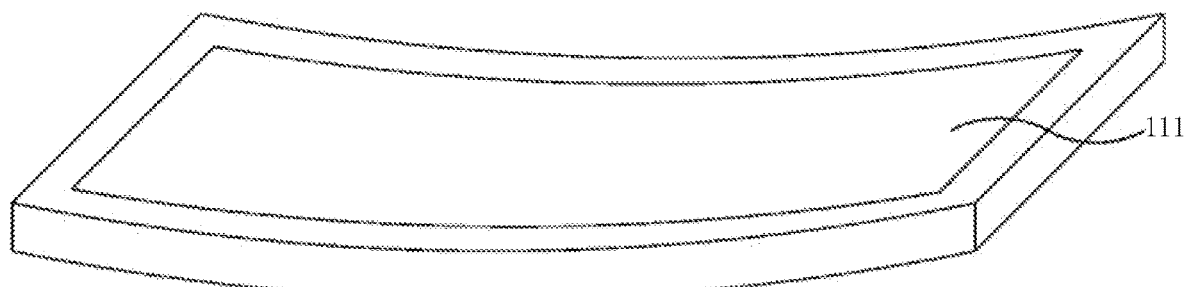
FIG. 62 illustrates a schematic diagram of an exemplary display device consistent with disclosed embodiments of the present disclosure.

FIG. 62 illustrates a schematic diagram of a display device consistent with disclosed embodiments of the present disclosure. In certain embodiments, referring to FIG. 62, the display device 222 may include the display panel 111 provided in any one of the disclosed embodiments. Optionally, the display device 222 may be a curved display device. FIG. 62 may merely use a mobile phone as an example to describe the display device 222. It should be understood that the display device 222 may be a computer, a television, a vehicle-mounted display device, or any other display device with a display function, which may not be repeated herein. The display device 222 may have the beneficial effects of the array substrate of the display panel 111 provided in any of the disclosed embodiments, and may refer to specific descriptions of the array substrate of the display panel 111 provided in any of the disclosed embodiments, which may not be repeated herein.

The present disclosure provides the array substrate, the display panel, and the display device, which may have the following beneficial effects. In the array substrate, the light-converging layer may be disposed between the color resist layer and the black matrix layer. The light-converging layer may include the plurality of light-converging portions, and the light-converging portion may be configured to converge the light incident on the light-converging portion to the light-shielding strip, where the light incident on the light-converging portion may be ambient light. In other words, through disposing the light-converging portion, a propagation direction of the light incident on the light-converging portion may be changed. Therefore, the light-converging portion may converge the light to the light-shielding strip, and the light may be absorbed by the light-shielding strip, thereby improving the light leakage phenomenon.

When a certain film layer in the array substrate includes a metal signal line, because the light-converging portion converges the light, the width of the light-shielding strip of the black matrix layer may be set substantially small, which may facilitate to increase the aperture ratio. Then, the light-converging portion may converge the light to the light-shielding strip. In view of this, even if the width of the light-shielding strip is substantially small, the ambient light may be prevented from being reflected by the metal signal line on the side of the array substrate, thereby reducing the occurrence of light leakage. Through disposing the plurality of light-converging portions between the color resist layer and the black matrix layer, the width of the light-shielding strip of the black matrix layer may be reduced as much as possible while improving the light leakage phenomenon and improving the display quality, thereby increasing the aperture ratio.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. An array substrate, comprising:
   a substrate;
   a color resist layer, disposed on a side of the substrate, wherein the color resist layer includes a plurality of color resists of different colors;
   a black matrix layer, disposed on a side of the color resist layer away from the substrate, wherein the black matrix layer includes a plurality of light-shielding strips and a plurality of openings defined by the plurality of light-shielding strips intersecting each other, and an orthographic projection of an opening of the plurality of openings on the substrate overlaps an orthographic projection of a color resist of the plurality of color resists on the substrate; and
   a light-converging layer, disposed between the color resist layer and the black matrix layer, wherein the light-converging layer includes a plurality of light-converging portions, and a light-converging portion of the plurality of light-converging portions converges light incident on the light-converging portion to a light-shielding strip of the plurality of light-shielding strips.

2. The array substrate according to claim 1, wherein:
   for first light incident on the light-converging portion from a first side of the array substrate, the light-converging portion changes a propagation direction of the first light, and enables the first light to be converged to the light-shielding strip, wherein the first side refers to a side of the black matrix layer away from the substrate.

3. The array substrate according to claim 1, wherein:
   the light-converging portion includes a reflection portion, wherein the reflection portion includes a first surface facing towards the black matrix layer, and the first surface is recessed towards a direction away from the black matrix layer.

4. The array substrate according to claim 3, wherein:
   an orthographic projection of at least a portion of the light-shielding strip on the substrate is located within an orthographic projection of the reflection portion on the substrate.

5. The array substrate according to claim 3, further including:
   a plurality of sub-pixels arranged in an array, a plurality of scanning lines extended along a first direction, a plurality of data lines extended along a second direction, and a common electrode, wherein:
   the plurality of scanning lines and the plurality of data lines are insulated from each other, and intersect each other to define a region where a sub-pixel of the plurality of sub-pixels is located,
   the first direction intersects the second direction,
   the sub-pixel includes a thin film transistor and a pixel electrode that are electrically connected to each other, wherein the thin film transistor includes a gate, a source, a drain, and an active portion, the drain of the thin film transistor is electrically connected to the pixel electrode, the gate is electrically connected to a scanning line of the plurality of scanning lines, and the source is electrically connected to a data line of the plurality of data lines, the gate and the scanning line are located in a first metal layer, the data line, the source and the drain are located in a second metal layer, the active portion is located in an active layer, and the pixel electrode is located on the side of the color resist layer away from the substrate, and the common electrode is located on a side of the pixel electrode close to the substrate, or the common electrode is located on a side of the pixel electrode away from the substrate.

6. The array substrate according to claim 5, wherein:
a third metal layer is disposed between the color resist layer and the black matrix layer, wherein the active layer, the first metal layer, and the second metal layer are disposed between the third metal layer and the substrate, and the third metal layer includes a plurality of first touch-control signal lines, and
at least a portion of the plurality of first touch-control signal lines is multiplexed as the reflection portion.

7. The array substrate according to claim 5, wherein:
the second metal layer is disposed on the side of the color resist layer away from the substrate, and the active layer and the first metal layer are disposed between the second metal layer and the substrate;
the color resist includes a first via, and each of the source and the drain of the thin film transistor is electrically connected to the active portion through the first via; and
the reflection portion is formed in a same layer and made of a same material as the second metal layer.

8. The array substrate according to claim 7, wherein:
a planarization layer is disposed between the black matrix layer and the color resist layer.

9. The array substrate according to claim 7, wherein:
the second metal layer further includes a plurality of second touch-control signal lines; and
at least one reflection portion includes a first sub-portion and a second sub-portion, wherein among the data line and a second touch-control signal line of the plurality of second touch-control signal lines that are adjacently disposed, the data line is multiplexed as the first sub-portion, and the second touch-control signal line is multiplexed as the second sub-portion.

10. The array substrate according to claim 3, wherein:
the first surface is an arc surface.

11. The array substrate according to claim 3, wherein:
the first surface includes at least two inclined surfaces that intersect each other, and an angle formed by the two inclined surfaces and facing towards the black matrix layer is an obtuse angle.

12. The array substrate according to claim 3, wherein:
the reflection portion includes a cross-section perpendicular to a plane of the substrate, and the cross-section is perpendicular to an extension direction of the reflection portion; and
an orthographic projection of the first surface on the cross-section is W-shaped.

13. The array substrate according to claim 3, wherein:
the reflection portion includes at least three triangular prismatic strips arranged at intervals on the side of the reflection portion facing towards the black matrix layer, wherein each triangular prismatic strip includes a right angle, an oblique surface opposite to the right angle, and two right-angle surfaces forming the right angle;

the three triangular prismatic strips include a first prismatic strip, a second prismatic strip, and a third prismatic strip, respectively, wherein the second prismatic strip is located between the first prismatic strip and the third prismatic strip, a right angle of the second prismatic strip faces towards the black matrix layer, and an oblique surface of the first prismatic strip and an oblique surface of the third prismatic strip are disposed opposite to each other;

first light is reflected by the oblique surface of the first prismatic strip to a right-angle surface of the second prismatic strip, and then is reflected by the right-angle surface of the second prismatic strip to the light-shielding strip; and/or, the first light is reflected by the oblique surface of the third prismatic strip to another right-angle surface of the second prismatic strip, and then is reflected by the another right-angle surface of the second prismatic strip to the light-shielding strip.

14. The array substrate according to claim 1, wherein:
the light-converging portion includes a lens portion, wherein an orthographic projection of the lens portion on a plane of the substrate overlaps an orthographic projection of the light-shielding strip on the plane of the substrate;
the lens portion is made of a material including a transparent material; and
a second insulating layer is disposed on a side of the lens portion facing towards the black matrix layer, and a third insulating layer is disposed on a side of the lens portion facing towards the color resist layer, wherein a refractive index of the lens portion is greater than a refractive index of the second insulating layer, and a refractive index of the lens portion is greater than a refractive index of the third insulating layer.

15. The array substrate according to claim 14, wherein:
the pixel electrode is disposed on the side of the color resist layer away from the substrate, and the lens portion and the pixel electrode are formed in a same layer and made of a same material.

16. The array substrate according to claim 14, wherein:
the common electrode is disposed on the side of the color resist layer away from the substrate, and the lens portion and the common electrode are formed in a same layer and made of a same material.

17. The array substrate according to claim 16, wherein:
at least a portion of the common electrode is multiplexed as the lens portion.

18. The array substrate according to claim 14, wherein:
a surface of the lens portion facing towards the black matrix layer is a second surface, and a surface of the lens portion facing towards the color resist layer is a third surface; and
the second surface is protruded towards the black matrix layer, the third surface is protruded towards the color resist layer, and the lens portion has a convex lens structure; or
the second surface is an arc surface protruded towards the black matrix layer, and the third surface is a flat surface; or
the second surface is a flat surface, and the third surface is an arc surface protruded towards the color resist layer.

19. A display panel, comprising:
a first substrate and an array substrate that are disposed opposite to each other, the array substrate including:
a substrate;

a color resist layer, disposed on a side of the substrate, wherein the color resist layer includes a plurality of color resists of different colors;

a black matrix layer, disposed on a side of the color resist layer away from the substrate, wherein the black matrix layer includes a plurality of light-shielding strips and a plurality of openings defined by the plurality of light-shielding strips intersecting each other, and an orthographic projection of an opening of the plurality of openings on the substrate overlaps an orthographic projection of a color resist of the plurality of color resists on the substrate; and a light-converging layer, disposed between the color resist layer and the black matrix layer, wherein the light-converging layer includes a plurality of light-converging portions, and a light-converging portion of the plurality of light-converging portions converges light incident on the light-converging portion to a light-shielding strip of the plurality of light-shielding strips.

20. A display device, comprising:

a display panel including a first substrate and an array substrate that are disposed opposite to each other, the array substrate including:

a substrate;

a color resist layer, disposed on a side of the substrate, wherein the color resist layer includes a plurality of color resists of different colors;

a black matrix layer, disposed on a side of the color resist layer away from the substrate, wherein the black matrix layer includes a plurality of light-shielding strips and a plurality of openings defined by the plurality of light-shielding strips intersecting each other, and an orthographic projection of an opening of the plurality of openings on the substrate overlaps an orthographic projection of a color resist of the plurality of color resists on the substrate; and a light-converging layer, disposed between the color resist layer and the black matrix layer, wherein the light-converging layer includes a plurality of light-converging portions, and a light-converging portion of the plurality of light-converging portions converges light incident on the light-converging portion to a light-shielding strip of the plurality of light-shielding strips.

\* \* \* \* \*